US007473173B2

(12) United States Patent
Peterson et al.

(10) Patent No.: US 7,473,173 B2
(45) **Date of Patent: *Jan. 6, 2009**

(54) GAMING DEVICE HAVING CONCENTRIC REELS INCLUDING AN OUTER REEL WITH DISPLAY AREAS HAVING DIFFERENT SIZES AND POSITIONS

(75) Inventors: Tonja M. Peterson, Reno, NV (US); William L. Hecht, Reno, NV (US); Bayard S. Webb, Sparks, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 359 days.

This patent is subject to a terminal disclaimer.

(21) Appl. No.: 10/945,517

(22) Filed: Sep. 20, 2004

(65) Prior Publication Data

US 2005/0059478 A1 Mar. 17, 2005

Related U.S. Application Data

(63) Continuation-in-part of application No. 10/935,019, filed on Sep. 7, 2004.

(60) Provisional application No. 60/502,363, filed on Sep. 12, 2003.

(51) Int. Cl.

| | |
|---|---|
| ***A63F 13/00*** | (2006.01) |
| ***A63F 9/24*** | (2006.01) |
| ***A63F 1/00*** | (2006.01) |
| ***G06F 17/00*** | (2006.01) |
| ***G06F 19/00*** | (2006.01) |
| ***A63B 71/00*** | (2006.01) |

(52) U.S. Cl. ............................ 463/20; 463/16; 463/21; 463/42; 273/138.1; 273/143 R

(58) Field of Classification Search .................. 463/16, 463/20–22, 25, 30, 46; 273/138.1, 142 R, 273/143 R, 143 A See application file for complete search history.

(56) References Cited

U.S. PATENT DOCUMENTS 1,978,395 A 10/1934 Groetchen (Continued)

FOREIGN PATENT DOCUMENTS

| | | |
|---|---|---|
| AU | 74936/87 | 6/1987 |
| AU | 199716432 B2 | 9/1997 |
| AU | 199717601 | 9/1997 |
| AU | A-50327/96 | 10/1997 |
| DE | 31 05 266 A1 | 9/1982 |
| DE | 31 05 266 C2 | 9/1982 |
| EP | 0 060 019 | 9/1982 |

(Continued)

OTHER PUBLICATIONS

Marshall Fey, Slot Machines a pictorial History of the First 100 Years, 1983, Liberty Belle Books, pp. 79, 150, 171, 231.

Easy Street Advertisements and Articles written by Casino Data Systems, published in 2000.

(Continued)

*Primary Examiner*—Robert E Pezzuto
*Assistant Examiner*—Binh-An D Nguyen
(74) *Attorney, Agent, or Firm*—Bell, Boyd & Lloyd LLP

(57) ABSTRACT

A gaming device including a plurality of reel sets connected where at least one of the reel sets includes concentric reels having an inner reel and an outer reel. The inner reel includes a plurality of symbols and a plurality of symbol positions where at least two of the symbols are displayed by one of the symbol positions. The outer reel defines a plurality of different viewable areas where one of the outer reel is positionable to enable a player to view at least one of the symbols through a first viewable area and a different number of the symbols through a second viewable area. A processor causes the inner reel and the outer reel to move and provides any outcome to the player based on any symbols displayed by the first viewable area or the second viewable area when the first or second viewable area is indicated on the outer reel.

71 Claims, 42 Drawing Sheets

U.S. PATENT DOCUMENTS

| | | | | |
|---|---|---|---|---|
| D164,309 | S | 8/1951 | McManus | |
| D208,030 | S | 7/1967 | Weinard | |
| 3,420,525 | A | 1/1969 | Waders | |
| 3,642,287 | A | 2/1972 | Lally et al. | |
| 3,735,987 | A | 5/1973 | Ohki | |
| D260,769 | S | 9/1981 | Thomas | |
| 4,326,351 | A | 4/1982 | Heywood et al. | |
| 4,410,178 | A | 10/1983 | Partridge | |
| 4,448,419 | A | 5/1984 | Telnaes | |
| 4,517,558 | A | 5/1985 | Davids | |
| 4,695,053 | A | 9/1987 | Vazquez, Jr. et al. | |
| 4,756,531 | A | 7/1988 | DiRe et al. | |
| 4,790,537 | A | 12/1988 | Smyth et al. | |
| 4,871,171 | A | 10/1989 | Rivero | |
| 4,978,129 | A | 12/1990 | Komeda et al. | |
| 5,152,529 | A | 10/1992 | Okada | |
| 5,209,479 | A | 5/1993 | Nagao et al. | |
| 5,259,616 | A | 11/1993 | Bergmann | |
| 5,342,049 | A | 8/1994 | Wichinsky et al. | |
| 5,364,100 | A | 11/1994 | Ludlow et al. | |
| 5,393,057 | A | 2/1995 | Marnell, II | |
| 5,393,061 | A | 2/1995 | Manship et al. | |
| 5,395,111 | A | 3/1995 | Inoue | |
| 5,449,173 | A | 9/1995 | Thomas et al. | |
| 5,524,888 | A | 6/1996 | Heidel | |
| 5,584,764 | A | 12/1996 | Inoue | |
| 5,609,524 | A | 3/1997 | Inoue | |
| 5,611,535 | A | 3/1997 | Tiberio | |
| 5,647,798 | A | 7/1997 | Falciglia | |
| 5,722,891 | A | 3/1998 | Inoue | |
| 5,752,881 | A * | 5/1998 | Inoue | 463/20 |
| 5,769,716 | A | 6/1998 | Saffari et al. | |
| 5,775,692 | A | 7/1998 | Watts et al. | |
| 5,788,573 | A | 8/1998 | Baerlocher et al. | |
| 5,823,874 | A | 10/1998 | Adams | |
| D400,597 | S | 11/1998 | Hedrick et al. | |
| 5,833,537 | A * | 11/1998 | Barrie | 463/21 |
| 5,848,932 | A | 12/1998 | Adams | |
| 5,851,148 | A | 12/1998 | Brune et al. | |
| D404,084 | S | 1/1999 | Hedrick et al. | |
| 5,863,249 | A | 1/1999 | Inoue | |
| D406,615 | S | 3/1999 | Griswold et al. | |
| 5,882,261 | A | 3/1999 | Adams | |
| 5,890,962 | A | 4/1999 | Takemoto | |
| 5,919,088 | A | 7/1999 | Weiss | |
| 5,934,672 | A | 8/1999 | Sines et al. | |
| 5,935,002 | A | 8/1999 | Falciglia | |
| 5,947,820 | A | 9/1999 | Morro et al. | |
| 5,980,384 | A * | 11/1999 | Barrie | 463/16 |
| 5,984,782 | A | 11/1999 | Inoue | |
| 5,997,401 | A | 12/1999 | Crawford | |
| 6,003,867 | A | 12/1999 | Rodesch et al. | |
| 6,027,115 | A | 2/2000 | Griswold et al. | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,086,066 | A | 7/2000 | Takeuchi et al. | |
| 6,089,976 | A | 7/2000 | Schneider et al. | |
| 6,089,978 | A | 7/2000 | Adams | |
| 6,095,921 | A | 8/2000 | Walker et al. | |
| 6,102,798 | A | 8/2000 | Bennett | |
| 6,120,378 | A | 9/2000 | Moody | |
| 6,135,884 | A | 10/2000 | Hedrick et al. | |
| 6,142,873 | A | 11/2000 | Weiss et al. | |
| 6,162,121 | A | 12/2000 | Morro et al. | |
| 6,165,070 | A | 12/2000 | Nolte et al. | |
| 6,168,520 | B1 | 1/2001 | Baerlocher et al. | |
| 6,174,234 | B1 | 1/2001 | Seibert et al. | |
| 6,174,235 | B1 | 1/2001 | Walker et al. | |
| 6,190,254 | B1 | 2/2001 | Bennett | |
| 6,210,279 | B1 | 4/2001 | Dickinson | |
| 6,213,876 | B1 | 4/2001 | Moore, Jr. | |
| 6,220,959 | B1 | 4/2001 | Holmes, Jr. et al. | |
| 6,224,483 | B1 | 5/2001 | Mayeroff | |
| 6,261,177 | B1 | 7/2001 | Bennett | |
| 6,270,411 | B1 | 8/2001 | Gura et al. | |
| 6,270,412 | B1 | 8/2001 | Crawford et al. | |
| 6,302,790 | B1 | 10/2001 | Brossard | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,319,124 | B1 | 11/2001 | Baerlocher | |
| 6,328,649 | B1 | 12/2001 | Randall et al. | |
| 6,334,814 | B1 | 1/2002 | Adams | |
| 6,347,996 | B1 | 2/2002 | Gilmore et al. | |
| 6,364,766 | B1 | 4/2002 | Anderson et al. | |
| 6,398,218 | B1 | 6/2002 | Vancura | |
| 6,398,220 | B1 | 6/2002 | Inoue | |
| 6,435,511 | B1 | 8/2002 | Vancura et al. | |
| 6,439,993 | B1 | 8/2002 | O'Halloran | |
| 6,439,995 | B1 | 8/2002 | Hughs-Baird et al. | |
| 6,461,241 | B1 | 10/2002 | Webb et al. | |
| 6,471,208 | B2 | 10/2002 | Yoseloff et al. | |
| 6,551,187 | B1 | 4/2003 | Jaffe | |
| 6,561,900 | B1 | 5/2003 | Baerlocher et al. | |
| 6,569,015 | B1 | 5/2003 | Baerlocher et al. | |
| 6,575,830 | B2 | 6/2003 | Baerlocher et al. | |
| 6,589,114 | B2 | 7/2003 | Rose | |
| 6,595,854 | B2 | 7/2003 | Hughs-Baird et al. | |
| 6,616,142 | B2 | 9/2003 | Adams | |
| 6,659,864 | B2 | 12/2003 | McGahn et al. | |
| D487,582 | S | 3/2004 | McGahn et al. | |
| 6,715,756 | B2 | 4/2004 | Inoue | |
| 6,726,204 | B2 * | 4/2004 | Inoue | 273/143 R |
| 6,854,732 | B2 | 2/2005 | Moody | |
| 6,857,958 | B2 * | 2/2005 | Osawa | 463/20 |
| 6,866,583 | B2 | 3/2005 | Glavich et al. | |
| D504,473 | S | 4/2005 | Baerlocher | |
| 6,905,406 | B2 | 6/2005 | Kaminkow et al. | |
| 2002/0094857 | A1 | 7/2002 | Meyer | |
| 2002/0094862 | A1 | 7/2002 | Inoue | |
| 2002/0142829 | A1 | 10/2002 | Inoue | |
| 2003/0027622 | A1 * | 2/2003 | Osawa | 463/20 |
| 2003/0040355 | A1 | 2/2003 | Baerlocher | |
| 2003/0232643 | A1 | 12/2003 | Inoue | |
| 2004/0000754 | A1 | 1/2004 | Inoue | |
| 2004/0009803 | A1 | 1/2004 | Bennett et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0023714 | A1 | 2/2004 | Asdale | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0053658 | A1 | 3/2004 | Rothkranz | |
| 2004/0058727 | A1 | 3/2004 | Marks et al. | |
| 2004/0121840 | A1 | 6/2004 | Rosander et al. | |
| 2005/0277460 | A1 | 12/2005 | Inoue | |
| 2006/0019738 | A1 * | 1/2006 | Baerlocher et al. | 463/20 |

FOREIGN PATENT DOCUMENTS

| | | | |
|---|---|---|---|
| EP | 0 410 789 | | 7/1990 |
| EP | 0798676 | A1 | 10/1997 |
| EP | 0926645 | A2 | 6/1999 |
| EP | 0944030 | A2 | 9/1999 |
| EP | 0945837 | A2 | 9/1999 |
| EP | 0 984 408 | | 3/2000 |
| EP | 1 205 984 | | 10/2001 |

| | | | |
|---|---|---|---|
| GB | 1 464 896 | A | 1/1974 |
| GB | 2 083 936 | A | 3/1982 |
| GB | 2 096 376 | A | 10/1982 |
| GB | 2 097 160 | A | 10/1982 |
| GB | 2 106 292 | A | 4/1983 |
| GB | 2106292 | | 4/1983 |
| GB | 2 117 155 | A | 10/1983 |
| GB | 2 170 636 | A | 8/1986 |
| GB | 2 183 882 | A | 6/1987 |
| GB | DE 3700861 | A1 | 7/1988 |
| GB | 2 226 436 | A | 6/1990 |
| GB | 2 328 311 | A | 2/1999 |
| WO | WO 00/59591 | | 10/2000 |
| WO | WO 00/66235 | | 11/2000 |
| WO | WO 00/76606 | | 12/2000 |

OTHER PUBLICATIONS

Treasure Wheel/Treasure Tunnel Advertisement written by Sigma Game, Inc., published prior to 2000.
Wheel of Fortune Advertisement written by IGT, published in 1998.
Wheel of Fortune Article written by IGT, published in 1999.
Take Your Pick Brochure and Article written by IGT/Anchor Games, Strictly Slots, published in 1999.
Austin Powers in Goldmember™ Advertisement written by IGT, published in 2003.
Magic 8 Ball Advertisement written by IGT, published in 2002.
Barn Yard Article in Strictly Slots, published in Mar. 2002.
Barn Yard Advertisement written by Aristocrat, not dated.
Bonus Times Article written by Strictly Slots, published in Jul. 2000.
Take Your Pick Advertisement written by IGT/Anchor Gaming, published in 1999, on or before December thereof.
Take Your Pick Article, Strictly Slots, published Mar. 2001.
Vision Series™/Good Times™ Brochure written by IGT, published in 1999, on or before December thereof.
X Factor Brochure and Website Page written by WMS Gaming, Inc., published in 1998, on or before December thereof.
Enchanted Unicorn Advertisement, written by IGT, published in 2001.
Penguin Pays Advertisement, written by Aristocrat Incorporated, published in 1998.
Reel Magic™ Gaming Machine Description, written by IGT, available in 1986.
Wild Streak Advertisement, written by WMS Gaming, Inc., published in 2001.
Wild Streak Article, written by Strictly Slots, published in Mar. 2001.

* cited by examiner

GAMING DEVICE HAVING CONCENTRIC REELS INCLUDING AN OUTER REEL WITH DISPLAY AREAS HAVING DIFFERENT SIZES AND POSITIONS

PRIORITY CLAIM

This application is a continuation-in-part application of, claims priority to and the benefit of U.S. patent application Ser. No. 10/935,019 filed on Sep. 7, 2004, the entire contents of which is incorporated herein, and which is a non-provisional application of, claims priority to and the benefit of U.S. Provisional Patent Application Ser. No. 60/502,363 filed on Sep. 12, 2003.

CROSS REFERENCE TO RELATED APPLICATIONS

This application relates to the following, commonly owned applications: "GAMING DEVICE SYMBOL DISPLAY HAVING A DISPLAY WINDOW," Ser. No. 29/189,903, now U.S. Pat. No. D496,968; "GAMING DEVICE HAVING SYMBOL REVEALING MECHANISM," Ser. No. 10/935,019; "GAMING DEVICE HAVING AN AWARD PLATE AND AN INDICATOR PLATE FOR DISPLAYING SELECTED AWARDS," Ser. No. 10/941,479; "GAMING DEVICE HAVING A GAME WITH PRIMARY SYMBOLS, SECONDARY SYMBOLS ASSOCIATED WITH THE PRIMARY SYMBOLS AND INDEPENDENTLY GENERATED SECONDARY SYMBOLS," Ser. No. 10/957,013; "GAMING DEVICE HAVING CONCENTRIC REELS INCLUDING A NUDGE SYMBOL," Ser. No. 10/934,162; "GAMING DEVICE HAVING CONCENTRIC REELS AND A DISPLAYABLE WILD SYMBOL," Ser. No. 10/949,619; "GAMING DEVICE HAVING A ROTATABLE MECHANICAL AWARD INDICATOR PARTIALLY COVERED BY A MASK," Ser. No. 10/896,437; and "GAMING DEVICE SYMBOL DISPLAY HAVING MULTIPLE DISPLAY WINDOWS," Ser. No. 29/212,196.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Another way to enhance a player's enjoyment, entertainment and excitement with a gaming device is by including lights, sounds and other visual or audio or audio-visual effects in the gaming machines.

Certain known gaming devices use mechanical devices such as reels, wheels or spheres to enhance the attraction of the machines to players and also to enhance the player's game playing experience. These mechanical devices enable a player to see physical movements of a game, a portion of a game, or a functional game event or element which increases the player's enjoyment of the game.

To increase player enjoyment and excitement, it is desirable to provide new and different mechanical devices which operate in conjunction with primary or secondary games of wagering gaming devices.

SUMMARY OF THE INVENTION

The present invention is directed to a gaming device having a mechanical display or mechanical topper unit having a symbol revealing mechanism including a housing, a symbol display connected to the housing which is adapted to generate and display at least one symbol from a plurality of symbols, and a movable symbol indicator having at least one section including a viewable area which is positionable to reveal one or more of the symbols of the symbol display.

In one embodiment, after a triggering event in or associated with a game, the symbol display displays a plurality of first symbols which are generated by the symbol display and the symbol indicator moves or rotates relative to the symbol display to position the section including the viewable area to reveal a designated number of the first symbols generated by the symbol display. The gaming device provides an award to a player based on the first symbols of the symbol display which are revealed by or visible through the viewable area.

In one embodiment, the outcome or award is based on the order of the first symbols revealed or indicated by the viewable area of the symbol indicator. For example, if the first symbols include values or numbers, and the viewable area reveals the numbers 4 and 8 (in this order) the gaming device provides an award of forty-eight to the player. Therefore, the positioning of the viewable area or window determines in part the amount or value of the award or outcome provided to the player in a game. By revealing or indicating one or more of the first symbols on the symbol display using the viewable area or window of the symbol indicator, the present invention increases the excitement and enjoyment of the game for the player because the player does not know the value or amount the outcome or award until the viewable area is positioned in the game.

In one embodiment, the symbol display generates the first symbols before the symbol indicator moves to position the viewable area to reveal the designated number of the first symbols generated by the symbol display. In another embodiment, the symbol indicator moves and positions the viewable area before the symbol display generates any first symbols. In this embodiment, the symbol display generates one or more first symbols after the viewable area is positioned to reveal at least a portion of the symbol display.

In one embodiment, the symbol indicator includes a plurality of sections where at least one of the sections includes the viewable area or window described above and at least one of the other sections includes at least one second symbol which may be the same or different from any of the first symbols on the symbol display. The second symbols may represent values, awards, free spins, free games, game elements or any other suitable outcome or award which may be added to or used in combination with the first symbols indicated on the symbol display to determine the outcome or award provided to the player in the game.

In one embodiment, the gaming device includes a section indicator which indicates one of the sections on the symbol indicator after the symbol indicator is moved or rotated in a game. When the section indicator indicates the section including the viewable area or window, the gaming device provides an award to the player based on any of the first symbols generated by the symbol display which are revealed by the viewable area. If the section indicator indicates one of the sections including at least one of the second symbols, the gaming device provides an outcome or award associated with the indicated second symbol. It should be appreciated that the gaming device may include one or more section indicators in a game.

In one embodiment, a symbol indicator includes a plurality of sections where at least two of the sections include a viewable area separated by a modifier. The modifier may be any suitable modifier such as a multiplication symbol, an addition symbol, a subtraction symbol, a division symbol or any other suitable modifier. Upon a triggering event associated with the game, the symbol indicator moves or rotates to reveal one or more first symbols in one or both of the viewable areas on the symbol indicator. If the symbol indicator moves and positions the viewable areas such that only one of the viewable areas reveals a portion or all of the symbol display, the gaming device provides an outcome based on the first symbols visible through or indicated by the symbol display in that viewable area. If the symbol indicator moves and positions the viewable areas such that at least one first symbol is visible through each of the viewable areas (i.e., on each side of the modifier), the gaming device uses the modifier to modify the first symbols which are visible or viewable through each of the viewable areas. For example, if the first symbols are numbers and a number five is visible through the first viewable area and a number nine is visible through the second viewable area and the viewable areas are separated by a section including a modifier, such as a multiplication symbol, the gaming device provides an outcome to the player which is the number five multiplied by the number nine or forty-five. By including additional viewable areas or windows and a modifier to modify one or more first symbols visible through each of those viewable areas, the gaming device increases the player's excitement and enjoyment of the game.

In another embodiment, the symbol indicator includes a plurality sections where at least one of the sections includes a plurality of viewable areas. In this embodiment, when the section including the plurality of viewable areas is indicated by the section indicator, the first symbols visible through the viewable areas on the indicated section are combined to form the award provided to the player. In one aspect of this embodiment, a modifier such as a multiplier separates the viewable areas and modifies any outcome or award associated with the symbols visible through the viewable areas. In another embodiment, different sized viewable areas are included on one or more of the sections of the symbol indicator to display a plurality of the first symbols of the symbol display. For example, if the symbol display includes a plurality of reels, the viewable areas may be sized to display one, a plurality or all of the symbols displayed of the first symbols displayed by one of the reels of the symbols display. It should be appreciated that the viewable areas may be any suitable size or shape to display one or more of the first symbols of the symbol display.

In another embodiment, the symbol display includes a video display device which simulates mechanical components of the gaming device such as mechanical reels or wheels in a game. In this embodiment, the video display device or symbol display generates one or more first symbols as described above. It should be appreciated that the symbol display may be a mechanical display, a video display or any suitable display device.

In another embodiment, the gaming device includes a plurality of reel sets where at least one of the reel sets includes an inner reel and an outer reel which are fully or partially concentric reels or concentrically arranged reels. The inner reel includes a plurality of symbols and the outer reel includes or defines a plurality of different viewable areas or windows which have or are of different sizes and/or different positions. The different viewable areas enable a player to view the different symbols and/or different numbers of the symbols on the inner reel and thereby increases the player's excitement and enjoyment of the game.

In a play of the game, the gaming device or player activates the reel sets including the reel set having the concentric inner and outer reels, to indicate symbols on each of the reel sets. Specifically, in one embodiment, the reel set including the inner reel and the outer reel, when activated, moves or rotates both the inner reel and the outer reel. When the reel sets stop moving or rotating, at least one of the different viewable areas or windows can be stopped in a symbol position (such as along a payline) to enable a player to view one or more of the symbols on the inner reel. The viewable areas or windows defined by the outer reel enable a player to view or see through the outer reel one or more symbols displayed by the inner reel in a corresponding position.

In one such embodiment, the gaming device includes a plurality of reel sets where at least one of the reel sets includes the fully or partially concentric inner reel and outer reel as described above. In this embodiment, the inner reel includes a plurality of symbol positions where at least one of the symbol positions includes two symbols at that position. In another embodiment, two or more of the symbol positions include at least two symbols. In a further embodiment, each of the symbol positions include at least two symbols. It should thus be appreciated that one or more of the symbol positions may include more than one symbol. It should also be appreciated that the symbols may be conventional symbols, blank symbols (i.e., empty spaces) or any other suitable symbol or symbols or any suitable combination of symbols.

In one embodiment, the outer reel includes or defines a plurality of viewable areas or windows where at least two of the windows are different sizes. For example, the outer reel defines a first viewable area or window which is sized to display a first number of symbols such as one symbol and also defines another or second viewable area or window that is sized to display a second different number of symbols such as two or more symbols. Thus, the different sizes of the viewable areas or windows of the outer reel determines the number of symbols at a symbol position of the inner reel which can be viewed by a player in a play of the game. It should be appreciated that a plurality of the viewable areas or all of the viewable areas may be different sizes. Also, one of the reel sets, a plurality of the reel sets or all of the reel sets may include the fully or partially concentric inner and outer reels.

The different sizes of the viewable areas increases the excitement and enjoyment of the game for players because the players can obtain one or a plurality of symbols at one or more symbol positions on one, a plurality or each of the reel sets to form a symbol combination in a play of the game. Accordingly, the gaming device of the present invention enhances the opportunities for players to obtain an award or awards in the play of the game.

In another embodiment, the inner reel includes at least two different symbol positions with symbols at different sides or locations at one or more of the symbol positions. For example, in one embodiment, a symbol may be located on one or both sides of the inner reel as a player views the inner reel. Furthermore, in this embodiment, the outer reel defines a plurality of viewable areas or windows which are also located in different positions or locations on the outer reel of the reel set. For example, one of the viewable areas of the plurality of viewable areas is positioned on the left side of the outer reel as a player views the outer reel and therefore can display a symbol positioned in a corresponding location (i.e., the left side) on the inner reel.

Similarly, one or more of the symbols on the inner reel may alternatively or additionally be located on the right side of the inner reel as a player views the inner reel. The outer reel defines a plurality of viewable areas or windows which are positioned on the right side of the outer reel as a player views the outer reel. Thus, the each viewable area defined by the outer reel can display one of the symbols in a corresponding position (i.e., the right side) on the inner reel in a play of the game.

In one embodiment, a plurality of symbols at different symbol positions on the inner reel are located on the left side of the inner reel as a player views the inner reel and a plurality of the symbols at different symbols positions on the inner reel are located on the right side of the inner reel as the player views the inner reel. Similarly, the outer reel defines at least one viewable area or window which is positioned on the left side of the outer reel and at least one viewable area or window which is positioned on the right side of the outer reel. Each viewable area or window therefore can display one of the symbols of the inner reel which corresponds to the position (i.e., the left or right side of the outer reel) of the viewable area or window on the outer reel. In another embodiment, at least one of the symbol positions of the inner reel displays two symbols—one symbol on the left side and one symbol on the right side of the inner reel as a player views the inner reel. In this embodiment, the viewable areas or windows of the outer reel can display one or the other symbol or both symbols at that symbol position based on the position or location of the viewable area or window on the outer reel.

It should be appreciated that any suitable number of the viewable areas may be positioned on the left side, the right side or any combination of the left and right sides of the outer reel. It should also be appreciated that the viewable areas or windows may be in any suitable position on the outer reel.

In a further embodiment, the gaming device includes a plurality of reel sets including the fully or partially concentric inner reels and outer reels as described above. In this embodiment, the inner reel include a plurality of symbols at different symbol positions. Specifically, the inner reel includes at least one symbol on the left side of a symbol position on the inner reel as a player views the inner reel, at least one symbol on the right side of a symbol position of the inner reel as a player views the inner reel and at least two symbols at a different symbol position of the inner reel. The outer reel defines a plurality of viewable areas or windows where at least one of the viewable areas or windows is positioned on the left side of the outer reel as a player views the outer reel, at least one of the viewable areas or windows is positioned on the right side of the outer reel as a player views the outer reel, and at least one of the viewable areas or windows on the outer reel is sized to display one or more symbols at a symbol position on the inner reel.

In one embodiment, for each reel set including the fully or partially concentric inner and outer reels, the inner reel and outer reel move or rotate in the same direction. In another embodiment, the inner reel and the outer reel move or rotate in different directions. It should be appreciated that the inner reel and the outer reel can move or rotate simultaneously or sequentially. The inner reel and outer reel can also alternately rotate in the same or different directions. Additionally in one embodiment, the inner and outer reel move or rotate at the same rate of rotation. In another embodiment, the inner and outer reels move or rotate at different rates of rotation. It should be appreciated that the inner and outer reels may rotate at any suitable rates of rotation.

In further embodiments, a plurality of paylines are associated with the reel sets. The gaming device provides an outcome or award to the player for any designated or winning symbol combinations including the symbols indicated on the wagered upon paylines associated with the reel sets and the symbols displayed through the viewable areas indicated on those paylines associated with the reel sets. It should thus be appreciated that one or a plurality of paylines may be associated with the reel sets.

In another embodiment, at least one modifier such as a multiplier is associated with one or more of the viewable areas or windows of the reel sets including the fully or partially concentric inner and outer reels. The modifier is displayed adjacent to one or more of the viewable areas or windows on the reel set or sets. If the viewable area or window associated with the modifier is indicated on a payline associated with the reel sets and a designated or winning symbol combination occurs on that payline, the gaming device provides an outcome to the player and also modifies that outcome based on the modifier associated with the indicated viewable area on that payline. It should be appreciated that one or more modifiers may be associated with one of the viewable areas or windows, a plurality of the viewable areas or windows, or all of the viewable areas or windows of each reel set including the fully or partially concentric inner and outer reels. It should also be appreciated that the modifier may be a multiplier or any other suitable modifier.

In a further embodiment, the outer reel of one, a plurality or all of the reel sets including the fully or partially concentric inner and outer reels includes at least one symbol. If the symbol is indicated by a payline associated with the reel sets in a play of the game, the symbol is combined with any symbols of the inner reels displayed by the viewable areas or windows indicated by that payline to form the symbol combination indicated by the payline. The symbol on the outer reel may be any suitable symbol. In one embodiment, at least one of the symbols of the outer reel are the same as the symbols of the inner reel. In another embodiment, a plurality of the symbols of the outer reel are the same as the symbols of the inner reel.

In an alternative embodiment, the outer reel includes at least two sections or members which independently move or rotate. Each of the sections or members include a plurality of viewable areas or windows where at least one of the viewable areas or windows of the first rotatable section aligns with at least one of the viewable areas or windows on the second rotatable section to form a relatively large viewable area or window. Accordingly, the viewable areas or windows indicate or display one of the symbols of the inner reel when the viewable areas or windows are not aligned. When the viewable areas or windows are aligned to form the relatively large viewable area or window in a play of the game, the relatively large viewable area or window indicates a plurality of symbols of the inner reel. It should be appreciated that the outer reel may include any suitable number of viewable areas or windows which align to form any viewable area or window of any shape or size.

The present invention may be employed in a primary or base game, a secondary or bonus game or in any suitable game associated with a gaming device.

An advantage of the present invention is to provide a gaming device including a symbol revealing mechanism which reveals one or more symbols generated by a symbol display to determine an outcome based on the revealed symbols.

Another advantage of the present invention is to provide a gaming device including a symbol revealing mechanism which reveals one or more symbols generated by a symbol display to determine an award based on the order of the revealed symbols.

Another advantage of the present invention is to provide a gaming device including at least one reel set having fully or partially concentric inner and outer reels where the outer reel defines a plurality of different viewable areas which can display one or more symbols of the inner reel to determine an outcome based on the symbols displayed by a plurality of reel sets.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
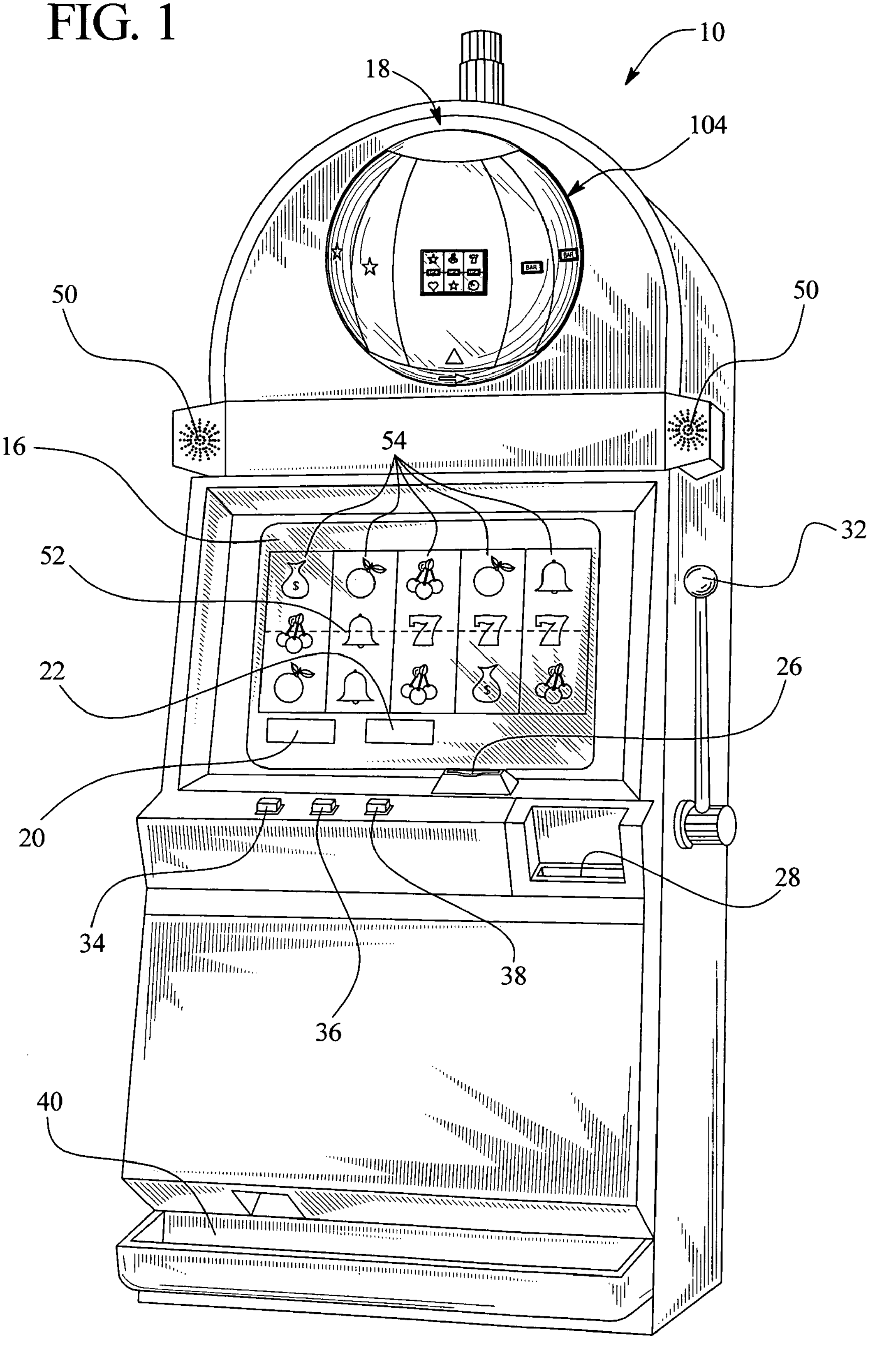
FIG. 1 is a front elevational view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. In the embodiments illustrated in FIGS. 1 to 19D, the gaming device 10 can be constructed as a pub-style table-top game (not shown) that a player can operate preferably while sitting. Gaming device 10 can incorporate any game such as slot, poker or keno. The symbols used on and in gaming device 10 may be in mechanical, electrical or in video form.

As illustrated in FIG. 1, gaming device 10 includes a coin slot 26 and bill acceptor 28 where the player inserts money, coins or tokens. The player can place coins in the coin slot 26 or paper money in the bill acceptor 28. Other devices could be used for accepting payment such as readers or validators for credit cards or debit cards. When a player inserts money in gaming device 10, a number of credits corresponding to the amount deposited is shown in a credit display 20. The present invention preferably employs or uses credits, however, the present invention is not limited to the use of credits and contemplates employing other units of value such as money. For purposes of describing and claiming this invention, the term "credit" includes any unit of value such as a gaming device credit or actual money.

After depositing the appropriate amount of money, a player can begin the game by pulling arm 32 or by pushing play button 34. Play button 34 can be any play activator used by the player which starts any game or sequence of events in the gaming device.

Referring to FIG. 1, gaming device 10 also includes a bet display 22 and a bet one button 36. The player places a bet by pushing the bet one button 36. The player can increase the bet by one credit each time the player pushes the bet one button 36. When the player pushes the bet one button 36, the number of credits shown in the credit display 20 decreases by one, and the number of credits shown in the bet display 22 increases by one.

Gaming device 10 also has a paystop display 26 which contains a plurality of reels 54, preferably three to five reels in mechanical or video form. Each reel 54 displays a plurality of symbols such as bells, hearts, martinis, fruits, cactuses, numbers, cigars, letters, bars or other images, which preferably correspond to a theme associated with the gaming device 10. If the reels 54 are in video form, the gaming device 10 preferably displays the video reels 54 in a display device described below. Furthermore, gaming device 10 preferably includes speakers 50 for making sounds or playing music.

A player may "cash out" and thereby receive a number of coins corresponding to the number of remaining credits by pushing a cash out button 38. When the player "cashes out," the player receives the coins in a coin payout tray 40. The gaming device 10 may employ other payout mechanisms such as credit slips redeemable by a cashier or electronically recordable cards that keep track of the player's credits.

With respect to electronics, the controller of gaming device 10 preferably includes the electronic configuration generally illustrated in FIG. 2, which has: a processor 12; a memory device 14 for storing program code or other data; a display device 16 (i.e., a liquid crystal display) described below; a plurality of speakers 50; at least one input device as indicated by block 30 and mechanical devices such as a symbol indicator 102 and a symbol display 106, which are further described below. The processor 12 is preferably a microprocessor or microcontroller-based platform that is capable of displaying images, symbols and other indicia such as images of people, characters, places, things and faces of cards. The memory device 14 can include random access memory (RAM) 42 for storing event data or other data generated or used during a particular game. The memory device can also include read only memory (ROM) for storing program code, which controls the gaming device 10 so that it plays a particular game in accordance with applicable game rules and paytables.

Figure 2:
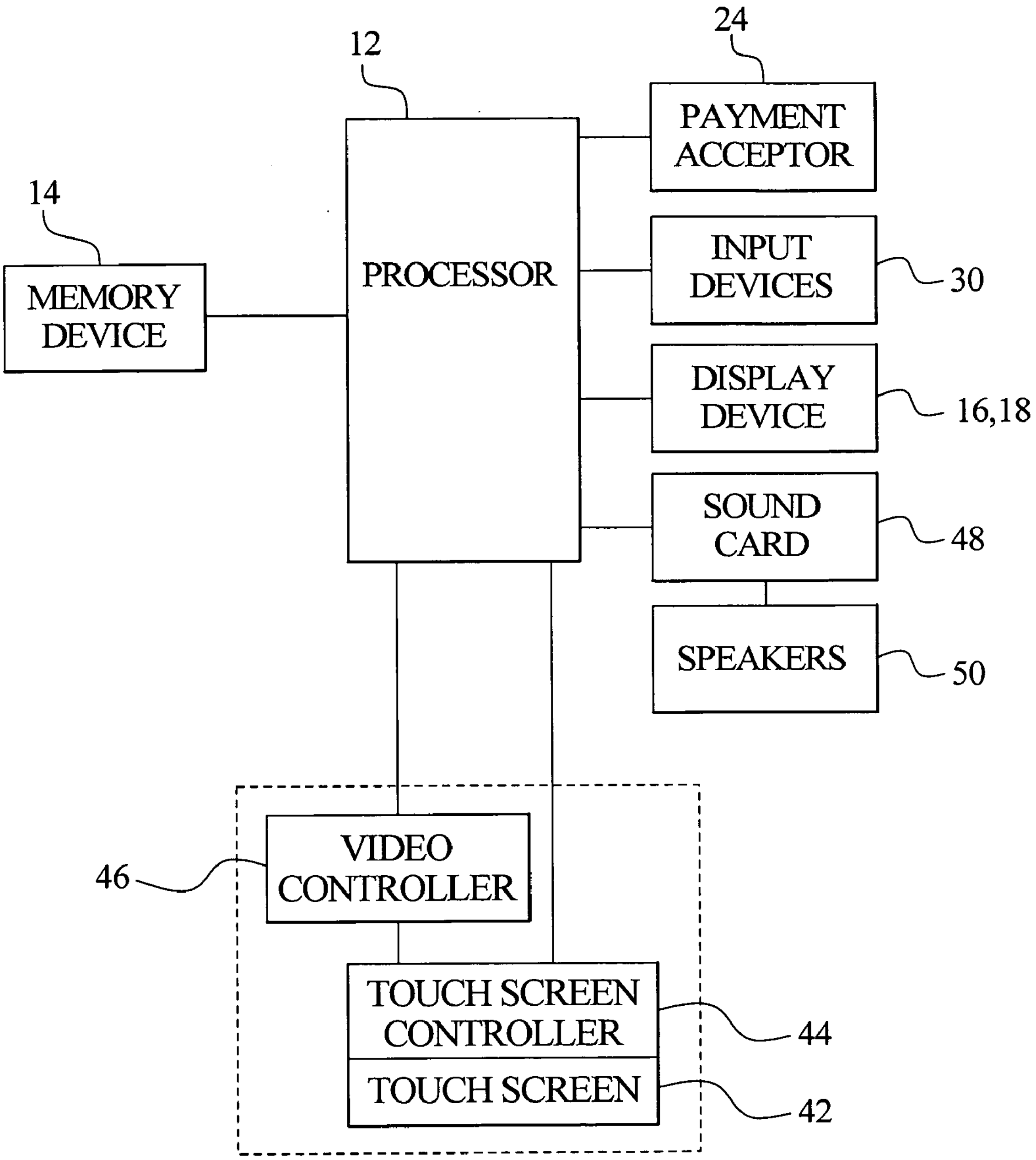
FIG. 2 is a schematic block diagram of the electronic configuration of one embodiment of the gaming device of the present invention.

As illustrated in FIG. 2, the player preferably uses the input devices 30, such as the arm 32, play button 34, the bet one button 36 and the cash out button 38 to input signals into gaming device 10. In certain instances, a touch screen 42 and an associated touch screen controller 44 can be used in conjunction with a display device described in detail below. Touch screen 42 and touch screen controller 44 are connected to a video controller 46 and processor 12. A player can make decisions and input signals into the gaming device 10 by touching touch screen 42 at the appropriate places. As further illustrated in FIG. 2, the processor 12 can be connected to coin slot 26 or bill acceptor 28. The processor 12 can be programmed to require a player to deposit a certain amount of money in order to start the game.

It should be appreciated that although a processor 12 and memory device 14 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 12 and memory device 14 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 12 and memory device 14.

Referring to FIGS. 1 and 2, to operate the gaming device 10, the player must insert the appropriate amount of money or tokens at coin slot 26 or bill acceptor 28 and then pull the arm 32 or push the play button 20. The reels 54 will then begin to spin. Eventually, the reels 54 will come to a stop. As long as the player has credits remaining, the player can spin the reels 54 again. Depending upon where the reels 54 stop, the player may or may not win additional credits.

In addition to winning credits in this manner, gaming device 10 also preferably gives players the opportunity to win credits in a bonus round. This type of gaming device 10 will include a program that will automatically begin a bonus round when the player has achieved a qualifying condition in the game. This qualifying condition can be a particular arrangement of indicia on the display window 16. The gaming device 10 also includes a display device such as a display device 18 shown in FIG. 1 enabling the player to play the bonus round. The display device 18 can be any known video monitor, television screen, dot matrix display, CRT, LED, LCD or electro-luminescent display. The display device 18 can be color or monochrome although, preferably, the display is color. Preferably, the qualifying condition is a predetermined combination of indicia appearing on a plurality of reels 54. As illustrated in the three reel slot game shown in FIG. 1, the qualifying condition could be the text "BONUS!" appearing in the same location on three adjacent reels.

Symbol Revealing Mechanism

Figure 3:
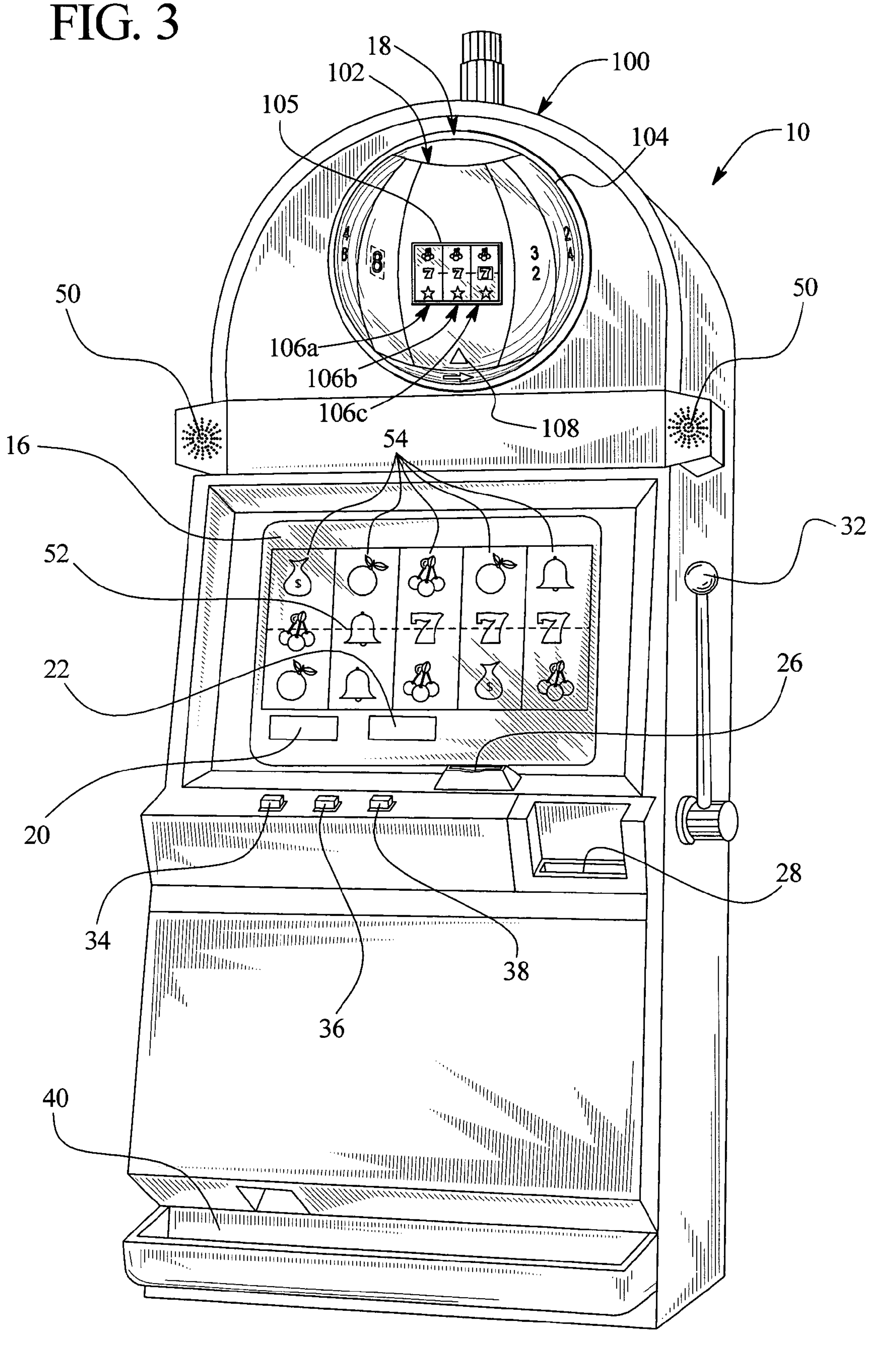
FIG. 3 is an enlarged elevation view of an alternative embodiment of the display device of the present invention illustrating a movable symbol indicator including a section having a viewable area which enables a player to view a symbol display which generates and displays at least one first symbol and at least one section including a second symbol.
Figure 4:
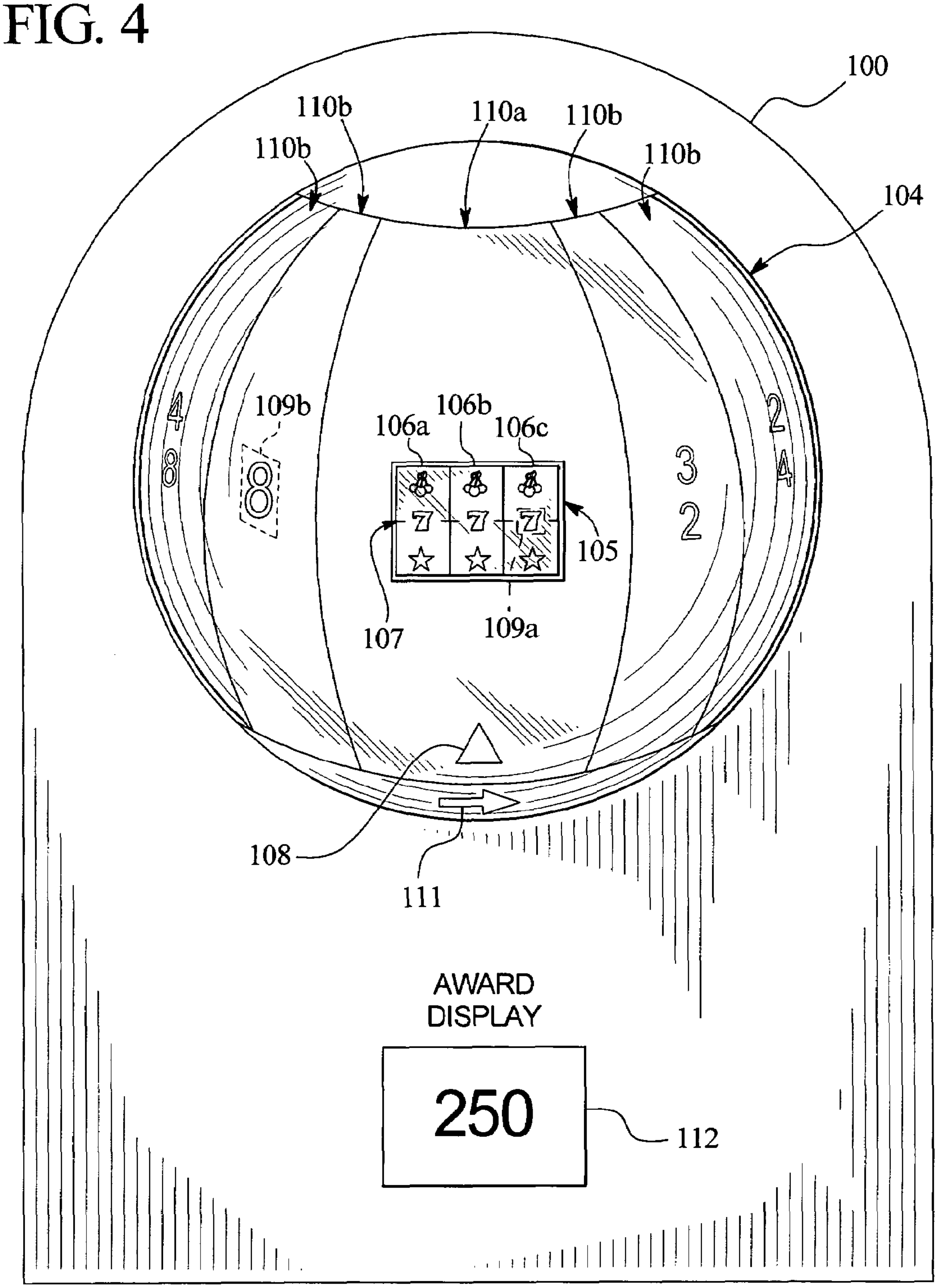
FIG. 4 is an enlarged elevation view of the alternative embodiment of FIG. 3 illustrating the section indicator indicating the section including the viewable area.
Figure 5:
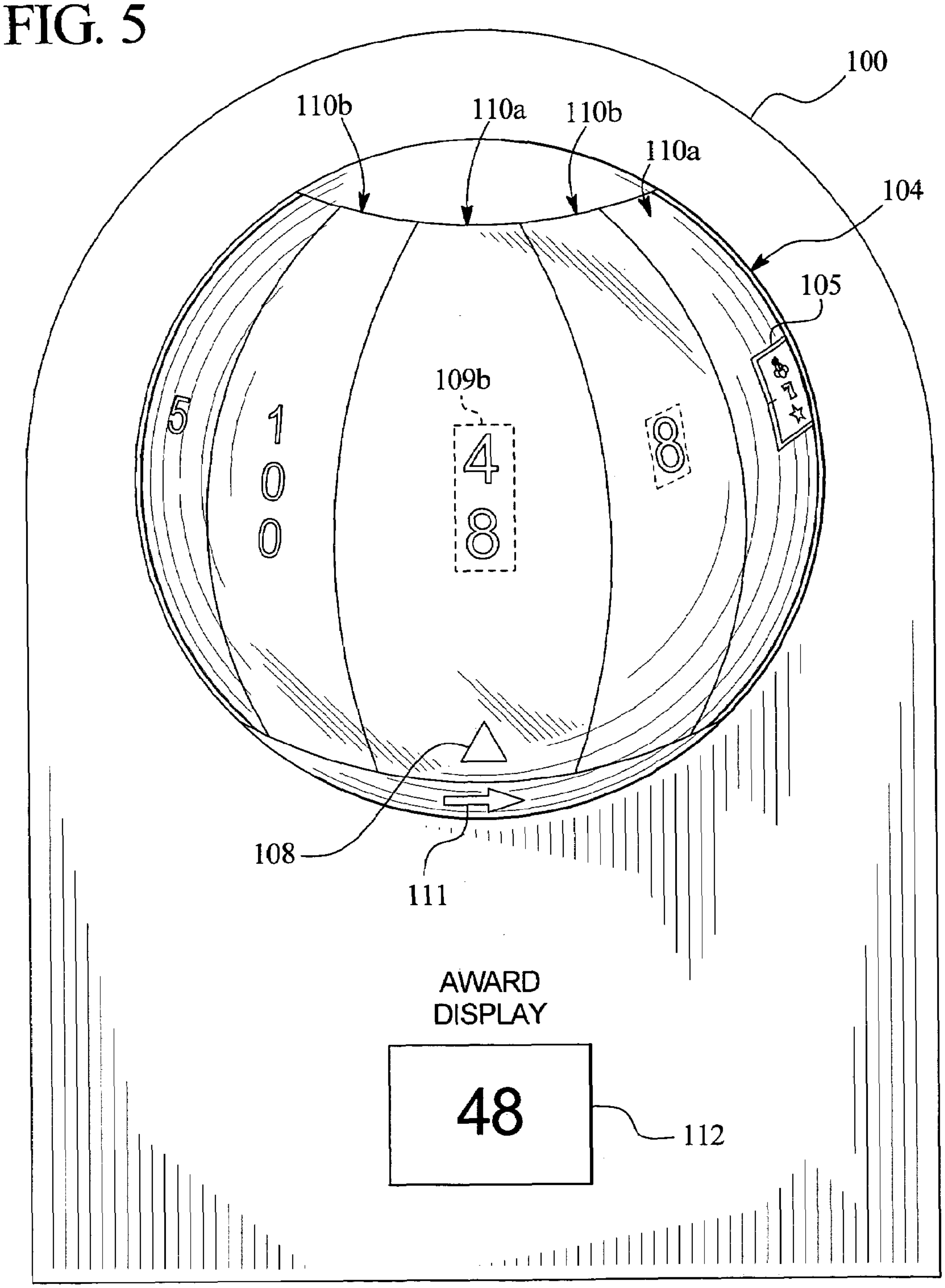
FIG. 5 is an enlarged elevation view of the alternative embodiment of FIG. 3 illustrating the section indicator indicating one of the sections including a second symbol.

Referring now to FIGS. 3, 4 and 5, one embodiment of the display device of the present invention is illustrated where the display device such as the mechanical display device 100 includes a symbol display such as a plurality of reels 106*a*, 106*b* and 106*c* which generate and display a plurality of first symbols such as the symbol 109*a* and a movable symbol indicator 102. In one embodiment, the movable symbol indicator 102 includes a plurality of sections where at least one of the sections includes a section 110*a* having a viewable area or window 105 which enables a player to view or see the symbol display such as reels 106*a*, 106*b* and 106*c*. Additionally, the sections include at least one section 110*b* having at least one second symbol 109*b*. The gaming device further includes a section indicator 108 which is mounted on the housing and indicates one of the sections of the symbol indicator 102 in one or more activations of the symbol indicator.

In one embodiment, upon a triggering event in a game, the symbol display includes a plurality of reels 106*a*, 106*b* and 106*c* which are operable to generate and display a plurality of the first symbols 109*a* such as the cherry symbol, the star symbol, the bar symbol, the orange symbol and the seven symbol. The gaming device moves or rotates the symbol indicator 102 in the direction of arrow 111. The symbol indicator stops moving or rotating and the section indicator 108 indicates one of the sections 110*a* or 110*b* of the symbol indicator. The gaming device provides an outcome such as an award based on one or more of the first symbols 109*a* when the section indicator 108 indicates the section 110*a* including the viewable area 105. Specifically, in one embodiment, as shown in FIG. 4, the gaming device provides the player with an award based on any first symbols 109*a* occurring on a payline 107 associated with any of the reels 106*a*, 106*b* and 106*c* which are visible or viewable in the viewable area 105. For example, as shown in FIG. 3, if all three of the reels 106*a*, 106*b* and 106*c* are visible or viewable in area 105 then the gaming device provides an award, if any, to the player based on the first symbols 109*a* which occur on the payline 107 such as the three seven symbols. The gaming device provides the award associated with any winning symbol combinations occurring on payline 107 associated with the reels. For example in FIG. 4, three seven symbols provides an award of two hundred fifty as indicated by award display 112. It should be appreciated that the award may be based on any winning symbol combinations occurring on the reels including one or more of the paylines associate with the reels.

In the embodiment described above, the symbol display or reels 106*a*, 106*b* and 106*c* are activated or move before the symbol indicator moves to indicate one or more of the first symbols or the second symbols in a game. In another embodiment, the symbol indicator is moves or rotates before the reels 106*a*, 106*b* and 106*c* are activated or move. For example, the symbol indicator initially rotates upon a triggering event in the game. It should be appreciated that the symbol display and/or the symbol indicator may move in any suitable direction or directions. If the section indicator indicates the section of the symbol indicator including the viewable area 105 (i.e., the symbol display or reels 106*a*, 106*b* and 106*c* are indicated by the section 110*a* including the viewable area 105), the reels are activated to display one or more of the first symbols on the reels. The gaming device then provides an award to the player based on the first symbols occurring on the reels. It should be appreciated that the symbol display and the symbol indicator may each be activated or moved for one activations, a plurality of activations or any suitable number of activations in a game or games.

Referring to FIG. 5, in one embodiment, when the section indicator 108 indicates one of the sections 110*b* on the symbol display, the gaming device provides an award to the player based on the second symbol or symbols 109*b* included on the indicated section. For example, if the section indicator indicates a section 110*a* including a second symbol 109*b* as shown in FIG. 5, the gaming device provides the player with an award associated with the indicated second symbol, which is forty-eight. It should be appreciated that the first and second symbols may be values, awards, modifiers, free games, free spins of the reels or any other suitable outcome. The present invention therefore increases a player's excitement and enjoyment by providing multiple moving components which determine the outcome or award provided to the player in the game.

In one embodiment, the mechanical display device includes a housing 100 which is connected to the top of the cabinet of the gaming device 10. In another embodiment, the mechanical display is separate from the gaming device and communicates with the processor. In this embodiment, the mechanical display is positioned to be viewable by a player.

The symbol display may be any suitable symbol display, such as the plurality of reels 106*a*, 106*b* and 106*c*, that generates and displays a plurality of first symbols to a player. It should be appreciated that the first symbols may represent values, awards, free spins, free games, game elements or any other suitable outcomes. In one embodiment, the symbol display or reels include mechanical reels. In another embodiment, the symbol display includes video reels displayed on a video display device. In the embodiment including the video reels, the video reels are displayed on a video display device which is connected to the cabinet of the gaming device. In another embodiment, the video reels are connected to a movable housing (not shown) where the housing and video reels may move in the same direction or in a different direction from the movable symbol indicator. It should be appreciated that the symbol display may be a plurality of reels, a wheel, a plurality of wheels or any other suitable symbol display.

In one embodiment, the symbol indicator 102 includes a sphere or ball which is positioned in a corresponding opening 104 in the housing 100 and is rotatably connected to the housing. It should be appreciated that the symbol display may be any suitable size or shape. In one embodiment, the symbol indicator moves or rotates generally from the left to the right as indicated by arrow 111. It should be appreciated that the symbol indicator may move from the left to the right, from the right to the left or in any suitable direction or combination of directions. The symbol indicator 102 includes a plurality of sections where at least one of the sections includes a viewable area or window 105. In one embodiment, the viewable area 105 includes an opening which corresponds to the shape and/or size of the symbol display such as the reels 106*a*, 106*b* and 106*c* as shown in FIG. 3. In another embodiment, the viewable area 105 includes a substantially transparent material that enables a player to view or see the symbol display. In one embodiment, at least one of the sections also includes at least one second symbol 109*b*. The second symbol 109*b* may represent at least one value, award, free spin, free game, game element or any other suitable outcome.

In one embodiment, the gaming device includes a section indicator 108 which indicates one or more of the sections on the symbol indicator. The section indicator 108 may be an arrow or pointer as illustrated in FIGS. 3, 4 and 5, or any other suitable indicator. It should be appreciated that the display device may include one or a plurality of section indicators. It should also be appreciated that the section indicator may be any suitable size or shape.

Figure 6:
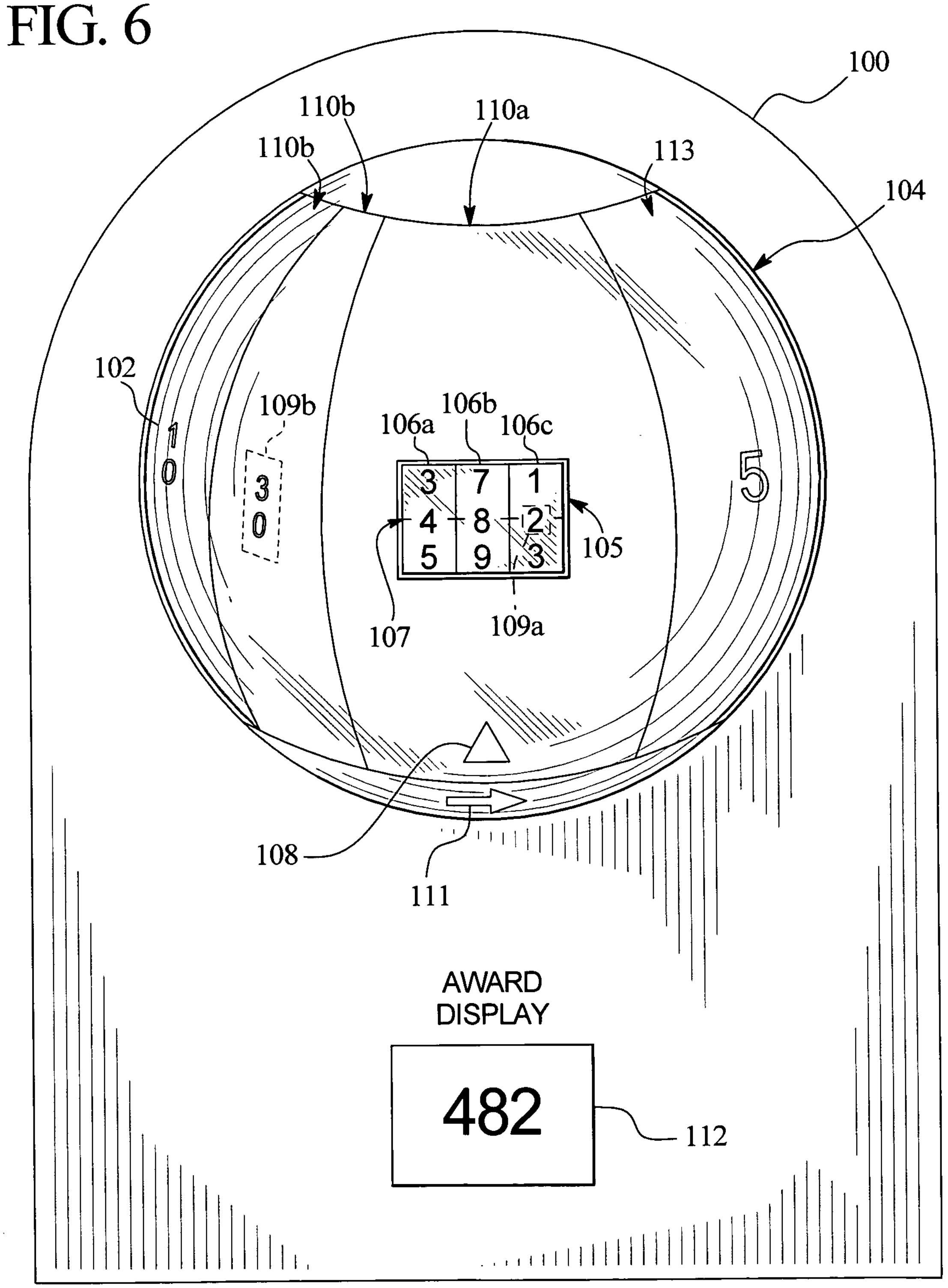
FIG. 6 is an enlarged elevation view of another alternative embodiment of the display device of the present invention illustrating a movable symbol indicator including a section having a viewable area which enables a player to view a symbol display which generates and displays a plurality of first symbols representing numbers and at least one section including a second symbol representing an award.

Referring now to FIG. 6, in another alternative embodiment, the first symbols 109*a* represent numbers or numerals. In this embodiment, upon a triggering event in a game, the plurality of reels 106*a*, 106*b* and 106*c* generate and display a plurality of the first symbols or numerals 109*a* to a player. The gaming device then moves or rotates the symbol display 102 in the direction of arrow 111. The symbol display stops moving or rotating and the section indicator 108 indicates one of the sections 110*a* or 110*b*. The gaming device provides an award based on one or more of the numerals when the section indicator 108 indicates the section 110*a* including the viewable area 105.

Specifically, as shown in FIG. 6, the gaming device provides the player with an award based on any first symbols or numerals 109*a* occurring on a payline 107 associated with any of the reels 106*a*, 106*b* and 106*c* which are visible or viewable in the viewable area 105. For example, as shown in FIG. 6, if all three of the reels 106*a*, 106*b* and 106*c* are visible or viewable in area 105 then the gaming device provides an award to the player based on the first symbols 109*a* such as numerals 4, 8 and 2 occurring on payline 107. In one embodiment, the gaming device provides an award equal to the value determined by the order of the numerals on payline 107, which in the illustrated embodiment, is four hundred eighty-two as indicated by award display 112. It should be appreciated that the award may be determined based on any combination of the viewable first symbols such as summing the first symbols occurring on payline 107, multiplying the first symbols occurring on payline 107 or combining the first symbols in any suitable manner. It should also be appreciated that the award may be determined using any of the symbols indicated on the symbol display. For example in FIG. 6, the award may be based on symbols 3, 4 and 5 occurring on reel 106*a* or any other suitable combination of the symbols on the symbol display.

If the gaming device positions the viewable area 105 of section 110*a* so that less than all of the reels 106*a*, 106*b* and 106*c* are viewable by a player in the viewable area 105, the gaming device provides an award to the player based only on the first symbols occurring on payline 107 which are viewable or visible to the player in viewable area 105. For example in FIG. 6, if only reels 106*a* and 106*b* are visible or viewable in the viewable area 105 of section 110*a* after the symbol indicator 102 stops rotating, the gaming device provides an award to the player based on the first symbols occurring on payline 107 associated with reels 106*a* and 106*b* displayed or indicated in the viewable area 105. In this example, the award includes the first symbols or numerals 4 and 8, or have a value of forty-eight. As described above, it should be appreciated that the award provided to the player may be based on any of the first symbols occurring on the reels 106*a*, 106*b* and 106*c* which are viewable or visible in the viewable area 105 after one or more activations or spins of the symbol indicator 102.

Figure 7A:
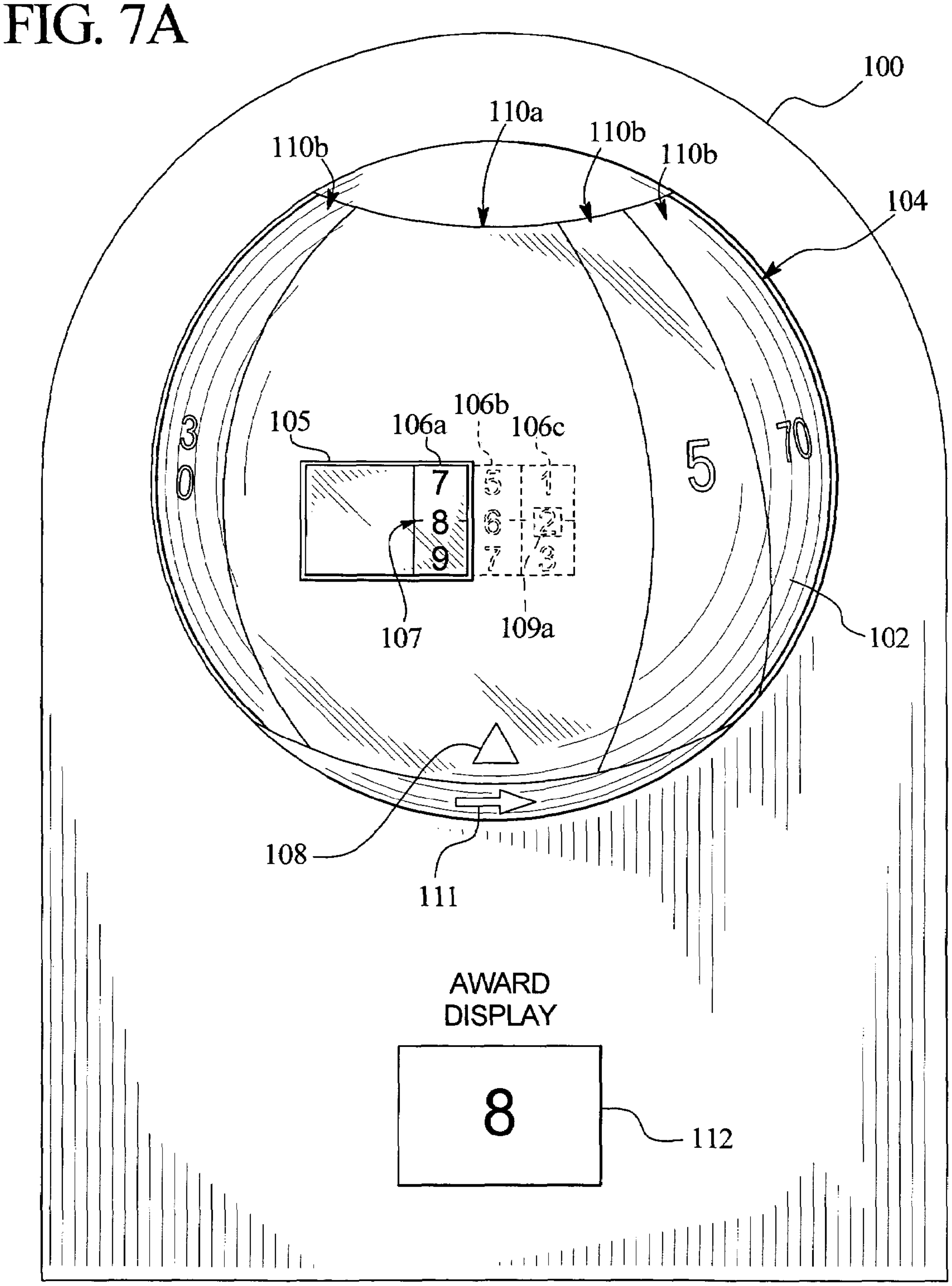
FIGS. 7A and 7B are enlarged elevation views of examples of the alternative embodiment of FIG. 6 illustrating two different ways in which the symbol indicator indicates at least one first symbol generated and displayed by the symbol display.
Figure 7B:
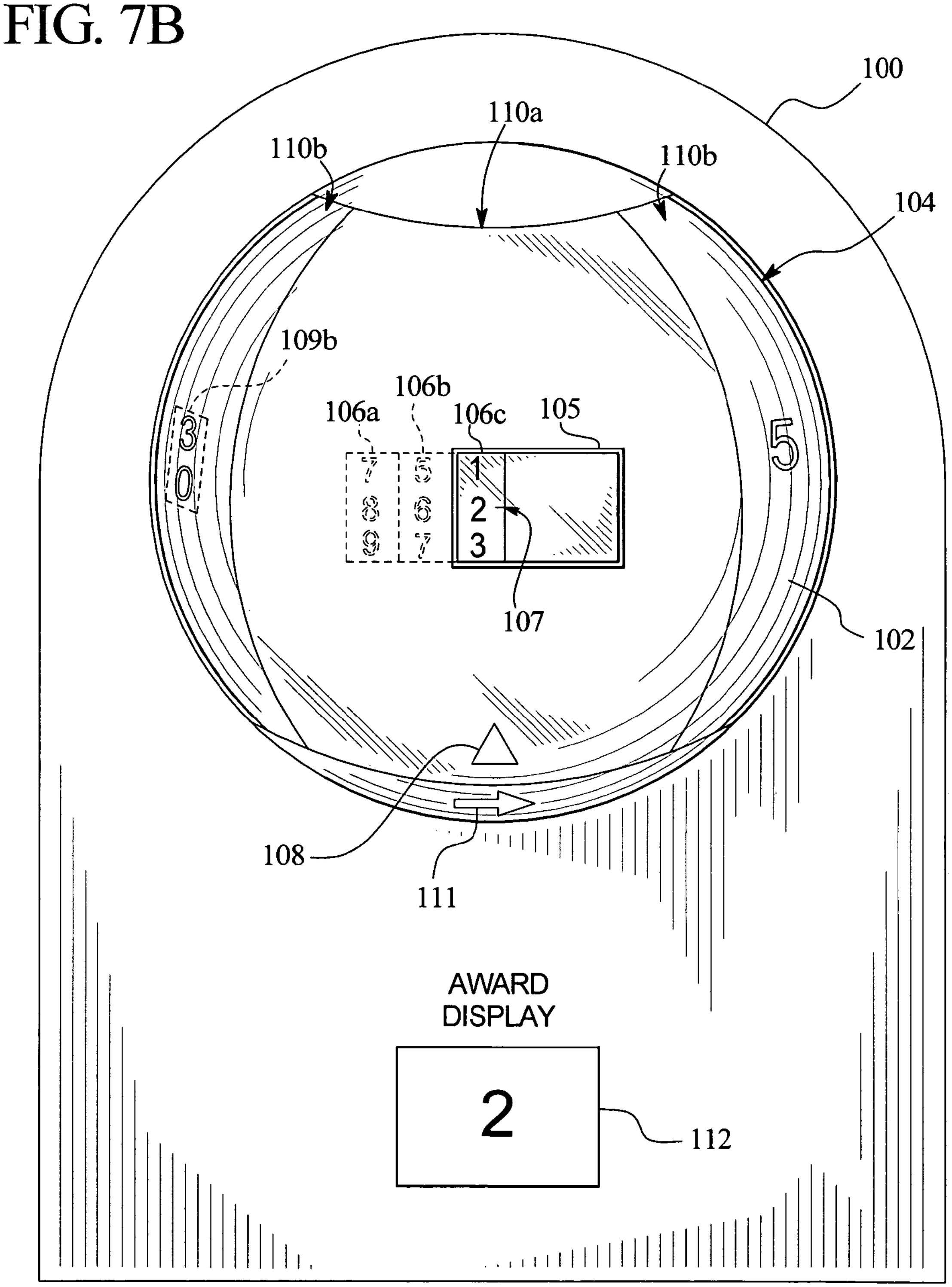

Referring now to FIGS. 7A and 7B, an example of the embodiment of FIG. 6 is illustrated where a symbol indicator 102 is rotated in a game and stops to reveal or indicate one of the reels 106*a* in section 110*a* on the symbol display. Specifically, the section 110*a* including the viewable area or window 105 stopped and positioned the viewable area 105 so that only the first reel 106*a* is viewable or visible by the player. The other two reels 106*b* and 106*c* (shown in phantom) are not visible or viewable by the player. The gaming device therefore provides the first symbol or numeral indicated on payline 107 on reel 106*a*, which is eight. The award of eight becomes the player's outcome or award in this activation or spin of the symbol indicator and this award is transferred to the award display 112.

As illustrated in FIG. 7A, the positioning of the viewable area or window 105 in part determines the outcome or award provided to the player. For example, if the viewable area or window 105 rotates and is positioned to show the entire symbol display or all three of the reels 106*a*, 106*b* and 106*c* (i.e., all of the reels are visible or viewable by the player), the gaming device provides an outcome or award based on the symbols 8, 6 and 2 indicated on payline 107. This symbol combination and specifically, the order of this symbol combination forms the outcome or award provided to the player, which is eight hundred sixty-two. Therefore, the positioning of the viewable area or window 105 provides the player with an outcome or award of eight instead of eight hundred sixty-two. As a result, the potential positioning of the viewable area or window in each activation of the symbol indicator adds excitement or enjoyment for a player in the game because the player does not know whether they will receive a relatively small award or a much larger award in the game.

Referring to FIG. 7B, another example of the embodiment of FIG. 6 is illustrated where the viewable area or window 105 rotates with section 110*a* of the symbol indicator 102 in the direction indicated by arrow 111. In this example, the section including the viewable area or window 105 stops and positions the viewable area 105 so that reel 106*c* is the only reel viewable or visible in the viewable area 105 by the player. The gaming device therefore provides an outcome or award of two based on the symbol or numeral two occurring on payline 107 associated with reel 106*c*.

The above example illustrates how the positioning of section 110*a* including the viewable area or window 105 determines in part the value or amount of the outcome or award provided to the player. For example, the viewable area or window 105 may be positioned to reveal a portion of the symbol display such as reel 106*a* or reels 106*a* and 106*b*, or the entire symbol display such as all of the reels 106*a*, 106*b* and 106*c*. Similarly, the viewable area or window 105 may be positioned to reveal reel 106*c* or reels 106*c* and 106*b*. Therefore, the particular reels and the values or symbols indicated on those reels determines the other part of the outcome or award provided to the player in the game. This adds further excitement and enjoyment to the player because the player does not know the amount or value of the award that will be provided to the player until the symbol indicator and the viewable area or window 105 stop rotating to display the symbol or symbols which indicate the symbol order which forms the outcome or award. As illustrated in FIG. 7B, the gaming device provides an award of two to the player based on the symbol or numeral two indicated on payline 107 in that activation or spin of the symbol indicator. The award of two is the outcome or award provided to the player as indicated by the award display 112.

Figure 8:
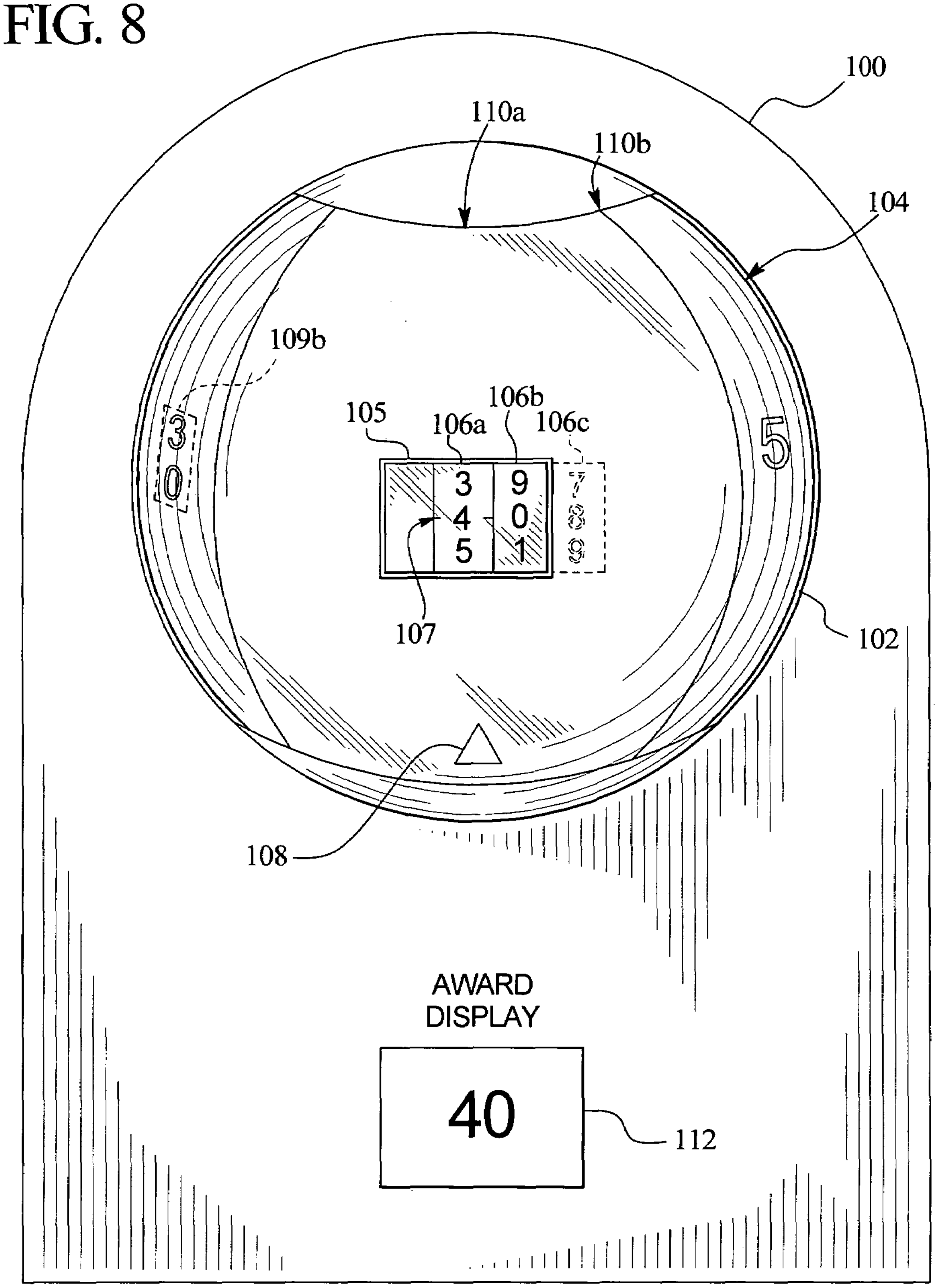
FIG. 8 is an enlarged elevation view of the alternative embodiment of FIG. 6 illustrating an example where the section indicator indicates the section including the viewable area and the viewable area reveals a portion of the symbol display.

Referring now to FIG. 8, another example of the embodiment FIG. 6 is illustrated where the symbol indicator is activated and rotated in a game. In this example, the section 110*a* including the viewable area or window 105 stops and is positioned to reveal a portion of the symbol display such as reels 106*a* and 106*b* of the plurality of reels. The symbols or numerals 4 and 0 are indicated on payline 107 in the viewable area 105 and therefore the gaming device provides an award of forty to the player. The award of forty is based on the order of the symbols such as the numerals or digits indicated on payline 107 in that activation or spin of the symbol indicator 102. As shown in FIG. 6, the gaming device would have provided an award of four hundred eight if all three of the reels were indicated or visible in the viewable area or window 105. The award of forty is provided to the player as indicated by the award display 112.

Figure 9A:
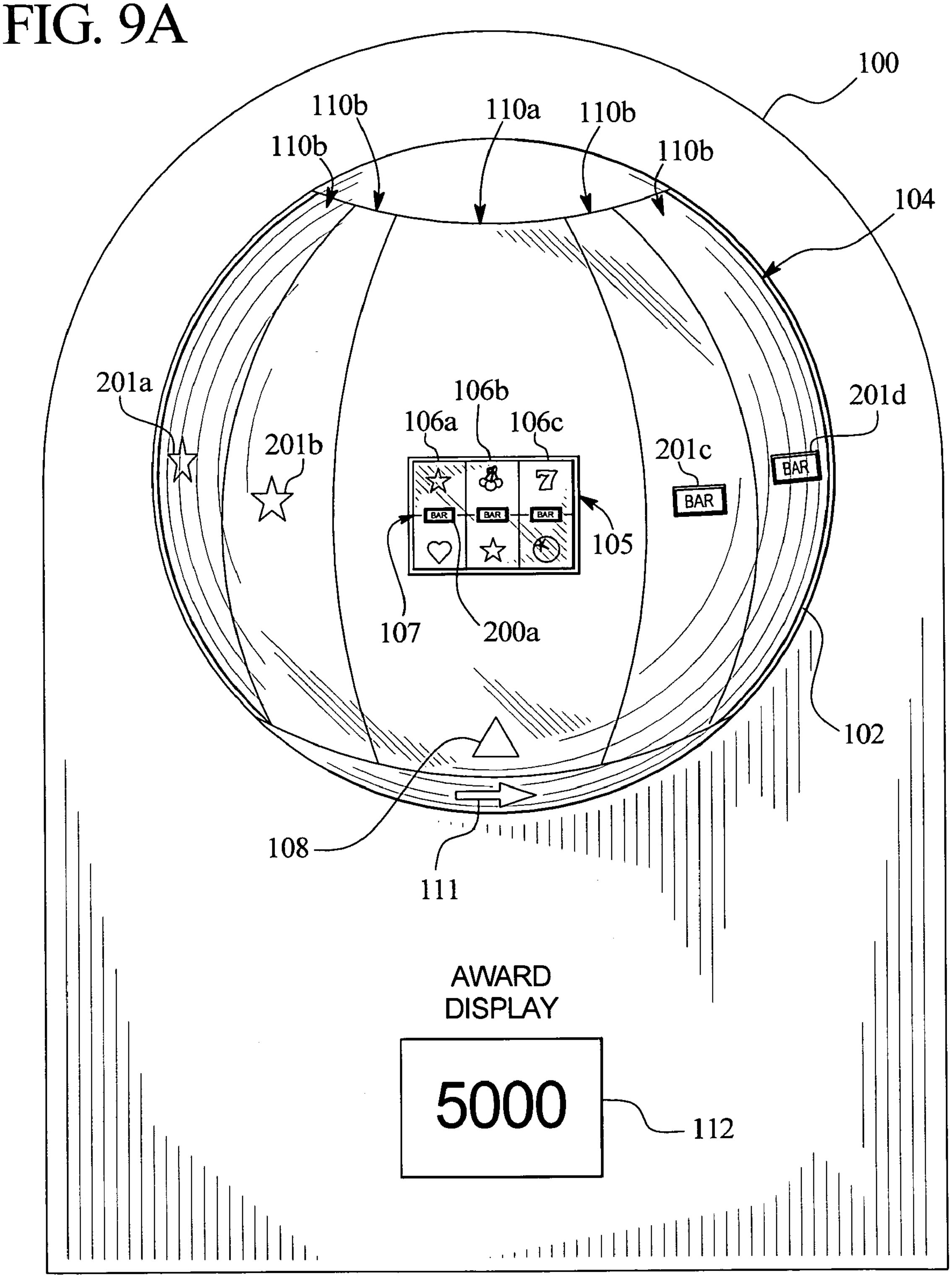
FIG. 9A is an, enlarged elevation view of a further alternative embodiment of the display device of the present invention illustrating a symbol display which generates and displays a plurality of first symbols representing game elements and a symbol indicator including sections having second symbols representing one or more of the same game elements generated and displayed by the symbol display.
Figure 9B:
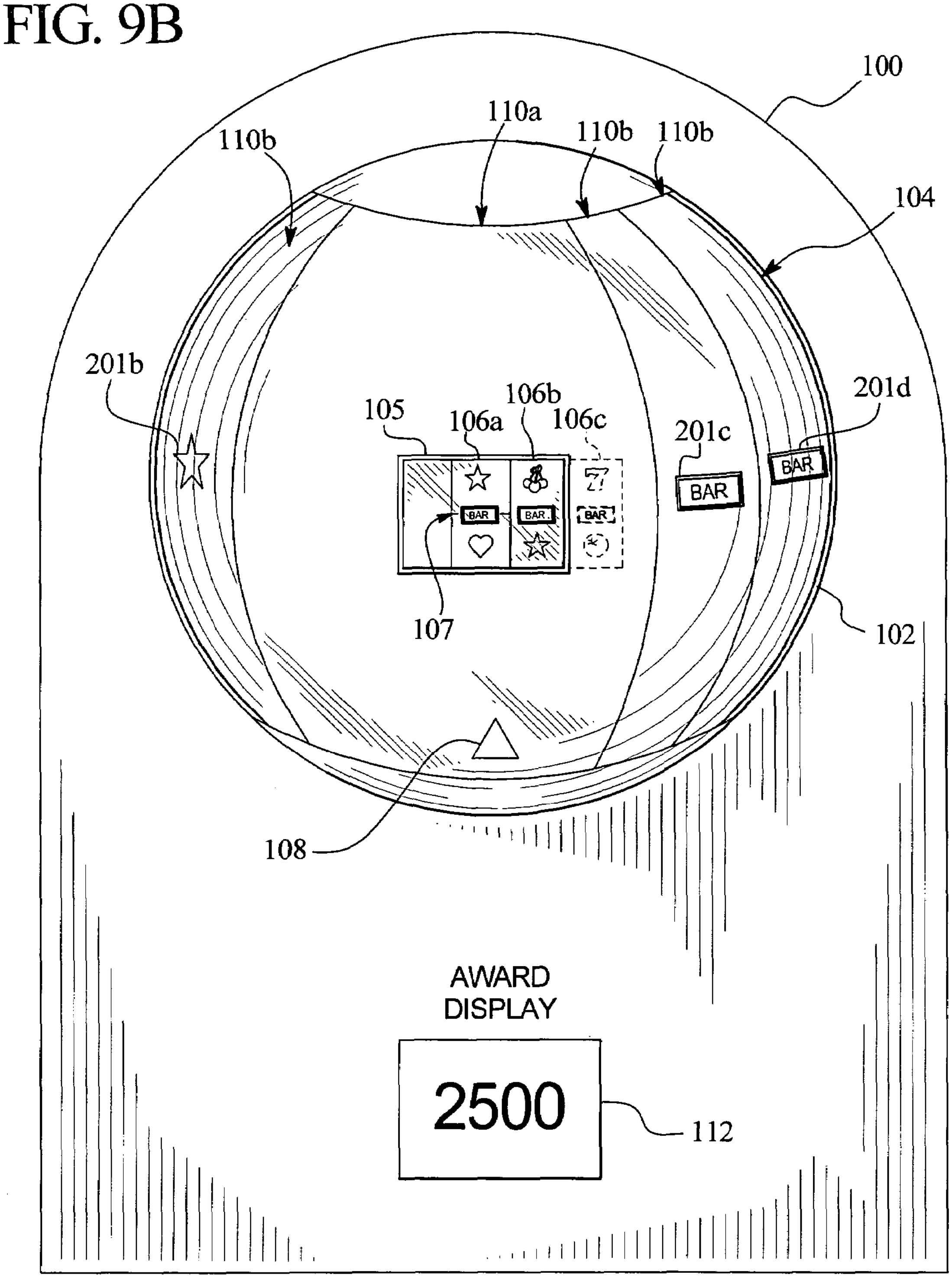
FIG. 9B is an enlarged elevation view of an example of the alternative embodiment of FIG. 9A illustrating the section indicator indicating the section of the symbol display including the viewable area and where the viewable area reveals a portion of the symbol display.

Referring to FIGS. 9A and 9B, another embodiment of the present invention is illustrated where the symbols 201 on the symbol display or reels 106*a*, 106*b* and 106*c* include symbols such as a star symbol, a cherry symbol, a bar symbol, an orange symbol, a heart symbol and a seven symbol. Additionally, the sections 110*b* include second symbols 201 which are the same as the symbols 200*a* on the reels 106*a*, 106*b* and 106*c*. Specifically, sections 110*b* include at least one of the symbols 200*a* indicated on the reels. It should be appreciated that the first symbols and the second symbols may include the same symbols or at least one different symbol in a game.

Referring to FIG. 9A, in one example, the reels are activated upon a triggering event in the game. The gaming device rotates or spins the symbol indicator in the direction indicated by the arrow 111. The symbol indicator 102 stops rotating and the section indicator 108 indicates one of the sections 110 of the symbol indicator 102. In one embodiment, the gaming device provides an outcome or award to the player for any designated winning symbol combinations including the symbols 200*a* indicated on payline 107 associated with the reels and any second symbols 201 included on sections 110*b* which are visible or viewable by the player. For example, as illustrated in FIG. 9A, when the viewable area or window 105 is positioned to reveal or indicate the entire symbol display or all of the reels 106*a*, 106*b* and 106*c*, the gaming device provides an award based on the symbol combination including the symbols 200*a* indicated on payline 107, which in this example are three bar symbols, and any of the second symbols on sections 110*b*, such as the bar symbols 201*c* and 201*d* or the star symbols 201*a* and 201*b*. In this example, the gaming device provides an award associated with the symbol combination including the three bar symbols on payline 107, and the bar symbols 201*c* and 201*d* indicated on the sections 110*b*. In this example, a symbol combination including five bar symbols provides an award of five thousand as indicated by the award display 112. In this example, the gaming device provides an outcome or award associated with any winning symbol combinations including identical symbols which are directly adjacent to each other on payline 107. It should be appreciated that the gaming device may provide an outcome or award for any winning symbol combinations indicated on the symbol display and the sections of the symbol indicator in a game.

Referring to FIG. 9B, an example of the embodiment of FIG. 9A is illustrated where the viewable area or window 105 of section 110*a* is positioned to reveal or indicate reels 106*a* and 106*b* in an activation of the symbol indicator in the game. The gaming device determines whether the first symbols indicated on payline 107 on reels 106*a* and 106*b* and any second symbols 201*b*, 201*c* and 201*d* included on sections 110*b* form a winning symbol combination in the game. In this example, the two bar symbols indicated on payline 107 and the bar symbols 201*c* and 201*d* included on the sections 110*b* form a winning symbol combination including four bar symbols in the game. The winning symbol combination including four bar symbols provides an award of two thousand five hundred as indicated by the award display 112.

As shown in FIG. 9B, the hidden or none revealed reel 106*c* also generated a first symbol which is a bar symbol. Therefore, if the viewable area or window was positioned to reveal the entire symbol display or all three of the reels 106*a*, 106*b* and 106*c*, the gaming device would of provided an award or outcome based on a symbol combination including five bar symbols as illustrated in FIG. 9A. Therefore, the positioning of the viewable area 105 was the difference between the player receiving an award of five thousand as shown in FIG. 9A and an award of two thousand five hundred as shown in FIG. 9B.

Figure 10A:
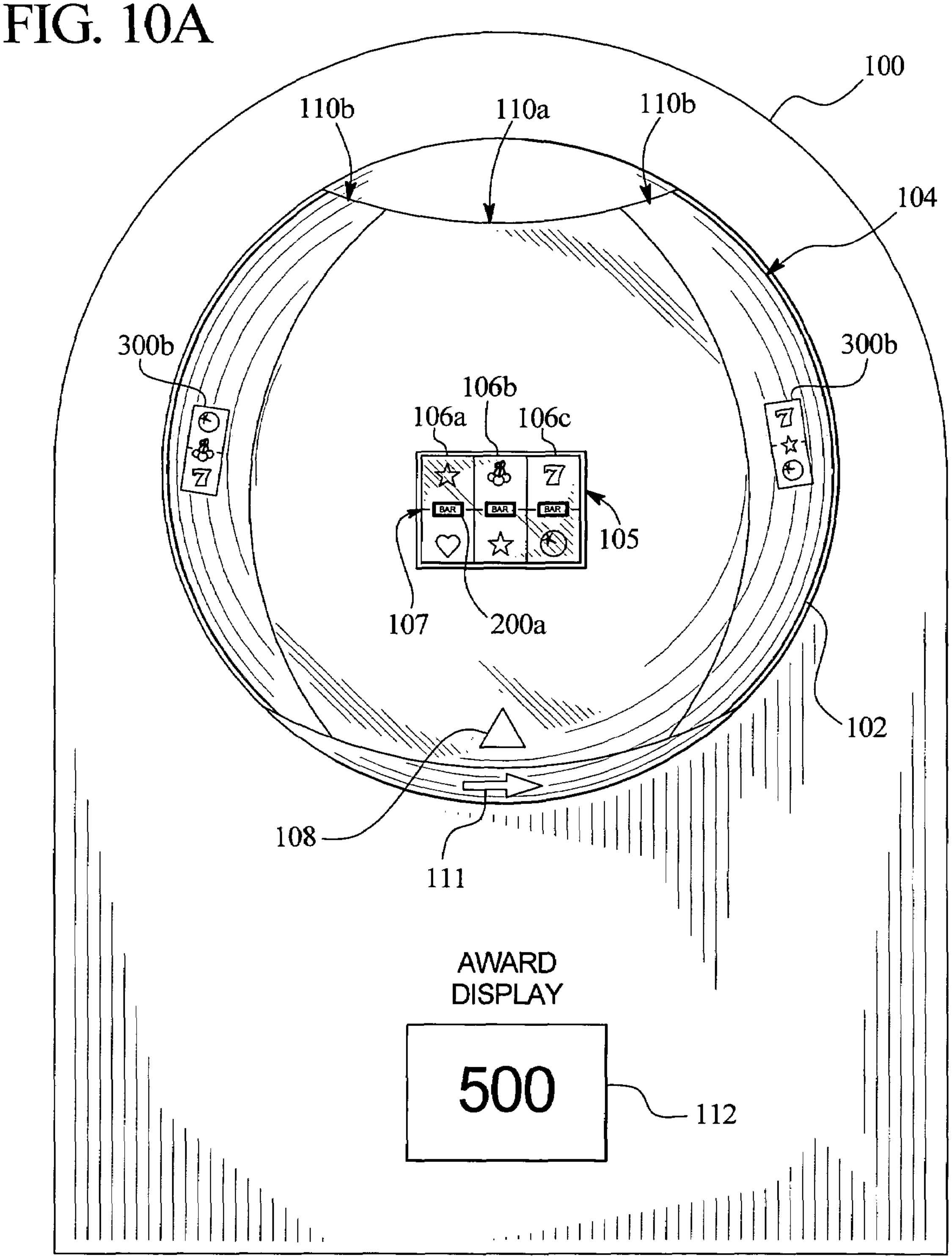
FIG. 10A is an enlarged elevation view of an alternative embodiment of the display device of FIG. 9A illustrating a symbol indicator including sections having reel strips that display a plurality of second symbols representing game elements.
Figure 10B:
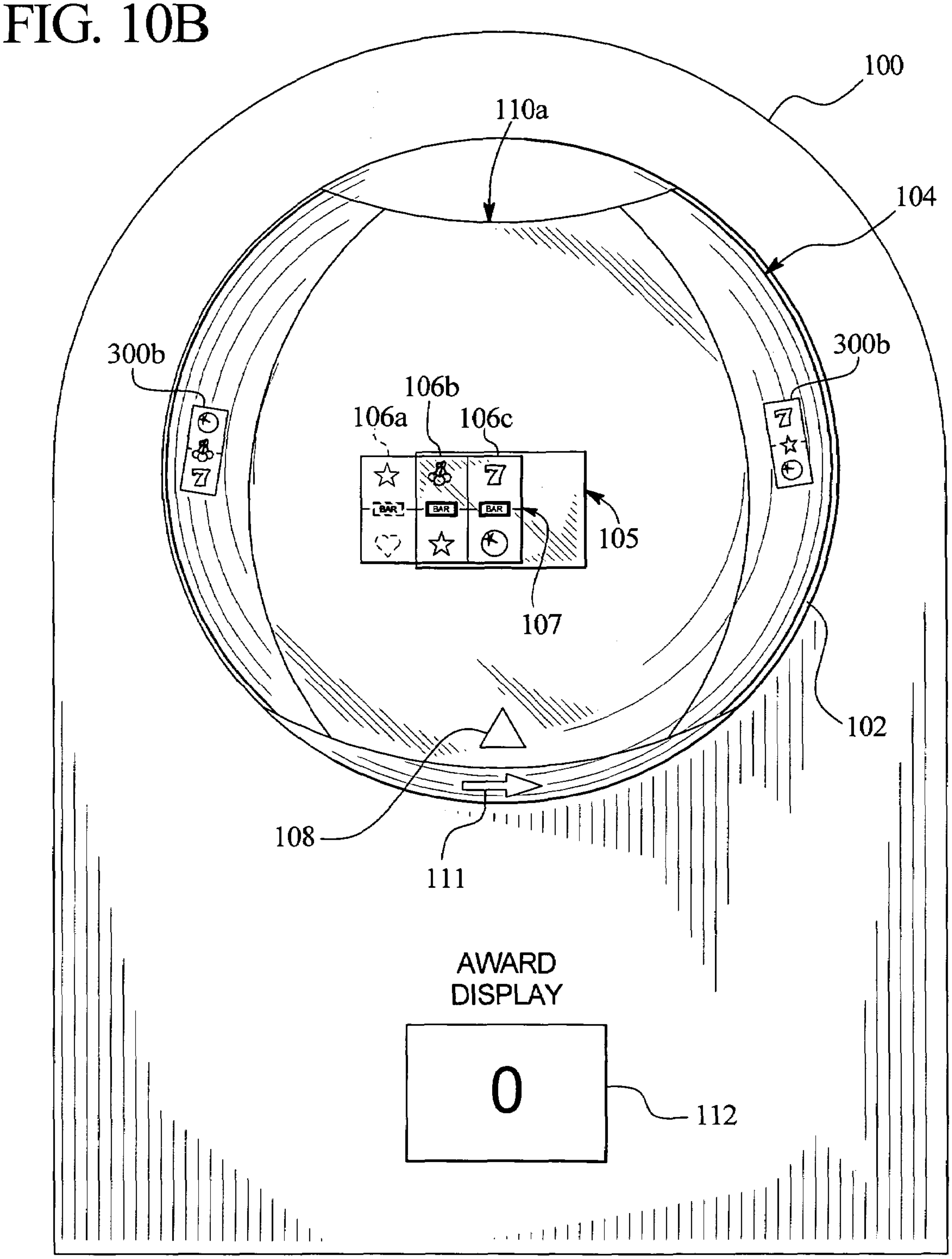
FIG. 10B is an enlarged elevation view of an example of the alternative embodiment of FIG. 10A illustrating the section indicator indicating the section of the symbol display including the viewable area and where the viewable area reveals a portion of the symbol display.

Referring to FIGS. 10A and 10B, a further alternative embodiment of the present invention is illustrated where the symbol display includes a plurality of reels 106*a*, 106*b* and 106*c* having similar symbols or game elements to the embodiment shown in FIGS. 9A and 9B. In this embodiment, the sections 110*b* include reel strips such as reel columns 300*b* including the second symbols. The second symbols included on the reel columns or reel strips 300*b* are the same as the symbols indicated on reels 106*a*, 106*b* and 106*c*.

In this embodiment, the gaming device activates or spins the symbol display or reels 106*a*, 106*b* and 106*c* upon a triggering event in the game, and then moves or rotates the symbol indicator 102 in the direction of arrow 111. The gaming device provides an outcome or award based on the first symbols indicated on payline 107 associated with reels which are visible in the viewable area 105 and any symbols associated with the reels strips or reel columns 300*b* included on sections 110*b*. For example, in FIGS. 10A, the viewable reels indicate three bar symbols on payline 107. However, the reel strips or reel columns 300*b* do not include any bar symbols on payline 107. Therefore, the gaming device provides an outcome or award based on a winning symbol combination including three bar symbols. It should be appreciated that if the reel strips 300*b* included one or more bar symbols associated with payline 107, the gaming device would have provided an award or outcome based on a winning symbol, including a combination of four or more bar symbols.

Alternatively, the gaming device may provide an award based on any symbol combinations including any of the symbols on reels 106*a*, 106*b*, 106*c* and any of the symbols on the reel columns or reel strips 300*b* in a game (i.e., a scatter pay symbol combination). Therefore, the gaming device provides an award or outcome based on any winning symbol combinations occurring on the reels (regardless of whether the symbols are on a certain payline) to the player.

Referring to FIG. 10B, an example of the alternative embodiment of FIG. 10A is illustrated where the gaming device activates the reels 106*a*, 106*b* and 106*c* upon a triggering event in a game. The gaming device then moves or rotates the symbol indicator 102. The section indicator 108 indicates section 110*a* including the viewable area or window 105. In this example, the viewable area or window 105 is positioned to reveal or indicate reels 106*b* and 106*c*. Therefore, reel 106*a* is not viewable or is hidden from the player. The gaming device determines whether the first symbols indicated on reels 106*b* and 106*c* and any symbols included on the reel strips or columns 300*b* form a designated winning symbol combination in the game. The first symbols indicated on payline 107 associated with the viewable reels 106*b*, 106*c* and the second symbols indicated on payline 107 on reels strips 300*b*, do not form a winning symbol combination because only two identical symbol are indicated on payline 107 (i.e, the two bar symbols). The gaming device therefore does not provide an award to the player in this activation as indicated by the award display 112. This example illustrates how the positioning of the viewable area 105 and the first and second symbols displayed to the player affect the outcome or award provided to a player in a game.

Alternatively, in another embodiment, the gaming device provides an award or outcome for any winning symbol combinations including any of the symbols on the viewable reels and the sections 110*b* displayed to the player. For example, the reels 106*b* and 106*c* and the reel columns or reel strips 300*b* indicate three orange symbols and three seven symbols in the game. Therefore, the gaming device provides the largest award or outcome associated with the winning symbol combinations to the player in the game. In another embodiment, the gaming device provides the outcomes or awards associated with all of the winning symbol combinations on the reels and the reels strips. It should be appreciated that the gaming device may sum, multiply or otherwise modify the awards associated with all of the winning symbol combinations occurring on the reels and provide the total award to the player in the game. It should be appreciated that the outcomes or awards associated with one or more winning symbol combinations formed by symbols on the reels and the reels strips may be provided to the player in the game.

Figure 11:
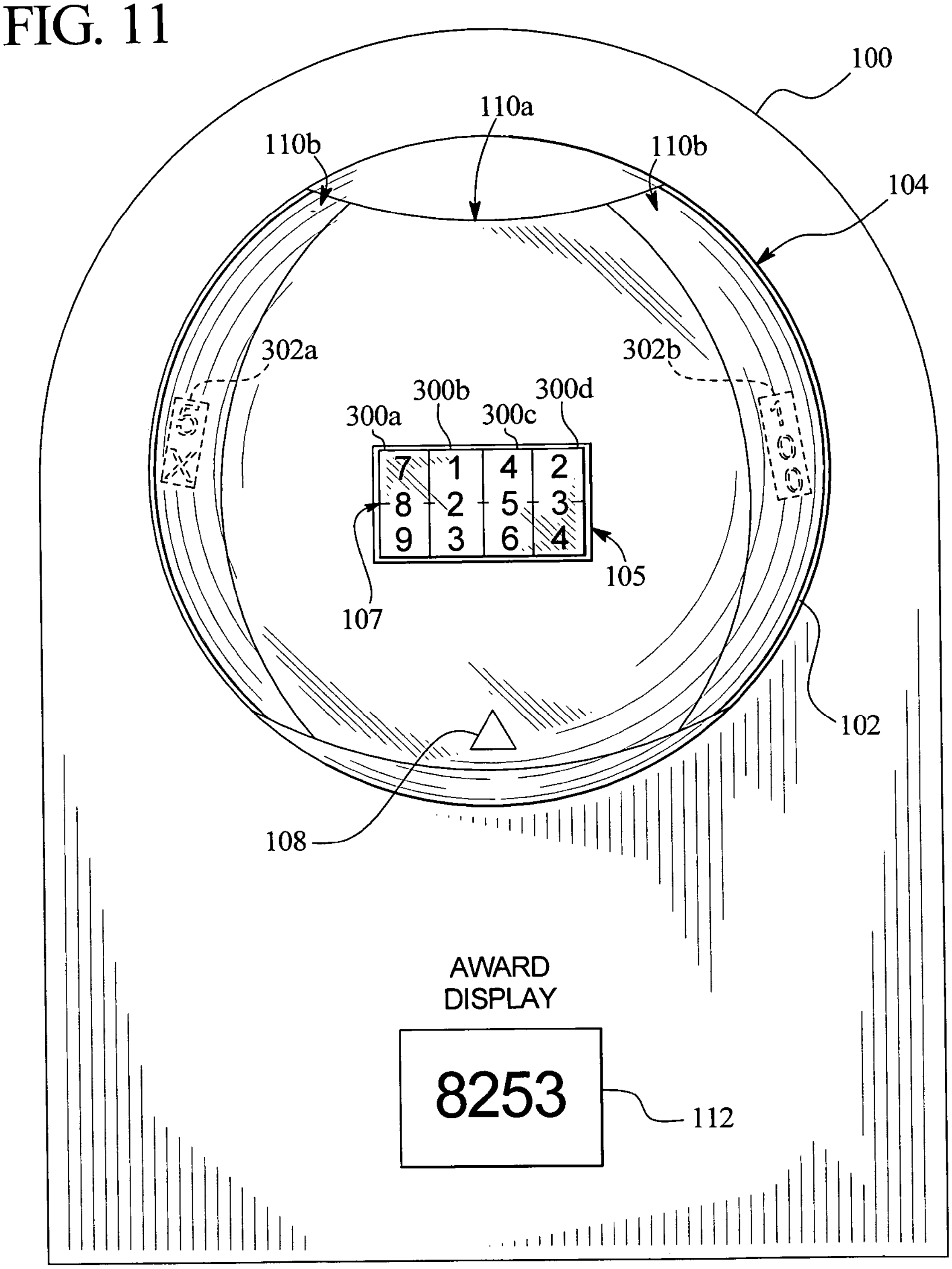
FIG. 11 is an enlarged elevation view of other alternative embodiments of the present invention where the symbol display includes four reels and the sections of the symbol indicator include at least one modifier and at least one award.

Referring to FIG. 11, another alternative embodiment of the present invention is illustrated where the symbol display includes a plurality of reels such as four reels 300*a*, 300*b*, 300*c* and 300*d*. The addition of another reel to the symbol display further increases the size or amount of the potential outcome or award in a game. For example, the outcome or award provided to the player for the first symbols or numerals indicated on payline 107 is an award formed by the numbers (in order) 8, 2, 5 and 3 or eight thousand two hundred fifty-three. This award is much larger than the award or outcome associated with a symbol display including three reels, where the largest award on these reels including similar numerals (i.e., 0 to 9) would be nine hundred ninety-nine. Therefore, the addition of one or more reels to the symbol display significantly increases the amount or size of the award or outcome provided to the player in a game. This further increases the excitement and enjoyment of the game for the player.

A further embodiment is also illustrated in FIG. 11, where the sections 110*b* include a plurality of different second symbols 302 where the second symbols represent awards or values such as the value one hundred associated with the second symbol 302*b* or modifiers or multipliers such as the multiplier 5X associated with the second symbol 302*a*. It should be appreciated that the second symbols may represent any suitable symbols, awards, values, modifiers, game elements or any other suitable award or outcomes.

Although the above embodiments generally describe a symbol indicator including one section having a viewable area or window, it should be appreciated that the symbol indicator may include one or a plurality of viewable areas or windows. In addition, in one embodiment, the viewable area or window 105 is approximately the same size and shape as the symbol display. In another embodiment, the viewable area or window 105 is wider or otherwise larger than the symbol display. In a further embodiment, the viewable area is smaller than the symbol display to only enable a player to see or view a particular portion of a symbol display. It should be appreciated that the viewable area or window 105 may be any suitable size or shape.

In one embodiment, the symbol indicator includes a plurality of sections where at least two of the sections include viewable areas or windows. In this embodiment, the viewable areas are different sizes to display a different number of symbols of the symbol display. In one embodiment, a first viewable area displays at least one symbol of the symbol display and a second viewable area displays a different number of symbols of the symbol display, where the number of symbols displayed by the second viewable area is greater than one. For example, the first viewable area displays one symbol of the symbol display and the second viewable area display three symbols of the symbol display. It should be appreciated that the viewable areas may be any suitable size or shape and may display any suitable number of symbols of the symbols display as long as the number of symbol displayed by each of the viewable areas is different.

Figure 12:
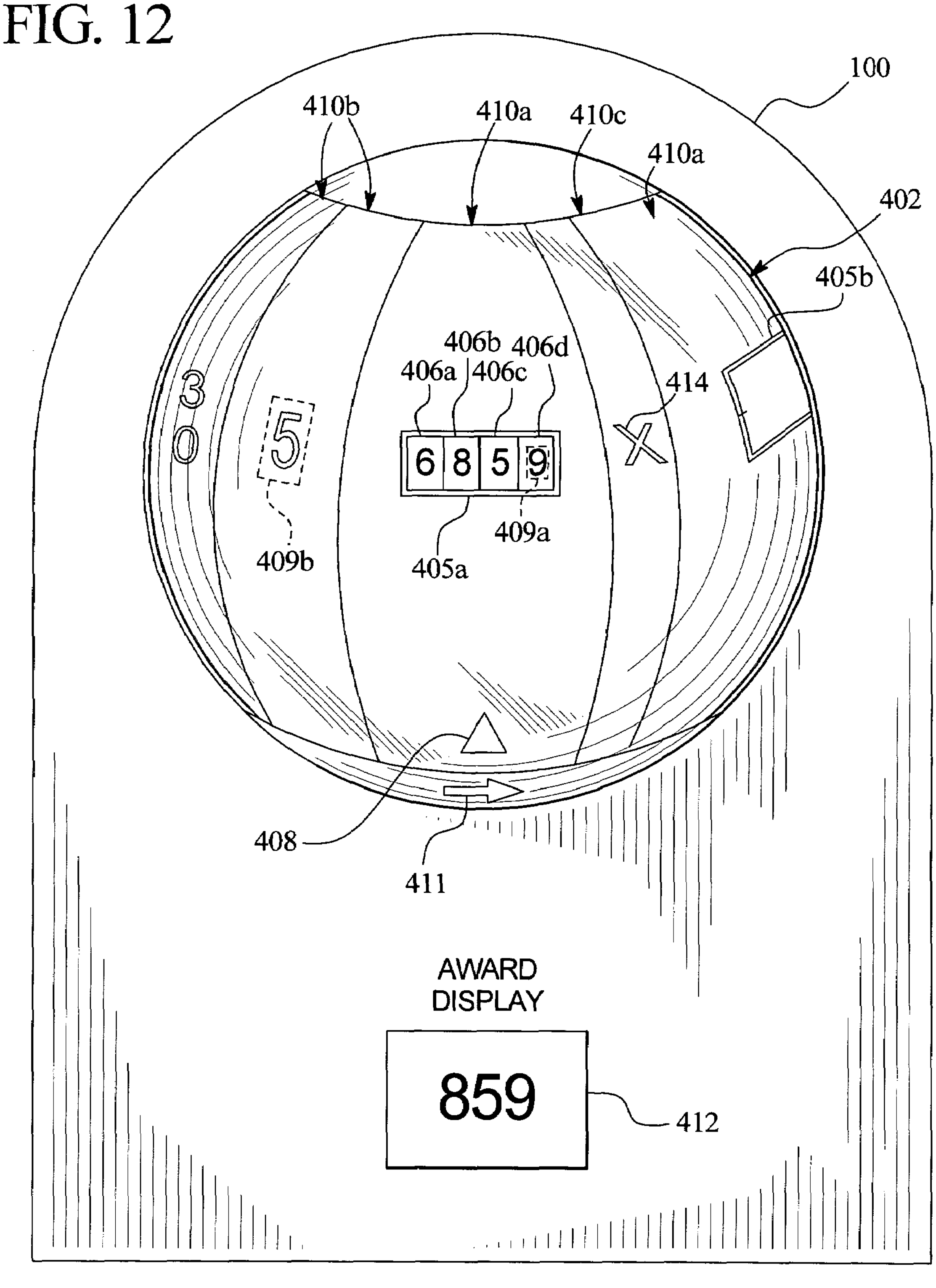
FIG. 12 is an enlarged elevation view of a further alternative embodiment of the present invention where the symbol indicator includes at least two viewable areas which are separated by a modifier.

Referring now to FIG. 12, an alternative embodiment of the present invention is illustrated where the symbol display includes a plurality of reels, 406*a*, 406*b*, 406*c* and 406*d*. The reels 406*a*, 406*b*, 406*c* and 406*d* include a plurality of first symbols 409*a* which represent numerals or numbers. The gaming device also includes a symbol indicator 402 which, in this embodiment, includes a plurality of sections such as sections 410*a*, 410*b* and 410*c*. The sections 410*a* each include a viewable area or window such as viewable areas 405*a* and 405*b*. In this embodiment, a modifier 414 such as a multiplier represented by the multiplication sign is included on a section 410*c* between the sections 410*a* including viewable areas or windows 405*a* and 405*b*. The modifier 414 modifies at least one of the first symbols visible through viewable area 405*a* and at least one of the first symbols visible through viewable area 405*b*. It should be appreciated that the modifier 414 may be a multiplication symbol, an addition symbol, a subtraction symbol, a division symbol or any suitable modifier or modifiers. Additionally, the sections 410*b* include at least one second symbol such as the outcomes or awards 409*b* indicated on those sections. A section indicator 408 indicates one or more of the sections on the symbol indicator 402 in a game. The symbol indicator 402 moves or rotates in the direction indicated by the arrow 411.

In one embodiment, upon a triggering event associated with a game, the gaming device activates or spins the reels 406*a*, 406*b*, 406*c* and 406*d* to indicate at least one first symbol 409*a* on each of those reels. The gaming device then moves or rotates the symbol indicator 402. It should be appreciated that the gaming device may move or rotate the symbol indicator 402 before activating the symbol display, may activate the symbol display before moving or rotating the symbol indicator, or activate the symbol display and move the symbol indicator 402 in any suitable order. When the symbol indicator 402 stops moving or rotating, the section indicator 408 indicates one of the sections of the symbol indicator. In this embodiment, each viewable area 405*a* or viewable area 405*b* may indicate zero, one, a plurality or all of the first symbols 409*a* generated by the symbol display in a game. For example, the viewable area 405*a* is positioned to reveal all of the numbers (i.e., first symbols) displayed by the symbol display or reels 406*a*, 406*b*, 406*c* and 406*d*. In one embodiment, the gaming device provides each player with an outcome which equals the value of the number displayed on the reels in the order that the numbers are displayed on the reels. Therefore, the gaming device provides the player with an outcome or award of six thousand eight hundred fifty-nine as indicated by the award display 412. The symbol indicator 402 may also be positioned in a game to reveal at least one first symbol 409*a* in each of the viewable areas 405*a* and 405*b* such that one or more first symbols are visible through the viewable areas 405*a* and 405*b*. Because first symbols or numbers 409*a* are indicated in each viewable area 405*a* and 405*b*, the gaming device modifies the first symbol or symbols indicated in viewable area 405*a* by the first symbol or symbols indicated in viewable area 405*b* using the modifier 414. If each section indicator 408 indicates one of the sections 410*b* including a second symbol 409*b*, the gaming device provides the outcome such as the award value of five or thirty to the player.

Figure 13A:
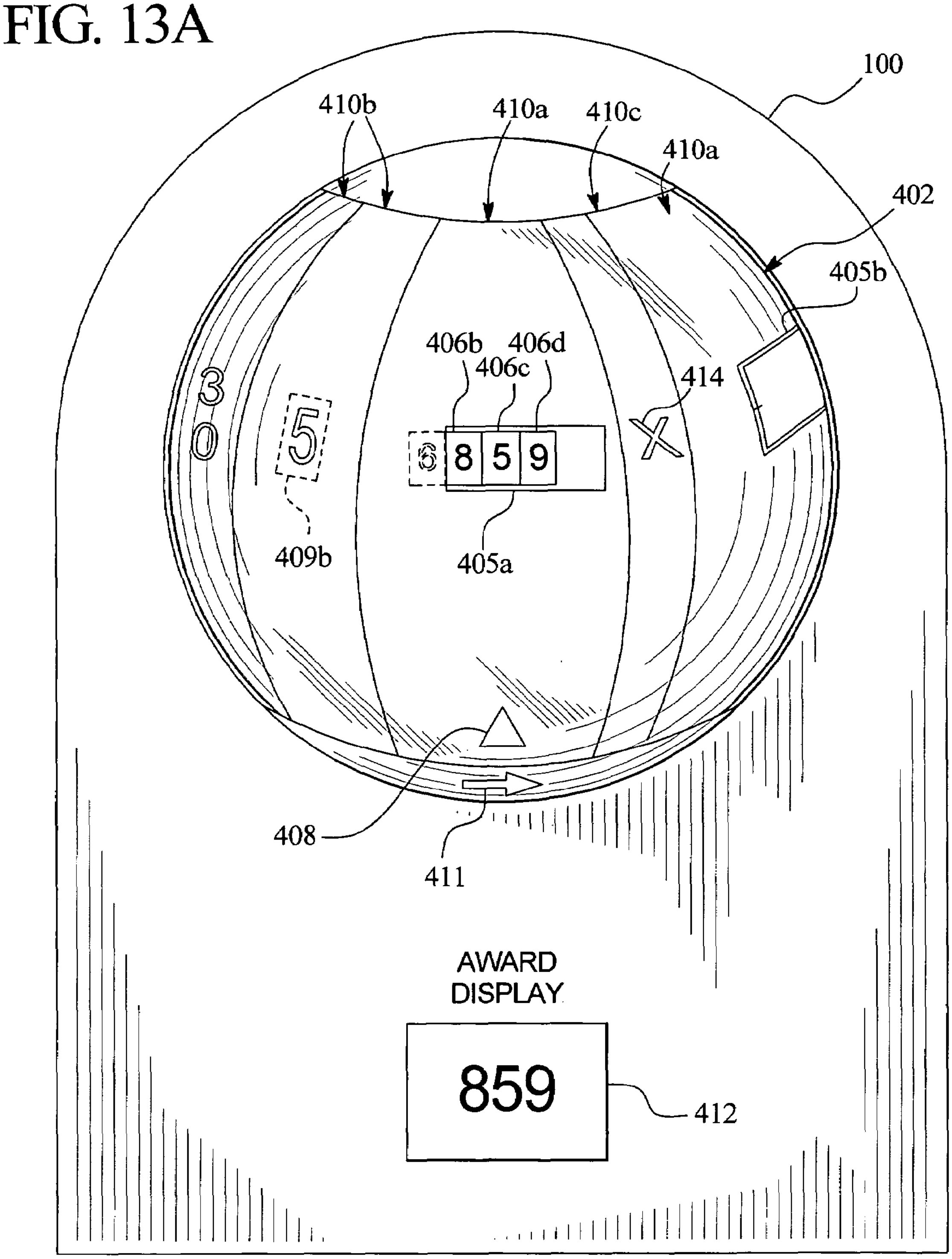
FIG. 13A is an enlarged elevation view of the embodiment of FIG. 12 where three of the first symbols are visible through one of the viewable areas of the symbol indicator.

Referring now to FIG. 13A, an example of the alternative embodiment of FIGS. 12 is illustrated where one of the sections 410*a* including viewable area 405*a* is positioned to reveal or display three of the reels 406*b*, 406*c* and 406*d*. Because at least one of the first symbols of the reels is not visible through each of the viewable areas 405*a* and 405*b*, the gaming device does not use the modifier 414 to modify the first symbols. In this example, the gaming device provides an outcome equal to the value of the number indicated on reels 406*b*, 406*c* and 406*d* which are visible through the viewable area 405*a*. The value of the number visible through the viewable area 405*a* is eight hundred fifty-nine which is provided to the player as indicated by the award display 412.

Figure 13B:
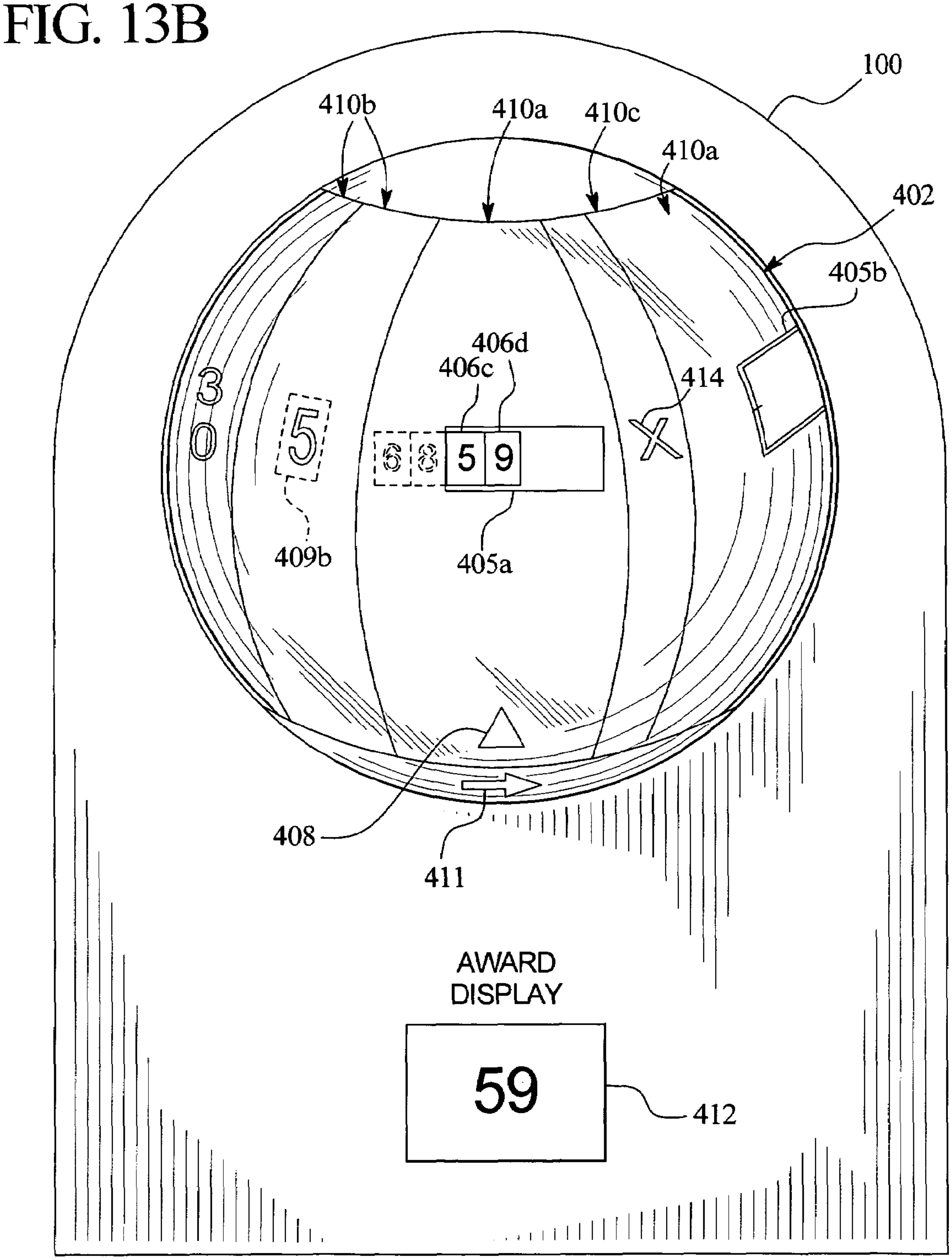
FIG. 13B is an enlarged elevation view of another example of the embodiment of FIG. 12, where two of the first symbols are visible through one of the viewable areas of the symbol indicator.

Referring now to FIG. 13B, another example of the embodiment of FIG. 12 is illustrated where the section 410*a* of the symbol indicator 402 including viewable area 405*a* is positioned to indicate or reveal the first symbols on reels 406*c* and 406*d*. Again, because at least one first symbol is not visible through each of the viewable areas 405*a* and 405*b*, the gaming device does not use the modifier 414 in this spin or activation of the symbol indicator 402. The gaming device provides the player with an outcome equal to the value of the number indicated or visible through the viewable area 405*a* which is fifty-nine. The outcome of fifty-nine is provided to the player as indicated by the award display 412. It should be appreciated that the first symbols or numbers indicated or visible through the viewable area 405*a* or the viewable area 405*b* may be added, multiplied, subtracted, or modified using any other suitable modifier or modification method.

Figure 13C:
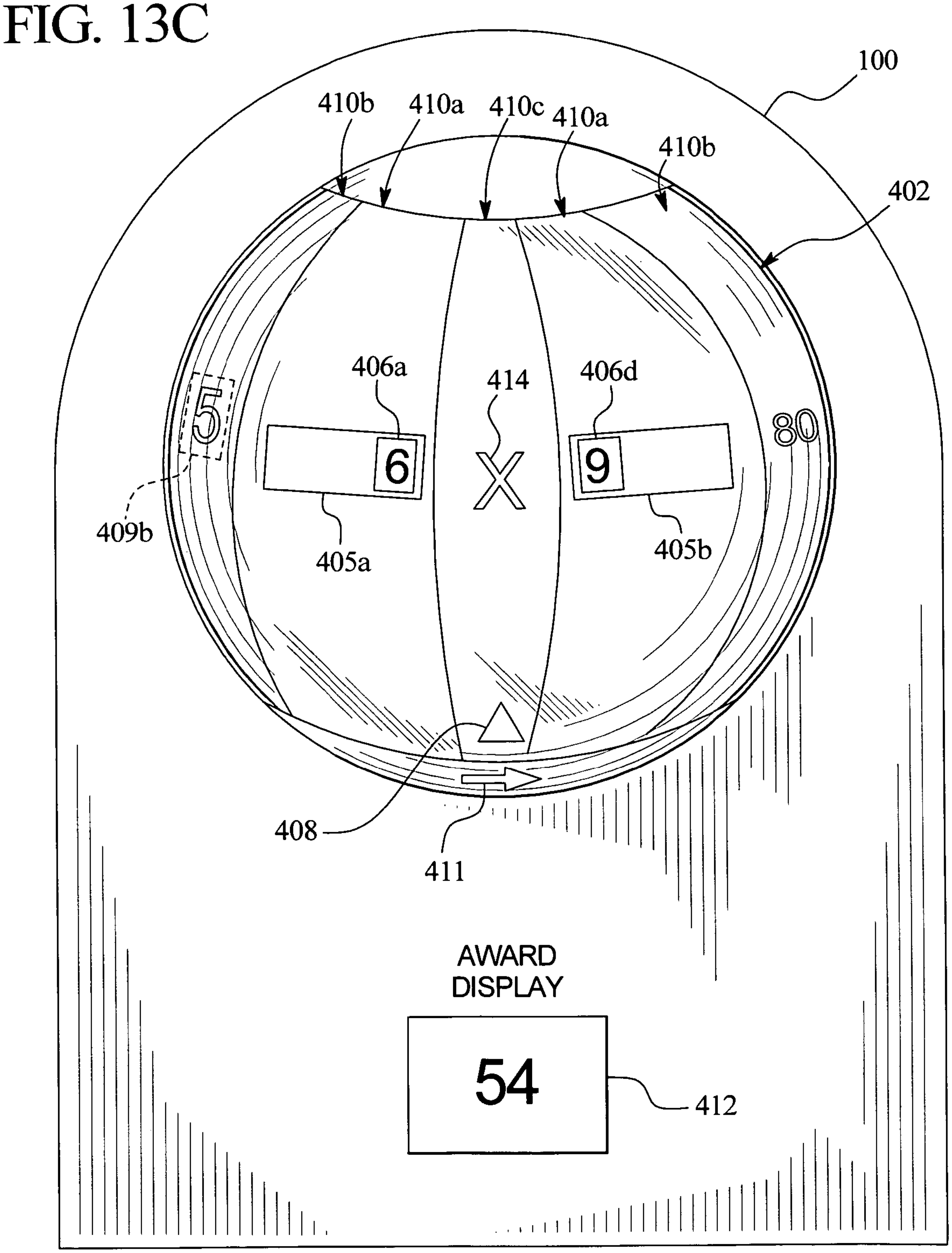
FIG. 13C is an enlarged elevation view of a further example of the embodiment of FIG. 12 where the sections including the viewable areas are positioned to each reveal at least one first symbol of the symbol display, wherein the first symbols are modified using a modifier.

Referring now to FIG. 13C, a further example of the embodiment of FIG. 12 is illustrated where the symbol indicator moves and positions the section 410*a* including the viewable areas 405*a* and 405*b* to reveal one first symbol on each of the reels 406*a* and 406*d*. Because at least one first symbol is visible through each of the viewable areas 405*a* and 405*b*, the gaming device uses the modifier 414 which is indicated by the section indicator 408, to modify the first symbols visible through the viewable areas 405*a* and 405*b*. As a result, the gaming device provides an outcome to the player which equals the first symbol on reel 406*a* multiplied by the first symbol visible through or indicated by the viewable area 405*b*. Therefore, the number six is multiplied by the number nine to provide the player with an outcome or award of fifty-four as indicated by the award display 412. Alternatively, if the modifier was an addition symbol, the gaming device would add the number six to the number nine to provide the player with an outcome or award of fifteen. This embodiment further increases a player's excitement and enjoyment of the game because the modifier changes, such as increases or decreases, a player's award in the game.

Figure 13D:
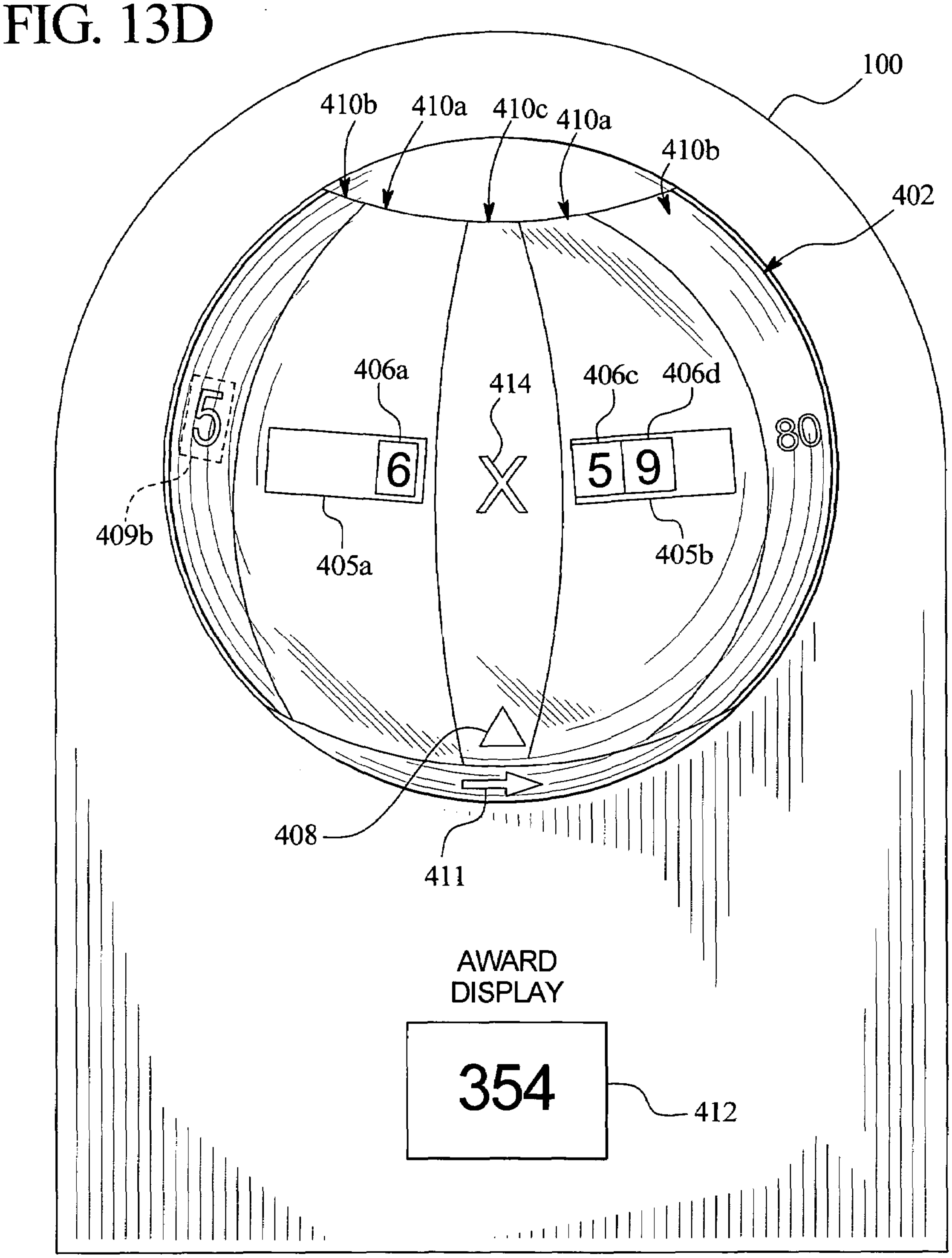
FIG. 13D is an enlarged elevation view of another example of the embodiment of FIG. 12 where the sections including one of the viewable areas is positioned to reveal at least one of the first symbols of the symbol display and the section including the other viewable area is positioned to reveal a plurality of the first symbol of the symbols display, wherein the first symbols revealed by the viewable areas are modified using a modifier.

Referring now to FIG. 13D, another example of the embodiment of FIG. 12 is illustrated where the symbol indicator includes sections 410*a* having viewable areas 405*a* and 405*b* to reveal one or a plurality of the first symbols on the symbol display. Because at least one first symbol is visible through each of the viewable areas 405*a* and 405*b*, the gaming device employs the modifier 414 to modify any award associated with the first symbols viewable through the viewable areas. In this example, the viewable area 405*a* displays one first symbol 406*a* which is the number six. The second viewable area 405*b* is positioned to display a plurality of the first symbols of the symbol display or reels 406 such as the first symbols five and nine on reels 406*c* and 406*d*, respectively. The gaming device therefore provides an outcome to the player which equals the first symbol on reel 406*a* (i.e., six) multiplied by the combination of the first symbols visible through or indicated by the viewable area 405*b* (i.e., fifty-nine). Thus, the number six is multiplied by the number fifty-nine to provide the player with an outcome or award of three hundred fifty-four as indicated by the award display 412. It should be appreciated that when a plurality of first symbols are viewable through a viewable area such as viewable area 405*b*, the first symbols may be combined to form one number such as the number fifty-nine, added together (i.e., sixteen), multiplied together (i.e., forty-five) or combined in any suitable manner. This embodiment increases players' excitement and enjoyment of the game because a player obtains a larger award when a plurality of the first symbols are viewable in one or more of the viewable areas.

Figure 14:
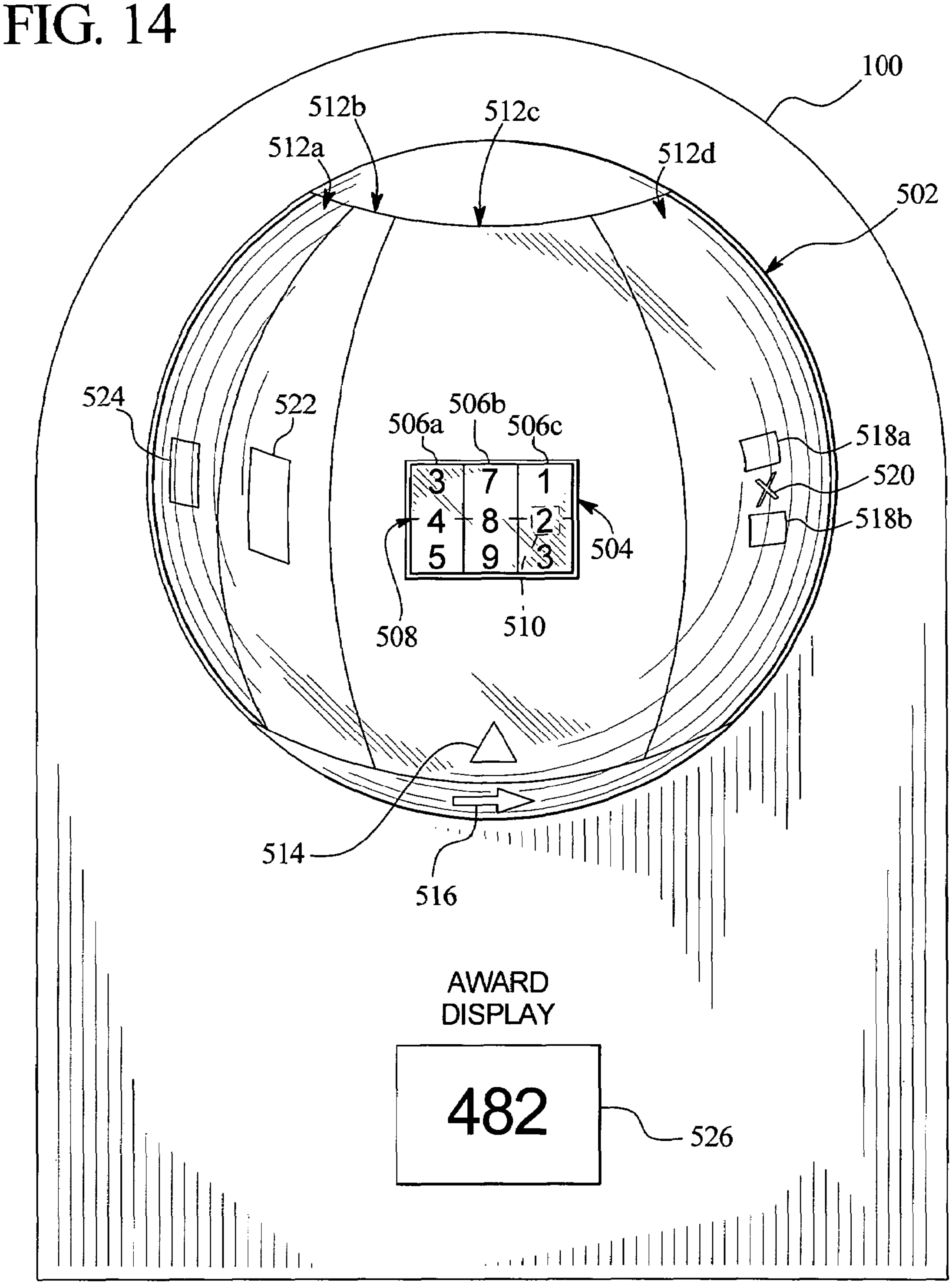
FIG. 14 is an enlarged elevation view of another alternative embodiment of the present invention where the symbol indicator includes different vertically positioned viewable areas

Referring now to FIG. 14, another alternative embodiment of the present invention is illustrated where a symbol display includes a plurality of reels 506*a*, 506*b*, and 506*c*. The reels 506*a*, 506*b*, 506*c* include a plurality of first symbols 510 which represents numerals or numbers. The gaming device also includes a symbol indicator 502 which includes a plurality sections such as sections 512*a*, 512*b*, 512*c* and 512*d*. In this alternative embodiment, the sections include different sized viewable areas and multiple viewable areas in a single section. For example, section 512*a* includes a viewable area 524 which displays at least two of the first symbols of one of the reels 506 of the symbol display 504. Section 512*b* includes viewable area 522 which displays or otherwise indicates all of the symbols displayed by one of the reels 506 of the symbols display 504. The symbol indicator 502 also includes at least one section 512*d* which has a plurality of viewable areas in a single section such as viewable areas 518*a* and 518*b*. In this embodiment, the section 512*d* also includes a modifier such as a multiplier 520 which modifies or multiplies the numerals or numbers visible through the viewable areas 518*a* and 518*b* when section 512*d* is indicated by section indicator 514. It should be appreciated that the section including the plurality of viewable areas may or may not include a modifier such as the multiplier 520. It should also be appreciated that the numbers or numerals visible through the viewable areas 518*a* and 518*b* may be combined such as added, multiplied or modified in any suitable manner. It should further be appreciated that a section 512 may include one or more viewable areas. Section 512*c* includes a viewable area 504 which displays at least a portion of the reels 506*a*, 506*b* and 506*c*. A payline 508 is associated with the reels. In a play of the game, the symbol indicator 502 moves or rotates in the direction indicated by the arrow 516. An award display 526 displays or indicates the award provided to the player in the play of the game. This alternative embodiment creates an added excitement and enjoyment for players because the players may obtain multiple awards and a much larger award in each play of the game.

Figure 15A:
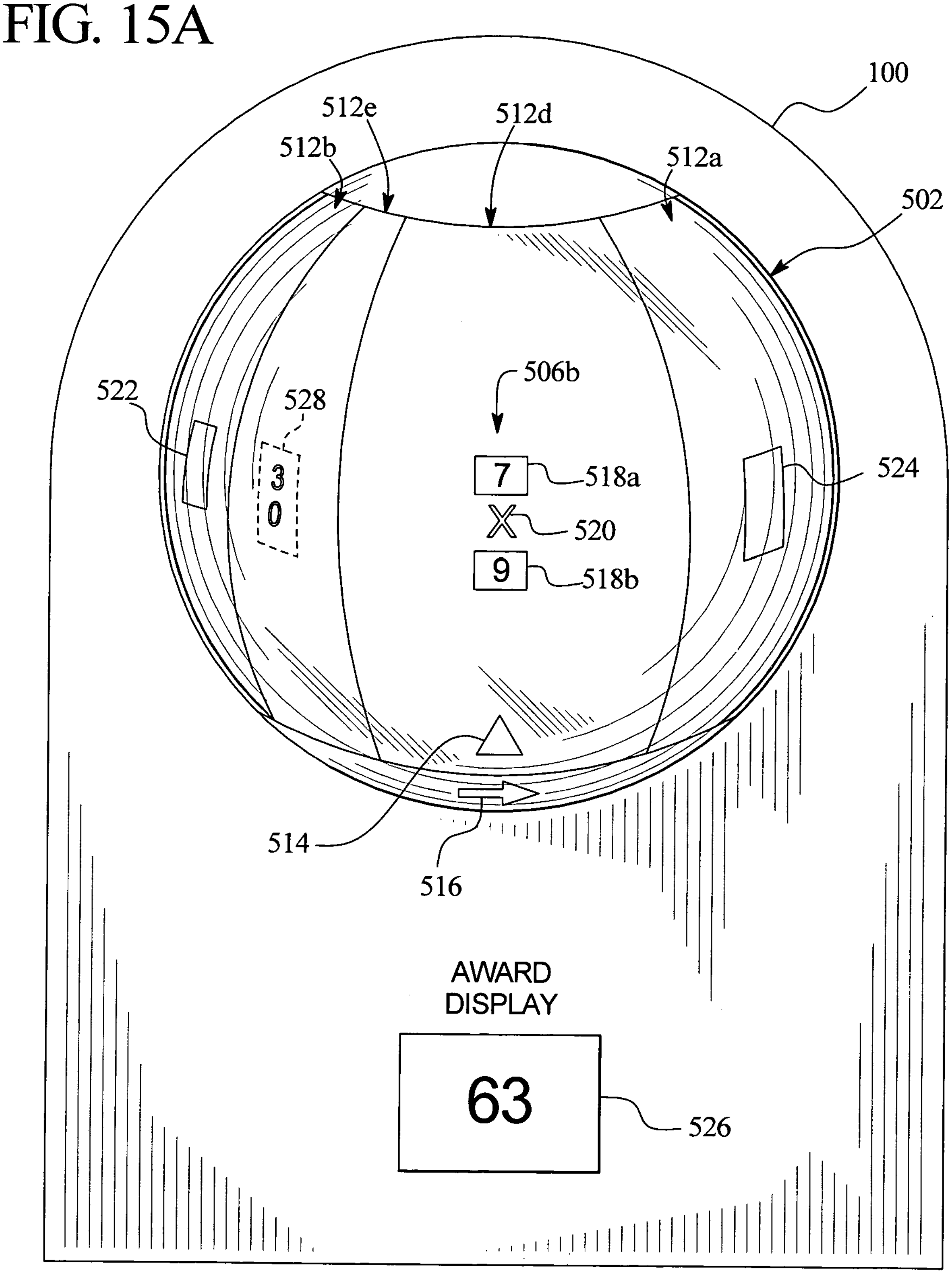
FIG. 15A is an enlarged elevation view of an example of the embodiment of FIG. 14 where different viewable areas in one section are positioned to each reveal at least one first symbol of the symbol display, wherein the first symbols are modified using a modifier.

Referring now to FIG. 15A, an example of the embodiment of FIG. 14 is illustrated where the section 512*d* including the plurality of viewable areas 518*a* and 518*b* is indicated in a play of the game. The symbol indicator is positioned to display at least two of the first symbols of reel 506*b*. A first symbol, which represents the number seven, is visible through the first viewable area 518*a*. A second symbol, which represents the number nine, is viewable or visible through the second viewable area 518*b*. The first symbols viewable through viewable areas 518*a* and 518*b* are modified by the multiplier 520. Therefore, the gaming device provides an award of sixty-three to the player in this play of this game. The award of sixty-three is indicated by the award display of 526.

Figure 15B:
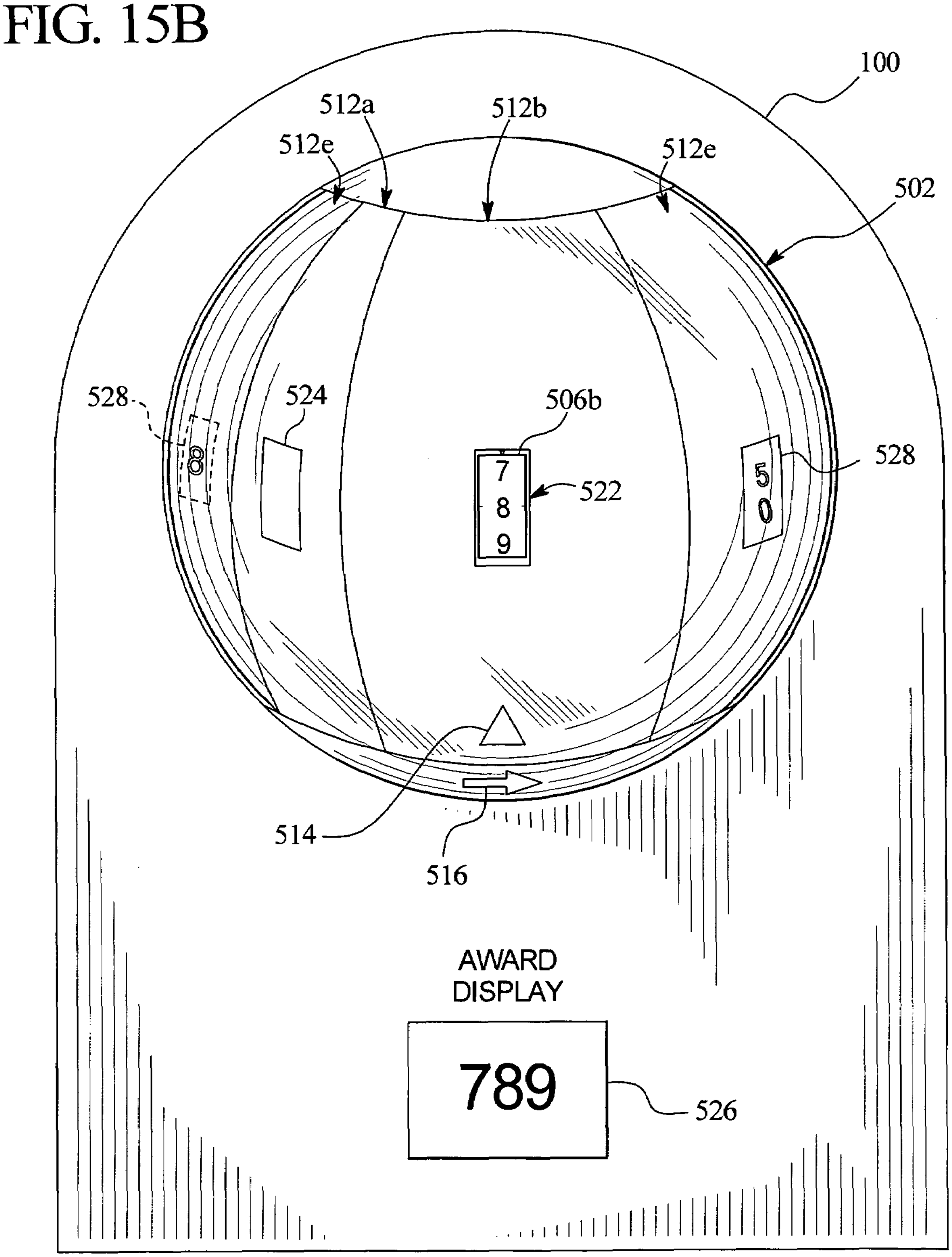
FIG. 15B is an enlarged elevation view of another example of the embodiment of FIG. 14 where a section including one of the viewable areas is positioned to reveal three of the first symbols of the symbol display.

Referring now to FIG. 15B, another example of the alternative embodiment of FIG. 14 is illustrated where the section of 512*b* including viewable area 522 is indicated by section indicator 514. The viewable area 522 displays all of the first symbols displayed by one of the reels such as reel 506*b*. In this example, the gaming device provides an award which is formed by the numbers seven, eight and nine in the order displayed by reel 506*b*. The award of seven hundred eighty-nine is transferred to the award display 526. It should be appreciated that the award may be formed using any suitable order or combination of the symbols or numbers displayed or visible through the viewable area 522. For example, the numbers may be added together to provide an award of twenty-four.

Figure 15C:
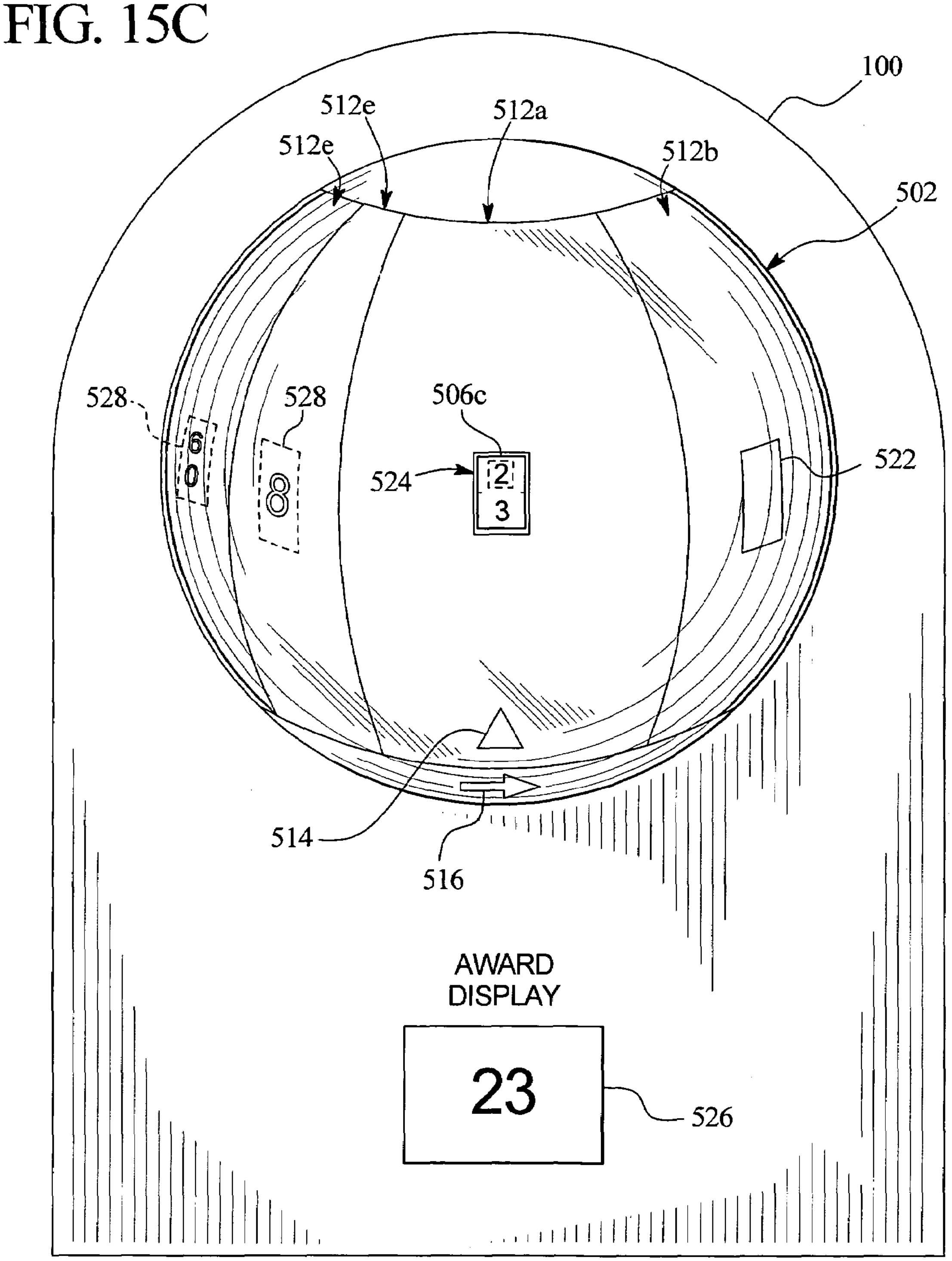
FIG. 15C is an enlarged elevation view of a further example of the embodiment of FIG. 14 where a section including one of the viewable areas is positioned to reveal two of the first symbols of the symbol display.

Referring now to FIG. 15C, a further example of the alternative embodiment of FIG. 14 is illustrated where the section 512*a* is indicated by the section indicator 514. Section 512*a* includes viewable area 524 which displays two of the first symbols on any one of the reels 506 such as reel 506*c*. Similar to the award provided in FIG. 15B, the award provided to the player is formed by the numbers displayed by or visible through the viewable area 524. Thus, an award of twenty-three is transferred to the award display 526. It should be appreciated that any suitable combination or number may be formed using the first symbols visible through the viewable area 524. The outcome or award provided in a play of the game therefore depends on the position of the viewable area 524 in relation to the reels 506. If the viewable area 524 were positioned over a different reel 506, the award provided to the player would be different. Therefore the present alternative embodiment provides excitement and enjoyment for players because the player does not know the value of the award that would be provided to the player in a play of the game until the symbol indicator 502 stops moving and indicates one of the sections 512.

Concentric Reels Having Different Viewable Areas

Figure 16A:
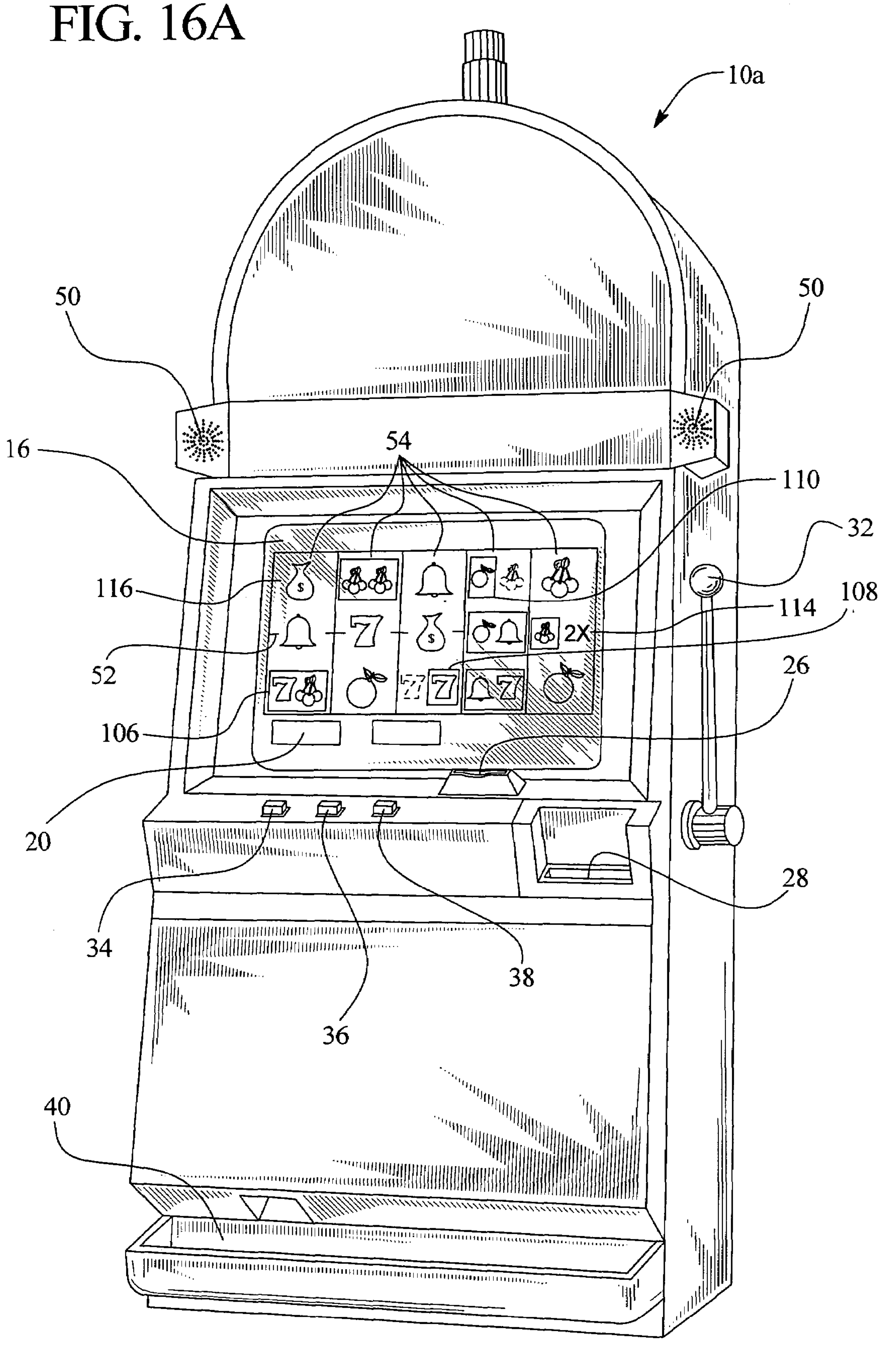
FIG. 16A is a perspective view of another embodiment of the gaming device of the present invention.
Figure 16B:
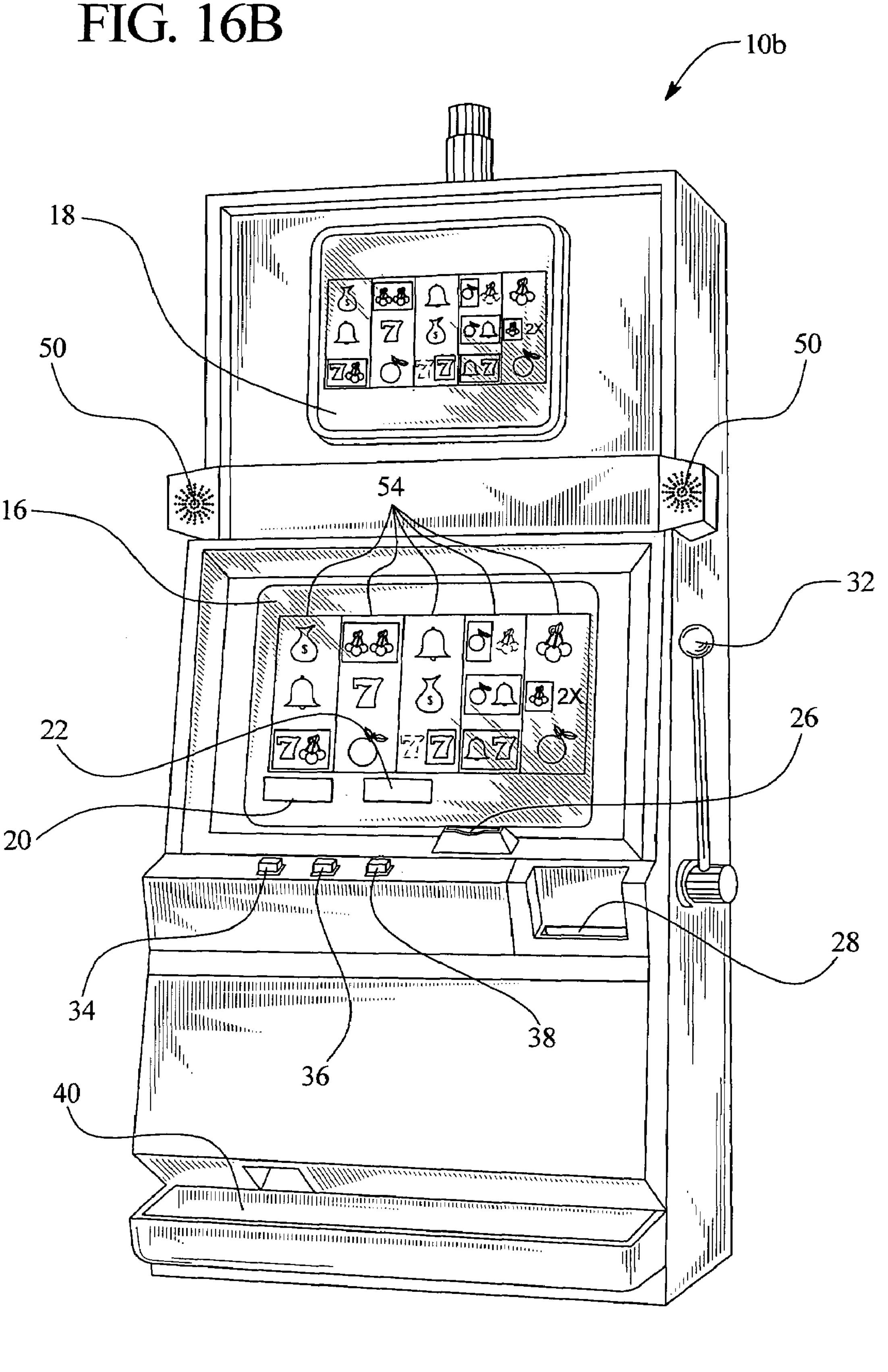
FIG. 16B is a perspective view of a further embodiment of the gaming device of the present invention.
Figure 17A:
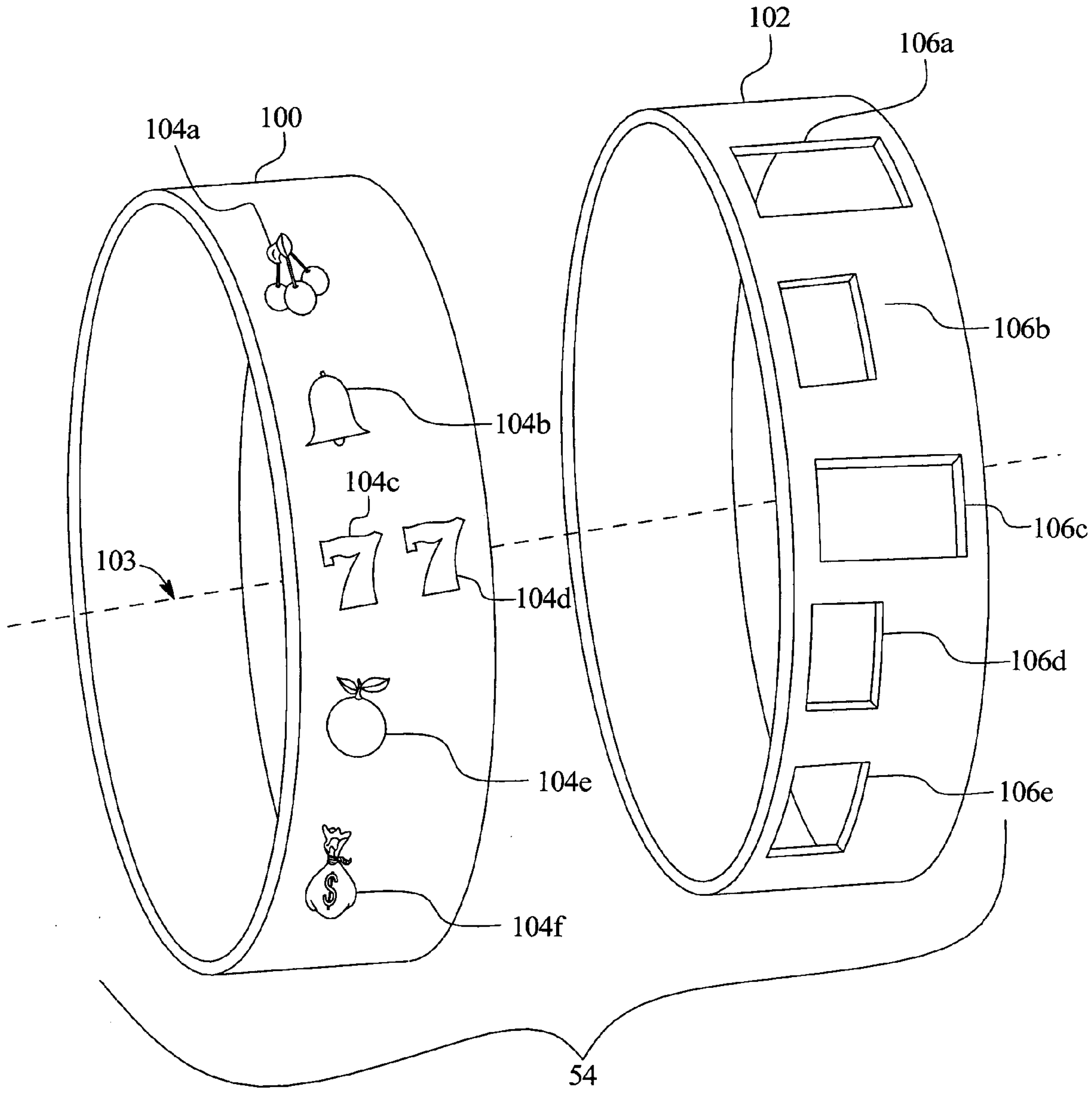
FIG. 17A is an enlarged exploded perspective view one embodiment of a reel set of the present invention, where the reel set includes an inner reel and an outer reel, and where the outer reel of the reel set includes at least one relatively large window and at least one relatively small window positioned on the left side of the outer reel.

Referring now to FIGS. 16A, 16B, and 17A, in one embodiment, the gaming device includes a plurality of symbol generators such as reel sets 54 where at least one of the reel sets has an inner reel 100 and an outer reel 102. As shown in FIG. 17A, the inner reel 100 and the outer reel 102 are fully or partially concentric reels or concentrically arranged reels. The inner reel 100 fits at least partially within the outer reel 102 and is adapted to move or rotate independently and freely within the outer reel 102. In one embodiment, the inner reel 100 includes a plurality of symbols 104*a*, 104*b*, 104*c*, 104*d*, 104*e* and 104*f* (collectively referred to herein as 104). In this embodiment, the symbols include a cherry symbol 104*a*, bell symbols 104*b*, seven symbols 104*c* and 104*d*, an orange symbol 104*e* and a money bag symbol 104*f*. It should be appreciated that the symbols 104 may be numbers, letters, characters, images or any other suitable symbols. In one embodiment, the inner reel 100 includes a plurality of symbol positions where at least one symbol position includes two of the symbols such as symbols 104*c* and 104*d* at the same symbol position. It should be appreciated that one or more of the symbol positions may include two or more of the symbols 104.

In one embodiment, the outer reel 102 includes a plurality of viewable areas or windows 106*a*, 106*b*, 106*c*, 106*d* and 106*e* which each can display one or more of the symbols on the inner reel. For example, viewable area 106*a* is larger than viewable area 106*b*, viewable area 106*d* and viewable area 106*e*, and therefore can display more symbols at a symbol position on the inner reel when a plurality of symbol are displayed at a symbol position on the inner reel. The different viewable areas 106*a*, 106*b*, 106*c*, 106*d* and 106*e* of outer reel 102 are display areas, viewable areas or windows which are defined by the outer reel. In one embodiment, the viewable areas are openings defined by the outer reel which extend through the width or thickness of the outer reel. In another embodiment, the viewable areas include a substantially transparent and/or translucent material such as a suitable glass or a suitable plastic which enables a player to see-through the cover to view the symbol or symbols 104 of the inner reel 100.

In the illustrated embodiment, the outer member 102 includes a plurality of different viewable areas or windows such as windows 106*a*, 106*b*, 106*c*, 106*d* and 106*e*. Viewable area or window 106*a* is a relatively large window which is sized to display at least two symbols at a symbol position such as symbols 104*c* and 104*d* on the inner reel 100. Viewable area or window 106*b* is a relatively small window which is sized to display one symbol located at a symbol position on the inner reel 100.

Additionally, in one embodiment, at least some of the viewable areas or windows are positioned or located in different locations on the outer reel. For example, viewable area or window 106*b* is positioned on the left side of the outer reel as a player looks at the outer reel. Therefore, window 106*b* can display the symbols 104 which are correspondingly positioned on the left side of the inner reel 100 at each symbol position.

Similar to window 106*b*, viewable areas or windows 106*d* and 106*e* are relatively small windows which are sized to display one symbol at a symbol position on the inner reel 100. Windows 106*d* and 106*e* are each positioned on the left side of the outer reel as a player looks or views the outer reel. Therefore, windows 106*d* and 106*e* each can display the symbols 104 which are positioned on the left side of the inner reel 100 at each symbol position. It should be appreciated that the viewable areas or windows may be any suitable sizes or shapes to display one or more of the symbols 104 on inner reel 100. It should also be appreciated that the viewable areas or windows may be positioned in any suitable location on the outer reel 102 to display one or more of the symbols of the inner reel.

In a game, a gaming device displays a plurality of the reel sets 54 to a player as shown in FIGS. 16A and 16B. In one embodiment, at least one of the reel sets includes the fully or partially concentric inner reel and outer reel as described above. In a play of the game, the gaming device or player activates each of the reel sets 54. The processor causes each of the reel sets to independently move or rotate. The processor also causes the inner reel 100 and the outer reel 102 of the reel sets including the inner and outer reels to independently move or rotate.

The inner reel and the outer reel of the reel set including the concentric inner and outer reels may rotate simultaneously or sequentially. In one embodiment, the inner reel 100 and the outer reel 102 rotate in the same direction. In another embodiment, the inner reel and the outer reel rotate in different directions. It should be appreciated that the inner reel 100 and the outer reel 102 of each reel set including the concentric reels may rotate in a clockwise direction, counterclockwise direction or any combination of counterclockwise and clockwise directions. In one embodiment, the inner reel 100 and the outer reel 102 of at least one of the reel-sets including the concentric reels rotate at the same rate of rotation. In another embodiment, the inner reel and the outer reel rotate at different rates of rotation.

In the illustrated example, when all of the reel sets 54 stop moving or rotating, the outer reel 102 displays a plurality of the viewable areas or windows 106*a*, 106*b*, 106*c*, 106*d* and 106*e* to the player. Each of the viewable areas or windows displays one symbol, two symbols, and/or blank symbols depending on the size and location of the windows.

The gaming device evaluates the symbols visible or viewable through the viewable areas or windows displayed by the reel set or reel sets including such viewable areas or windows and also the symbols displayed by the reel sets which do not include concentric reels. Based on the symbol combinations indicated by the reel sets, the gaming device provides an outcome such as an award to the player for any designated symbol combinations such as winning symbol combinations indicated by a plurality of symbols positions (such as along a payline) associated with the reel sets.

Figure 17B:
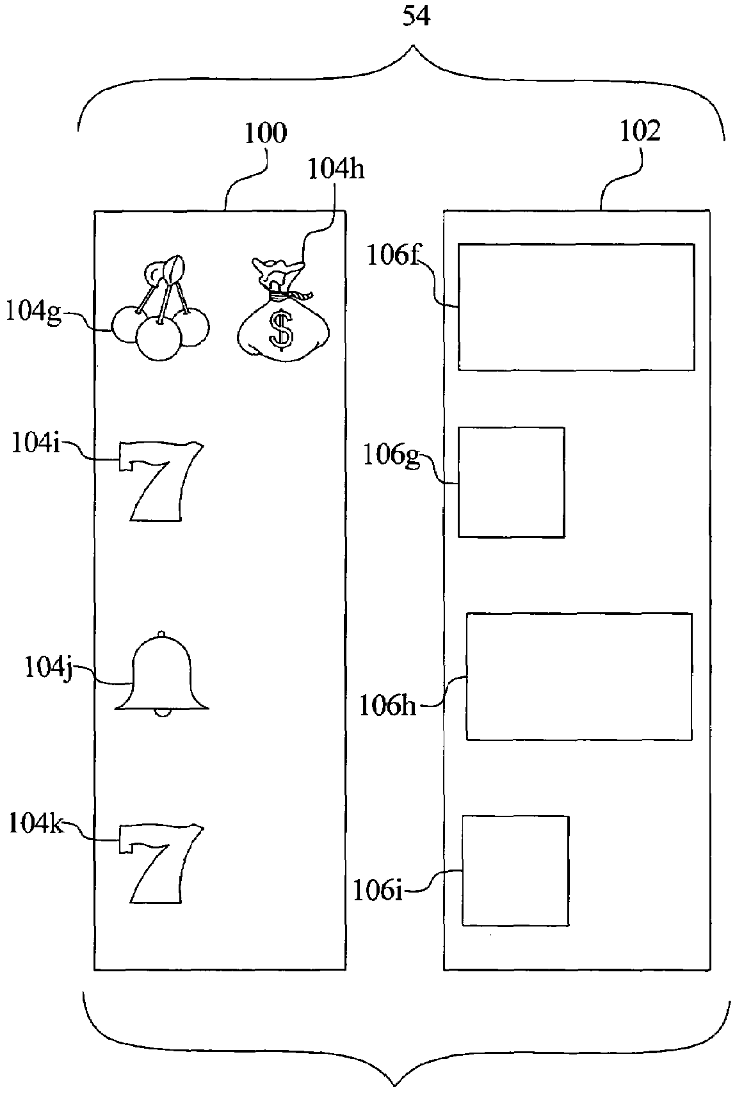
FIG. 17B is a front elevation view of an example of the inner and outer reels of the reel set illustrated in FIG. 17A.
Figure 17C:
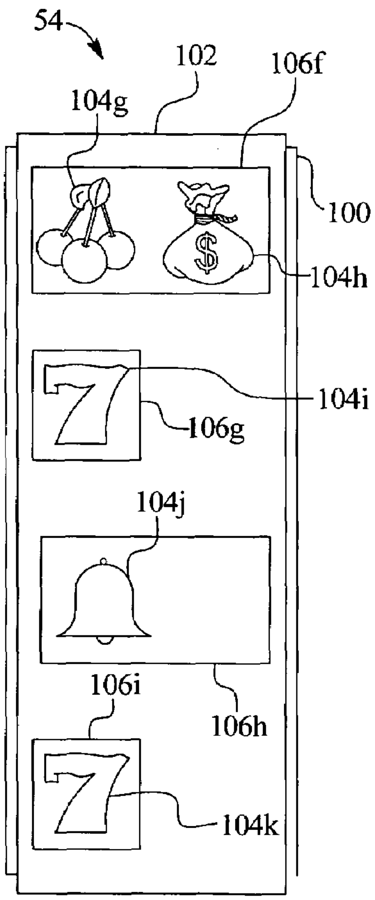
FIG. 17C is a front elevation view of the reel set of FIG. 17A where the inner reel is positioned within the outer reel.

Referring to FIGS. 17B and 17C, an example of the above embodiment is illustrated. In this example, the reel set 54 includes an inner reel 100 (in a different rotated position than illustrated in FIG. 17A) and an outer reel 102 (in a different rotated position than illustrated in FIG. 17A) where the inner reel 100 includes a plurality of different symbols such as a cherry symbol 104*g*, a money bag symbol 104*h*, a seven symbol 104*i* or 104*k*, and a bell symbol 104*j*. The outer reel 102 includes a plurality of viewable areas or windows including at least one relatively large window such as windows 106*f* and 106*h* and relatively small one symbol viewable areas or windows 106*g* and 106*i* which in this embodiment, are each positioned on the left side or left portion of the outer reel as a player views the outer reel.

As illustrated in FIG. 17B, one or more of the symbols of the inner reel 100 are viewable or visible through the viewable areas or windows of the outer reel 102. For example, viewable area or window 106*f* is sized to display two symbols at a single symbol position on the inner reel 100 such as the cherry symbol 104*g* and the money bag symbol 104*h*. Viewable area or window 106*g* is sized and positioned to display one of the symbols (i.e., the left symbol of a pair of adjacent symbols at a symbol position) on inner reel 100. Viewable area or window 106*h* is sized to display two symbols at a symbol position of the inner reel 100. However, if viewable area or window 106*h* is positioned in alignment with a symbol position of the inner reel 100 which only includes one symbol, such as symbol 104*j*, the viewable area or window 106*h* only displays that symbol. The other symbols are blank symbols (i.e., blank spaces). Viewable area or window 106*i* is a relatively small one symbol window which displays a blank symbol or one of the other symbols such as the seven symbol 104*k* at a symbol position. The viewable areas or window of the outer reel therefore may display no symbols, one symbol or a plurality of symbols at each symbol position of the inner reel.

Accordingly, the different viewable areas or windows increase a player's excitement and enjoyment of the game because a player does not know which symbols will be visible or viewable through the viewable areas or windows and therefore the player does not know which symbol combinations will occur on the reel sets until the reel sets stop moving in a play of a game.

Figure 17D:
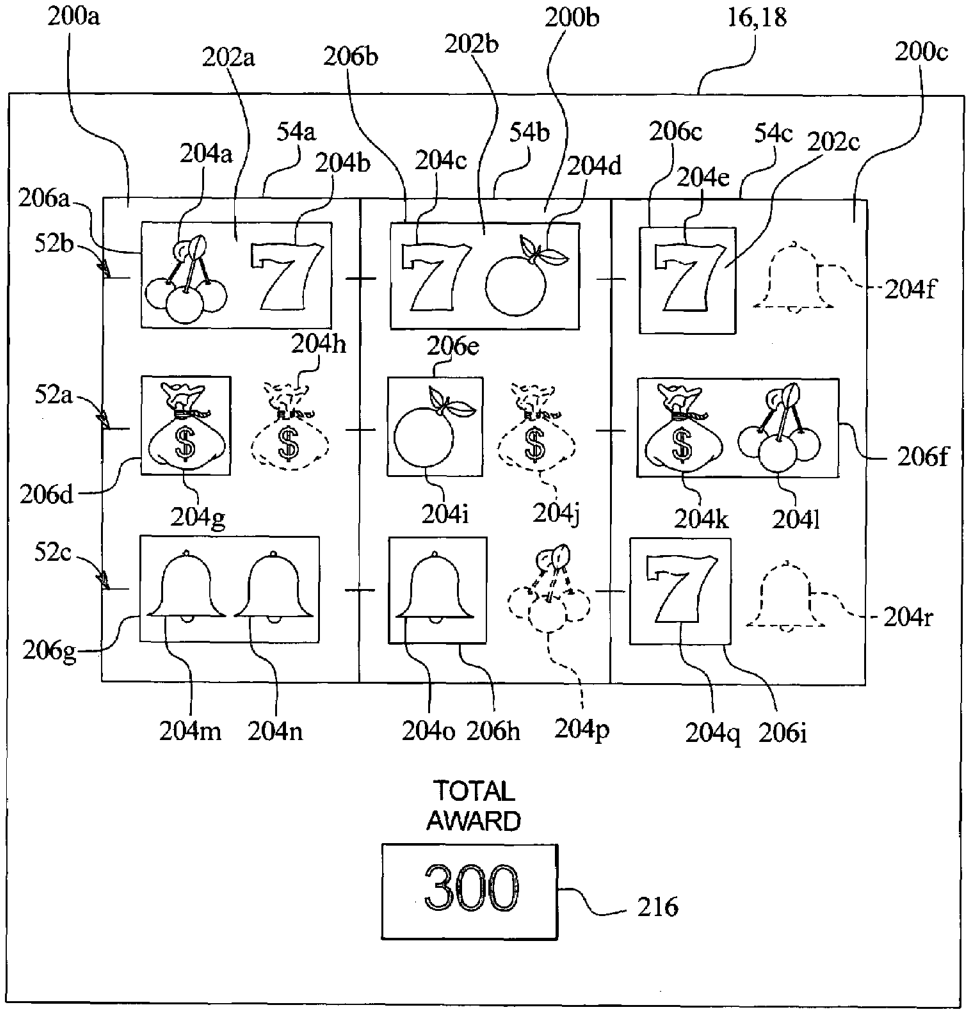
FIG. 17D is an enlarged elevation view of an example of a play of a game displayed by a gaming device employing three of the reel sets of FIGS. 17A, 17B and 17C.

Referring now to FIG. 17D, an example of the operation of a gaming device according to the above embodiment is illustrated where the gaming device includes three reel sets 54*a*, 54*b* and 54*c*. In this example, each of the reel sets includes concentric reels described above. Therefore, each reel set 54*a*, 54*b* and 54*c* includes an inner reel and each reel set includes an outer reel, respectively. The gaming device or player activates the reel sets (i.e., the inner and outer reels of the reel sets) in a play of a game to indicate different combinations of the symbols 104. Additionally, three paylines 52*a*, 52*b* and 52*c* are associated with the reel sets. It should be appreciated that one or a plurality of paylines may be associated with the reel sets.

In the example illustrated in FIG. 17D, the gaming device provides an outcome such as an award for any designated or winning symbol combinations including three or more identical symbols 104 occurring on any one of the paylines 52*a*, 52*b* or 52*c* in a play of the game. It should be appreciated that the gaming device may provide an outcome to a player based on designated symbol combinations occurring on the paylines associated with the reel sets, symbol combinations occurring on a plurality of paylines (i.e., scatter pays) or for any suitable symbol combinations indicated by the reel sets in a play of the game.

In this example, when the reel sets stop spinning, a plurality of viewable areas or windows are indicated by the outer reels of each of the reel sets. For instance, reel set 54*a* displays or indicates window 206*a*, window 206*d* (positioned on the left side of the outer reel) and window 206*g*. Reel set 54*b* displays window 206*b*, window 206*e* (positioned on the left side of the outer reel) and window 206*h* (positioned on the left side of the outer reel). Reel set 54*c* displays window 206*c* (positioned on the left side of the outer reel), window 206*f* and window 208*i* (positioned on the left side of the outer reel).

Each of the viewable areas or windows displayed by the outer reels 202*a*, 202*b* and 202*c* of the reel sets 54*a*, 54*b* and 54*c*, respectively, display or indicate the symbols 104 on inner reels 200*a*, 200*b* and 200*c*. For example, the symbols displayed by the viewable areas indicated by payline 52*b* are a cherry symbol 204*a* and a seven symbol 204*b*, which are viewable through window 206*a*, a seven symbol 204*c* and an orange symbol 204*d*, which are viewable through window 206*b*, and a seven symbol 204*c* viewable through window 206*c*. As illustrated in FIG. 17D, the bell symbol 204*f* is shown in phantom because the bell symbol is not viewable through window 206*c*. Accordingly, only the symbols which are viewable through windows 206*a*, 206*b* and 206*c* form the symbol combination indicated by payline 52*b*. In this example, the gaming device provides an outcome such as an award to a player when at least three of the same symbols (i.e., three identical symbols) occur or are indicated on a payline. Payline 52*b* indicates a winning symbol combination including three seven symbols 204*b*, 204*c* and 204*e*. As described above, the bell symbol 204*f* is not visible through window 206*c*. If a larger window such as window 206*f* were positioned on reel set 54*c* instead of window 206*c*, payline 52*b* would have indicated the same winning symbol combination because the bell symbol 204*f* does not change the winning symbol combination indicated by payline 52*a*.

Payline 52*a* indicates a smaller window 206*d* which is positioned on the left side of the outer reel of reel set 54*a*. Window 206*d* displays a money bag symbol 204*g*. Payline 52*a* also displays or indicates window 206*e* which is positioned on the left side of the outer reel of reel set 54*b* and displays an orange symbol 204*i*. Payline 52*a* further displays or indicates window 206*f* which indicates or displays a money bag symbol 204*k* and a cherry symbol 204*l*. Therefore, the symbols displayed by or indicated by payline 52*a* (i.e, the symbols viewable through the indicated viewable areas or windows indicated by payline 52*a*) are a money bag symbol 204*g*, an orange symbol 204, a money bag symbol 204*k* and a cherry symbol 204*l*. As shown in FIG. 17D, payline 52*a* does not indicate a winning symbol combination. As shown in FIG. 17D, the money bag symbols 204*h* and 204*j* are not viewable or otherwise visible through windows 206*d* and 206*e*. Although the player does not know that the money bag symbols are positioned adjacent to symbols 204*g* and 204*i*, respectively, the player misses obtaining an award (for a symbol combination including three money bag symbols on payline 52*a*) based on the size and position of window 206*d* and 206*e*.

In the illustrated embodiment, payline 52*c* indicates a large window 206*g* that displays two bell symbols 204*m* and 204*n*, a relatively small one symbol window 206*h* positioned on the left side of the outer reel of reel set 54*b* which displays bell symbol 204*o* and a smaller one symbol window 206*i* positioned on the left side of the outer reel of reel set 54*c* which displays the seven symbol 204*q*. The cherry symbol 204*p* and the bell symbol 204*r* are not viewable through any of the windows 206*g*, 206*h* and 206*i* on payline 52*c*. Therefore, the gaming device evaluates the symbols which are visible through the windows to determine if any winning symbol combinations are indicated by payline 52*e*. The combination of the three bell symbols 204*m*, 204*n* and 204*o* displayed by windows 206*g* and 206*h*, respectively, is a winning symbol combination and provides an award of one hundred to the player. Therefore, the gaming device adds the award of one hundred to the player's other award of two hundred obtained from the three seven symbols indicated by payline 52*a* to provide a total award of three hundred to the player as indicated by the total award display 216.

As shown in FIG. 17D, the cherry symbol 204*p* and the bell symbol 204*r* are not viewable through any of the windows indicated on payline 52*c*. However, the bell symbol 204*r* would have provided the player with a winning symbol combination associated with a larger award (i.e., four bell symbols). Therefore, the player missed obtaining a larger award based on the positions and sizes of the viewable areas or windows indicated by payline 52*c*. Thus, the different sizes of the windows and the locations of those windows on the outer reels of the reel sets affect the symbol combinations indicated by the paylines associated with the reel sets and thereby can affect the number and size of the awards provided to the player in a play of the game. Therefore, the different sizes and locations of the windows increase a player's excitement and enjoyment with the game because the player does not know whether the player will obtain any winning symbol combinations until all of the reel sets have completely stopped to display the viewable areas and thereby the symbols to the player in the play of the game.

As described above, one, a plurality or all of the reel sets displayed by the gaming device may each include an inner reel 100 and an outer reel 102 as illustrated in FIG. 17D. In one embodiment, at least one of the inner reels 100 and the outer reels 102 of a reel set including the inner reel and the outer reel move or rotate simultaneously upon the activation of the reel sets. In another embodiment, at least one of the inner reels 100 and the outer reels 102 move or rotate sequentially upon the activation of the reel sets or sets including such reels. In this embodiment, the inner reel stops rotating first while the outer reel stops rotating at a designated period of time after the inner reel stops. In another embodiment, the outer reel stops rotating first while the inner reel stops rotating at a designated period of time after the outer reel stops. It should be appreciated that one, a plurality or all of the inner reels and the outer reels of the reel sets including such reels may rotate simultaneously, rotate sequentially or in any other suitable manner. It should further be appreciated that each inner reel and outer reel may rotate at the same rate of rotation, at different rates of rotation or at varying rates of rotation.

Figure 18A:
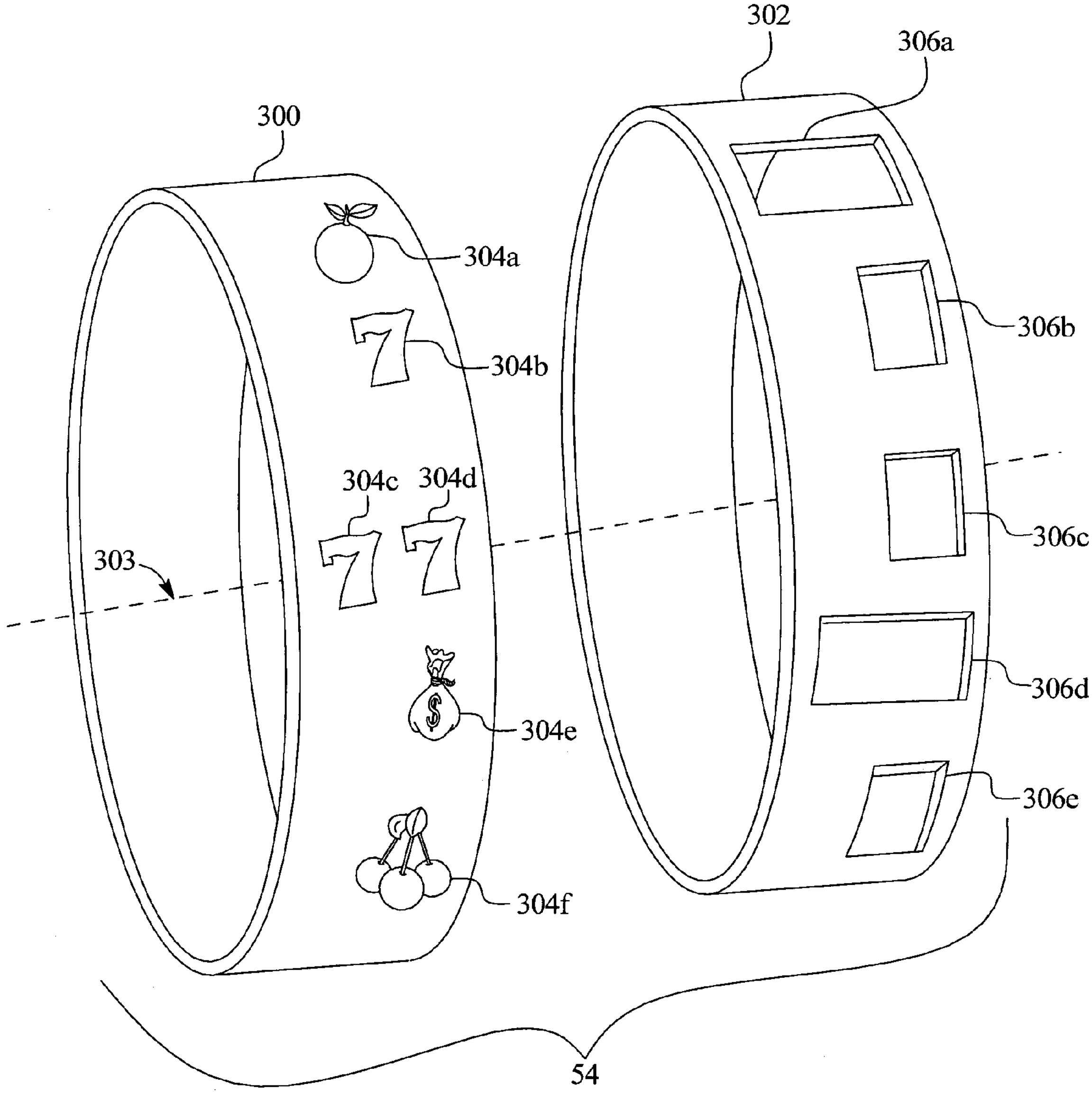
FIG. 18A is an enlarged exploded perspective view of another embodiment of a reel set of the present invention where the reel set includes an inner reel and an outer reel, and where the outer reel includes at least one large window and at least one small window positioned on the right side of the outer reel.
Figure 18B:
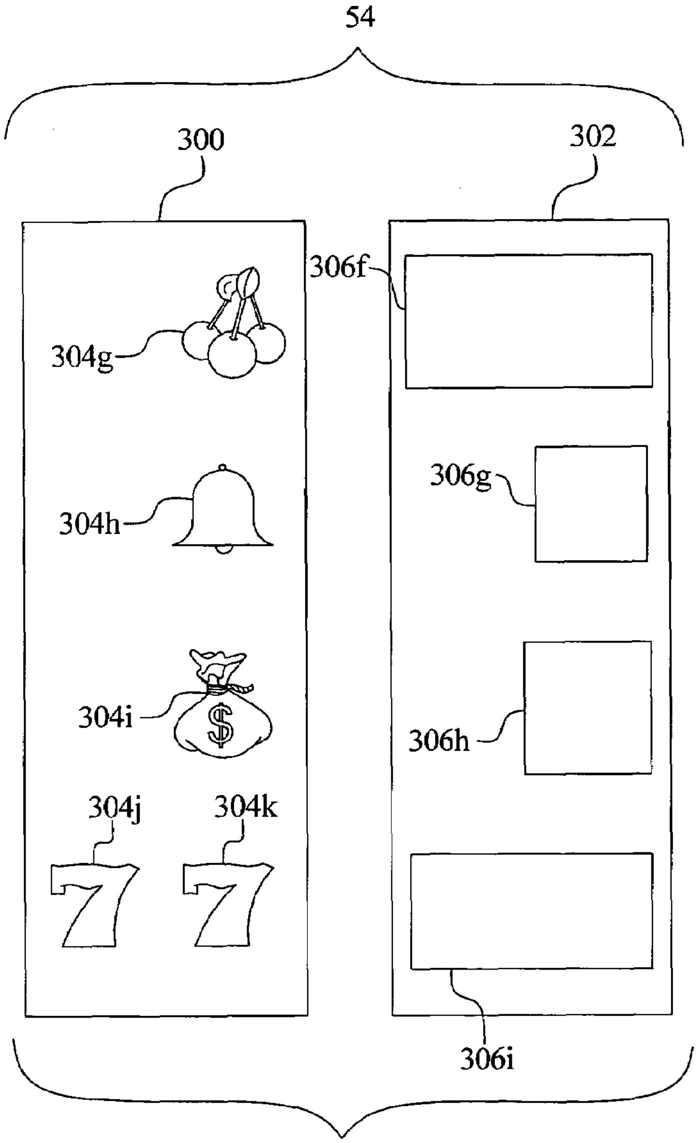
FIG. 18B is an enlarged elevation view of the inner and outer reels of reel set illustrated in FIG. 18A.
Figure 18C:
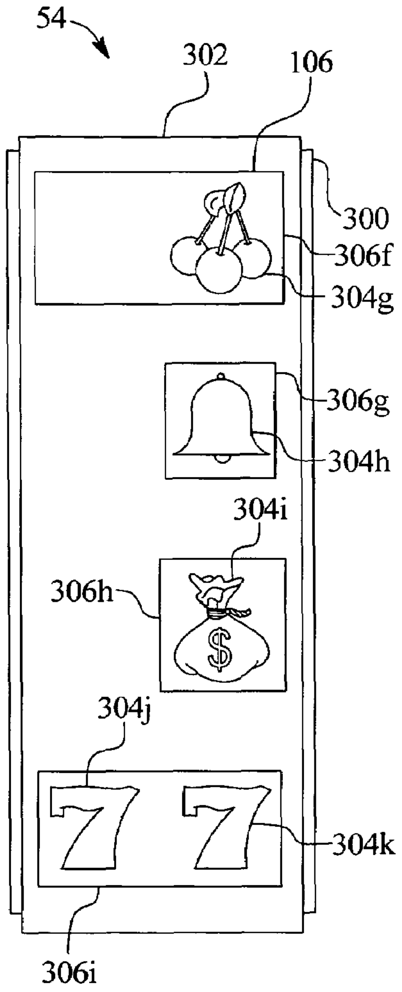
FIG. 18C is an enlarged front elevation view of the reel set illustrated by FIG. 18A where the inner reel is positioned within the outer reel.

Referring now to FIGS. 18A, 18B and 18C, another embodiment of a reel set of the present invention is illustrated where the reel set includes concentric reels having an inner reel 300 and an outer reel 302. In this embodiment, the outer reel 302 includes a plurality of different viewable areas or windows. The viewable areas or windows include at least one larger window such as window 306*a* or 306*d* and at least one small one symbol window positioned on the right side of the outer reel such as windows 306*b*, 306*c* or 306*e*. The inner reel includes a plurality of symbols such as the orange symbol 304*a*, the seven symbol 304*b*, the seven symbol 304*c*, the seven symbol 304*d*, the money bag symbol 304*e* and the cherry symbol 304*f*. The inner reel includes a plurality of symbol positions where at least one of the symbol positions includes a plurality of symbols such as symbols 304*c* and 304*d* shown in FIG. 18A. At least one of and preferably a plurality of the other symbols are positioned on the right side of the inner reel such as symbols 304*a*, 304*b*, 304*e* and 304*f*. It should be appreciated that one or more of the symbol positions may include a plurality of symbols and one or more of the symbol positions may include blank symbols. One or more of the symbols of the inner reel are visible or viewable through the windows 306*a*, 306*b*, 306*c*, 306*d* or 306*e* of the outer reel depending on the positioning of the windows of the outer reel with respect to the symbols of the inner reel in a play of the game. It should be appreciated that a gaming device may include a plurality of reel sets where one, a plurality or all of the reel sets each include the inner reel 300 and outer reel 302 illustrated in FIG. 18A.

FIGS. 18B and 18C illustrate how the inner reel 300 and the outer reel 302 of a reel set 54 co-act to display one or more symbols to a player in a play of the game. Specifically, the inner reel 300 of reel set 54 includes a plurality of symbols such as the cherry symbol 304*g*, the bell symbol 304*h*, the money bag symbol 304*i* and the seven symbols 304*j* and 304*k* which are at a single symbol position. The other reel 302 includes a plurality of viewable areas or windows such as larger windows 306*f* and 306*i*, which display a plurality of the symbols of the inner reel, and small one symbol windows 306*g* and 306*h* which display one of the symbols of the inner reel 300 to a player.

As shown in FIG. 18C, the inner reel 300 and the other reel 302 combine to form one of the reel sets 54 of the present invention. As shown in FIG. 18C, the position and size of each of the windows of the other reel affects how many symbols and which symbols are displayed to a player in a play of the game. For example, window 306*f* displays the cherry symbol 304*g*. Window 306*g* displays the bell symbol 304*h*. Window 306*h* displays the money bag symbol 304*i*. Window 306*i* displays the seven symbols 304*j* and 304*k*. If the seven symbols 304*j* and 304*k* where positioned beneath the window 306*h*, then only one of the seven symbols such as seven symbol 304*k* would be visible or viewable by the player in a play of the game. Therefore, the positioning of the windows on the outer reel combined with the number of symbols at each symbol position of the inner reel affects the symbols displayed to the player in a play of the game and thereby effects the symbol combinations indicated on one or more paylines associated with the reel sets in a play of the game.

Figure 18D:
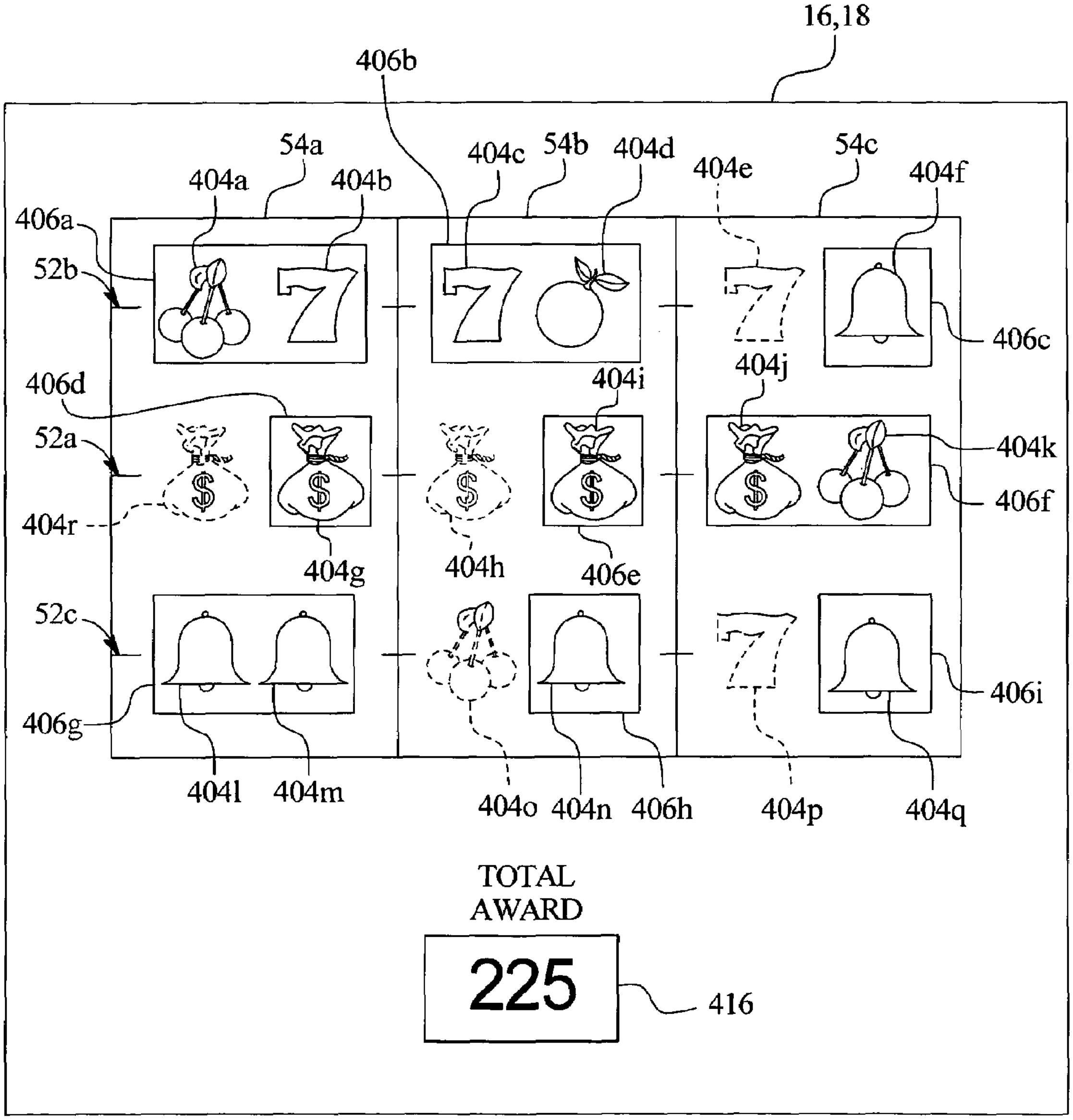
FIG. 18D is an enlarged elevation view of an example of a play of a game displayed by a gaming device employing three of the reel sets illustrated in FIG. 18A.

Referring now to FIG. 18D, an example of a gaming device employing three of the reel sets of the embodiment of FIG. 18A is illustrated where the gaming device or player activates the reel sets in one play of the game. After the reel sets stop moving or spinning, the viewable areas or windows of the reel sets display a plurality of symbols of the inner reels of the reel sets on the paylines 52*a*, 52*b* and 52*c* associated with the reel sets. Specifically, payline 52*a* indicates a small or one symbol window 406*d* on reel set 54*a*, a small or one symbol window 406*e* of reel set 54*b* and a large window 406*f* of reel set 54*c*. These viewable areas or windows display symbols such as the money bag symbol 404*g*, the money bags symbol 404*i* and the money bag symbol 404*j* and the cherry symbol 404*k*, respectively. In this example, the gaming device provides an outcome such as an award to the player for any symbol combination including three or more of the same symbols. Therefore, the gaming device provides an award for the symbol combination including the three money bag symbols 404*g*, 404*i* and 404*j*. The award associated with three money bag symbols is twenty-five. It should be noted that the money bag symbol 404*r* on reel set 54*a* and the money bag symbol 404*h* on reel set 54*b* are not visible or viewable by the player. However, if a larger window such as window 306*f* were positioned at those symbol positions on those reel sets, these symbols would be visible or viewable by the player. Thus, the player obtained a symbol combination including three money bag symbols instead of a symbol combination including four money bag symbols or possibly five money bag symbols. Thus, the positioning and size of the windows on the reel sets directly affected the outcome provided to the player in that play of the game.

Payline 52*b* indicates a large window 406*a*, a large window 406*b* and a small one symbol window 406*c*. These windows display the symbols 404*a*, 404*b*, 404*c*, 404*d* and 404*f*. Symbol 404*e* is not visible or viewable by the player because the small window 406*c* only displays one of the symbols at that symbol position. The symbols displayed in the viewable areas or windows indicated by payline 52*b* do not provide a winning symbol combination to the player because three of the same symbols are not indicated on that payline. It should be noted that if symbol 404*e* was viewable or visible through the window 406*c* indicated on payline 52*b*, the payline would have indicated a winning symbol combination including three seven symbols. Again, the positioning and size of the windows or viewable areas directly affected the outcome provided to the player.

Payline 52*c* indicates a larger window 406*g*, a small one symbol window 406*h* and a small one symbol window 406*i*. The window 406*g* displays two bell symbols 404*l* and 404*m*. The window 406*h* displays one bell symbol 404*n* in the window 406*i* displays one bell symbol 404*q*. The cherry symbol 404*o* on reel set 54*b* and the seven symbol 404*p* on reel set 54*c* are not visible or viewable through any of the windows indicated on payline 52*c*. Therefore, a symbol combination including four bell symbols 404*l*, 404*m*, 404*n* and 404*q* are indicated by payline 52*c*. The combination of four bell symbols as a winning symbol combination in the play of the game and provides an award of two hundred to the player. Therefore, the award of two hundred is added to the award of twenty-five associated with the symbol combination indicated by payline 52*a* to provide the player with a total award of two hundred twenty-five as indicated by the total award display 416. Neither the cherry symbol 404*o* nor the seven symbol 404*p* changed the outcome or award associated with symbol combination indicated on payline 52*c*. Therefore, the positioning and size of the windows on payline 52*c* did not negatively affect the award provided to the player for the symbol combination indicated by payline 52*c*.

Figure 19A:
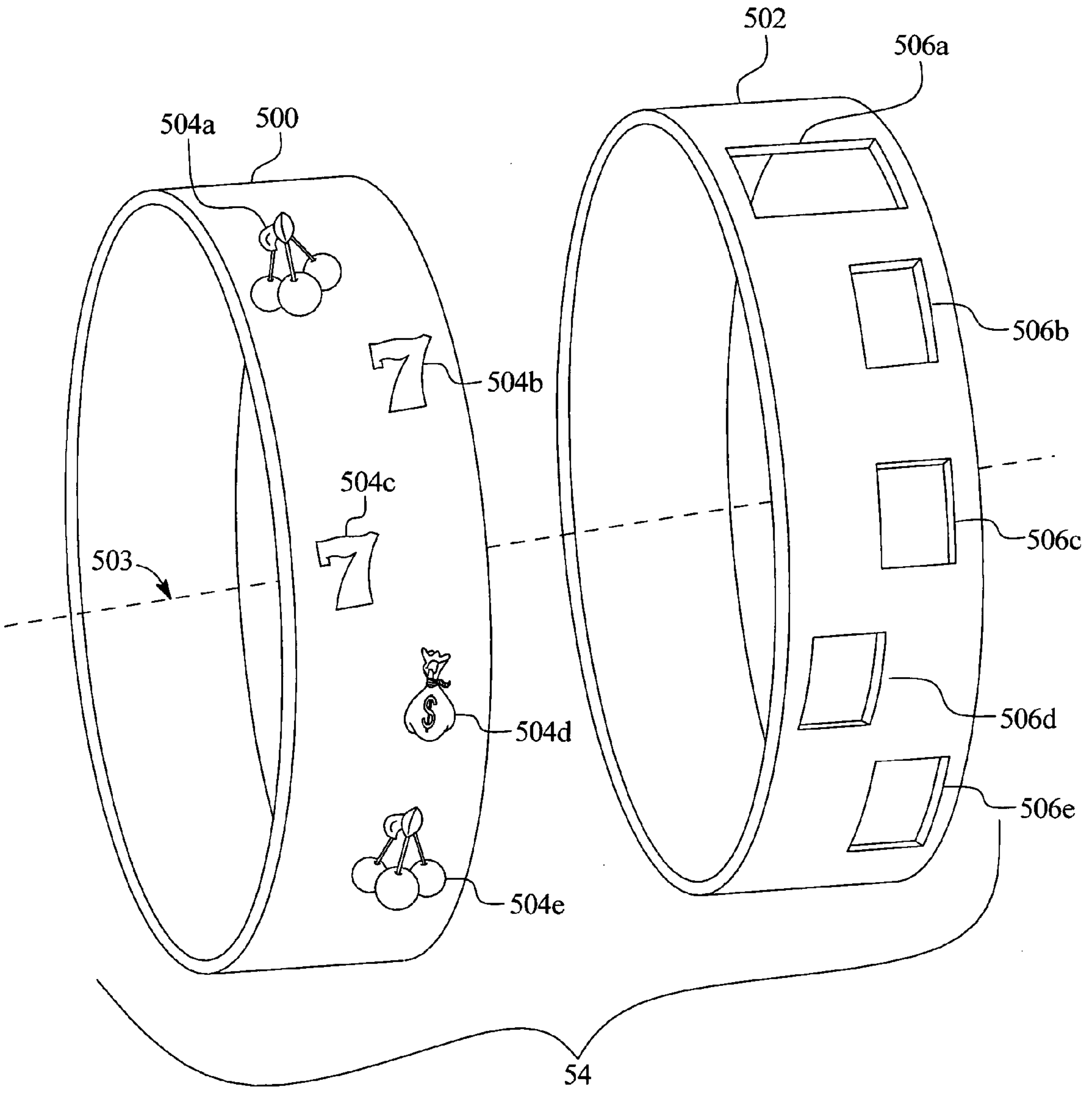
FIG. 19A is an enlarged exploded front perspective view of a further embodiment of a reel set of the present invention including an inner reel and an outer reel where the outer reel includes a plurality of small one symbol windows positioned on the left and right sides of the outer reel.
Figure 19B:
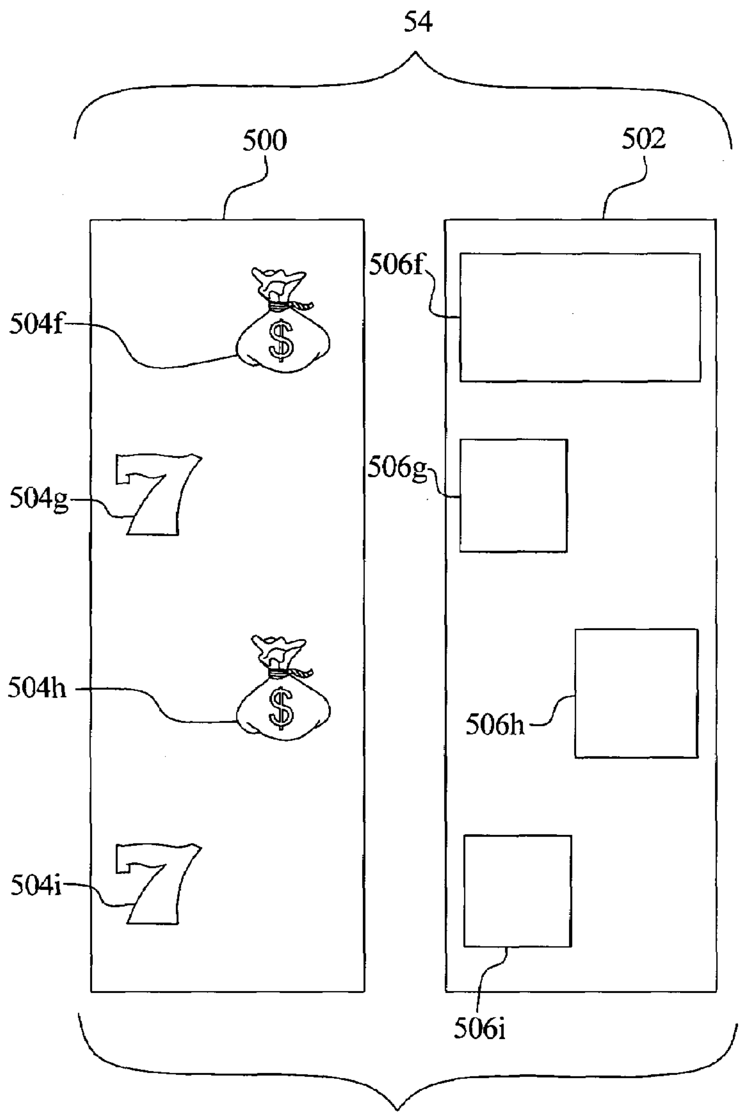
FIG. 19B is an elevation view of the inner and outer reels of the reel set of the embodiment illustrated in FIG. 19A.
Figure 19C:
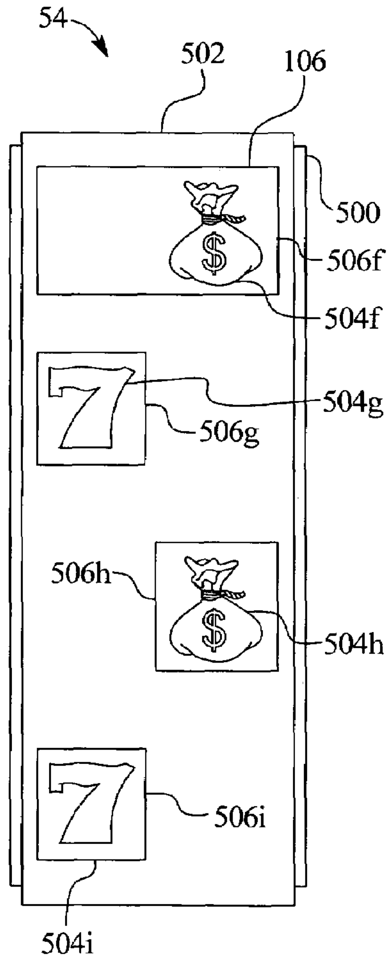
FIG. 19C is an elevation view of the reel set of the embodiment of FIG. 19A where the inner reel is positioned within the outer reel.

Referring now to FIGS. 19A, 19B and 19C, a reel set of another embodiment of the present invention is illustrated where the reel set includes an inner reel 500 and an outer reel 502 where the outer reel includes a plurality of different windows which are positioned on different sides of the outer reel. In this embodiment, the inner reel 500 includes a plurality of symbols positioned on either side of the inner reel such as the cherry symbol 504*a* and seven symbol 504*c* which are both positioned on the left side of the inner reel, and the seven symbol 504*b*, the money bag symbol 504*b* and the cherry symbol 504*e*, which are positioned on the right side of the inner reel 500. The outer reel includes a plurality of viewable areas or windows which are positioned on different sides of the outer reel. For example, windows 506*a* and 506*d* are positioned on the left side of the outer reel and windows 506*b*, 506*c* and 506*e* are positioned on the right side of the outer reel. The inner reel 500 and the outer reel 502 are positioned on the same axis of rotation 503 as indicated by FIG. 19A.

Referring now to FIGS. 19B and 19C, an example of the reel set of FIG. 19A is illustrated where the inner reel 500 and the outer reel 502 are combined to form the reel set 54. As shown in FIG. 19B, the inner reel includes a plurality of symbols such as the money bag symbol 504*f*, the seven symbol 504*g*, the money bag symbol 504*h* and the seven symbol 504*i*. The outer reel 502 includes a plurality of windows such as the small one symbol window 506*h* positioned on the right side of the outer reel and the small one symbol windows 506*g* and 506*i* positioned on the left side of the outer reel. As shown in FIG. 19C, when the inner reel 500 is positioned within the outer reel 502, the symbols 504*f*, 504*g*, 504*h* and 504*i* are viewable through the windows 506*f*, 506*g*, 506*h* and 506*i*, respectively. As shown in FIGS. 19B and 19C, if a symbol such as symbol 504*g* is positioned below or adjacent to a window such as window 506*h*, no symbol or a blank symbol would be viewable or visible through a window. Therefore, in this embodiment, the positioning of the windows on the outer reel determines the symbols of the inner reel which are viewable or otherwise visible by the player and thereby the symbol combinations indicated by the reel sets.

Figure 19D:
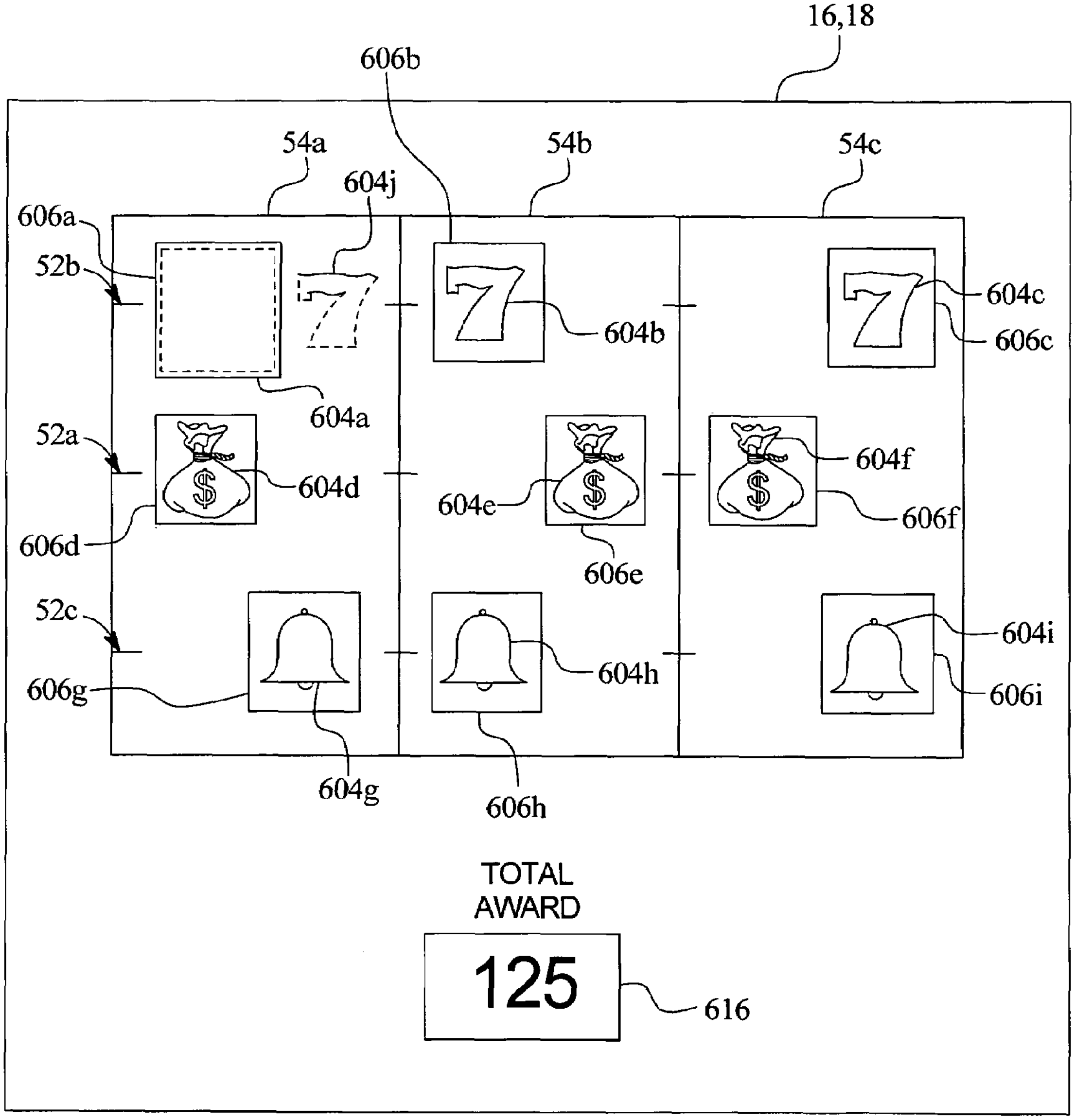
FIG. 19D is an enlarged elevation view of an example of a gaming device employing three of the reel sets of the embodiment of FIG. 19A in a play of the game.

Referring now to FIG. 19D, an example of a gaming device employing three of the reel sets of the embodiment of FIG. 19A is illustrated where the gaming device or player activates the reel sets in a play of the game. After the reel sets stop moving or spinning, a plurality of the symbols on the inner reels are indicated on paylines 52*a*, 52*b* and 52*c* associated with the reel sets. For example, payline 52*a* indicates windows 606*d*, 606*e* and 606*f*. Symbols 604*d*, 604*e* and 604*f* are displayed through the windows 606*d*, 606*e* and 606*f*, respectively. The symbols 604*d*, 604*e* and 604*f* are each money bag symbols. Therefore, payline 52*a* indicates three money bag symbols which provides an award of twenty-five to the player.

Payline 52*b* indicates windows 606*a*, 606*b* and 606*c*. These windows display a blank symbol 604*a*, a seven symbol 604*b* and another seven symbol 604*c*. Unfortunately for the player, two seven symbols is not a winning symbol combination in the play of the game. As shown in FIG. 19D, a seven symbol 604*j* is positioned on the right side of the outer reel of reel set 54*a*. The window 606*a* is positioned on the left side of the outer reel of reel set 54*a*. Thus, the position of the window prevented the seven symbol 604*j* from being displayed to the player in this play of the game and thereby affected the outcome associated with the symbols indicated by payline 52*b*. Therefore, the gaming device does not provide an award to the player for the symbol combination indicated by payline 52*b*.

Payline 52*c* indicates windows 606*g*, 606*h* and 606*i*. These windows display a bell symbol 604*g*, a bell symbol 604*h* and a bell symbol 604*i*. The combination of three bell symbols indicated by payline 52*c* provides an award of 100. Therefore, the award of one hundred associated with the symbol combination indicated by payline 52*c* is added to the award of twenty-five associated with the symbol combination indicated by payline 52*a* to provide the player with the total award of one hundred twenty-five as indicated by the total award display 616.

Figure 20A:
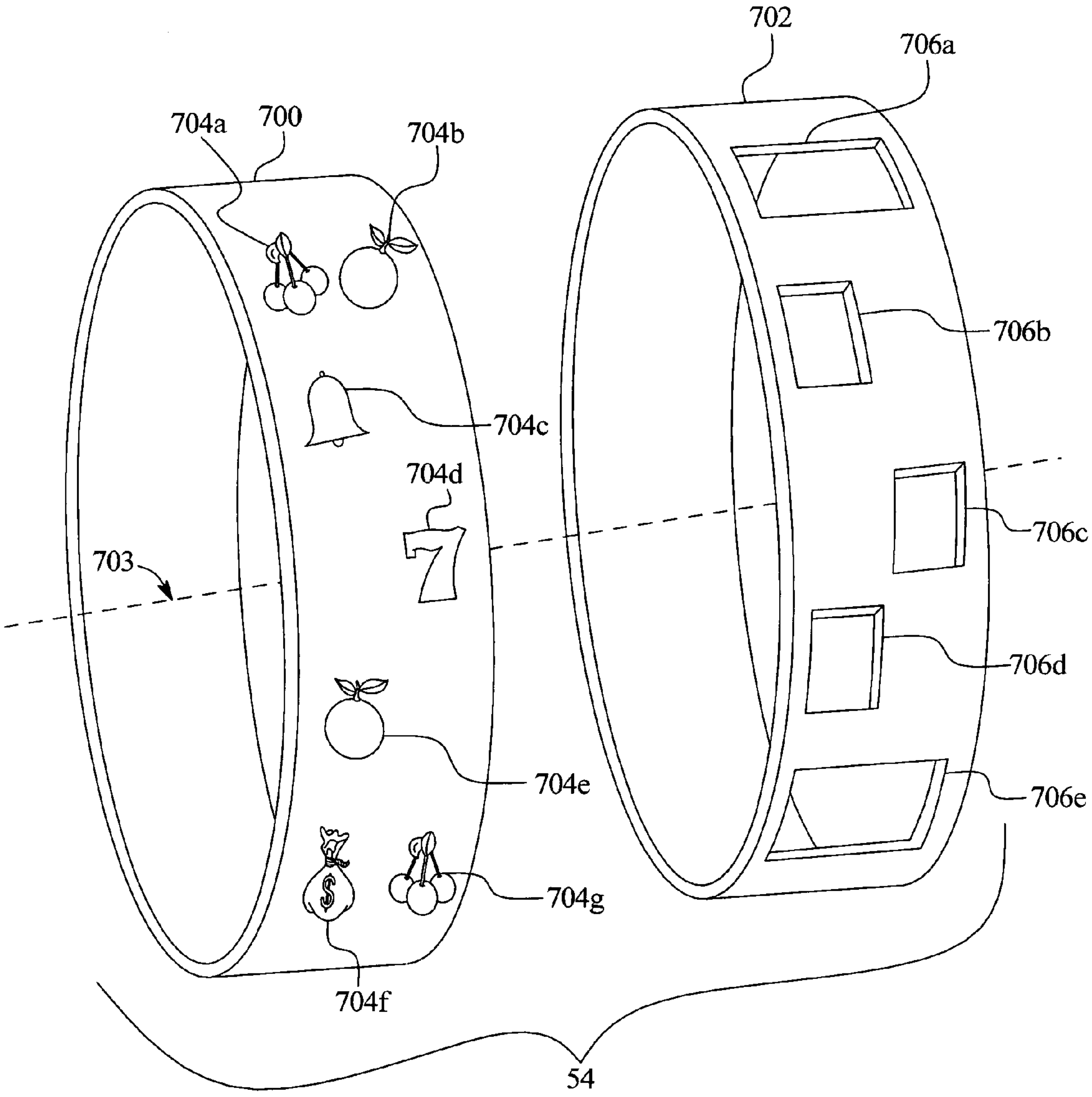
FIG. 20A in an enlarged exploded front perspective view of a reel set of another embodiment of the present invention including an inner reel and an outer reel where the outer reel includes at least one large window and a plurality of small one symbol windows positioned on the left and right sides of the outer reel.
Figure 20B:
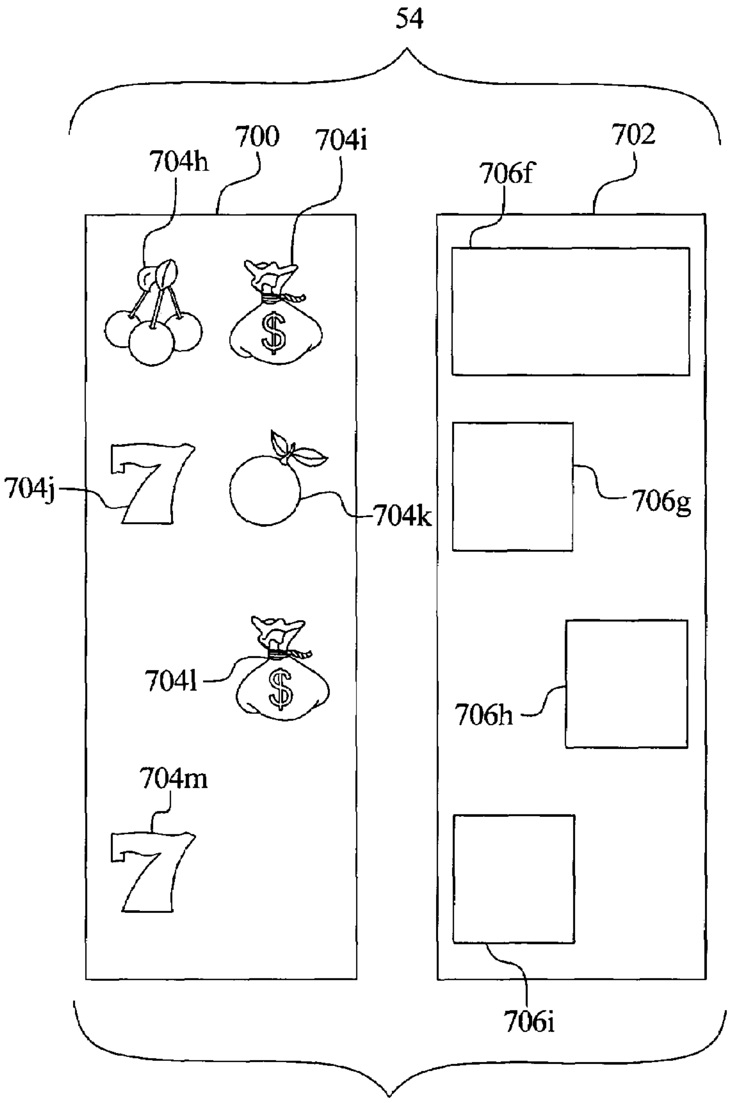
FIG. 20B is a front elevation view of the inner and outer reels of the reel set illustrated in FIG. 20A.
Figure 20C:
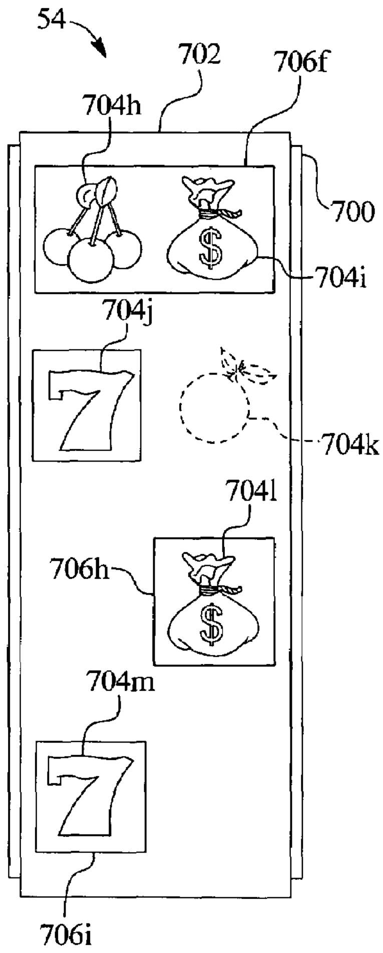
FIG. 20C is a enlarged front elevation view of the reel set of the embodiment of FIG. 20A where the inner reel is positioned within the outer reel.

Referring now to FIGS. 20A, 20B and 20C, a reel set of a further embodiment of the present invention is illustrated where the reel set includes an inner reel 700 and an outer reel 702, where the outer reel 702 includes a plurality of viewable areas or windows which are different sizes and in different positions on the outer reel. Specifically, the inner reel 700 includes a plurality of symbols such as the cherry symbol 704*a* and the orange symbol 704*b* at a single symbol position on the inner reel, the bell symbol 704*c* positioned on the left side of the inner reel, the seven symbol 704*d* positioned on the right side of the inner reel, the orange symbol 704*e* positioned on the left side of the inner reel, the money bag symbol 704*f* and the cherry symbol 704*g* positioned at a single symbol position on the inner reel. The outer reel 702 includes a plurality of windows such as the large windows 706*a* and 706*e*, the small one symbol windows 706*b* and 706*d* positioned on the left side of the outer reel and the window 706*c* positioned on the right side of the outer reel. It should be appreciated that the inner reel may include any suitable number of symbols in the same or different symbol positions and in different positions on the inner reel. Similarly, the outer reel may include one or more of the large windows and one or more of the small one symbol windows positioned on either side of the outer reel.

Referring to FIG. 20B, an example of a reel set of the embodiment of FIG. 20A is illustrated where the inner reel includes symbols 704*h*, 704*i*, 704*j*, 704*k*, 704*l* and 704*m*. The outer reel includes a plurality of windows including a large window 706*f* and small one symbol window 706*g*, 706*h* and 706*i*. Referring to FIG. 20C, in a play of the game, the reel set 54 including the inner reel 700 and outer reel 702 spin to indicate the windows 706*f*, 706*g*, 706*h* and 706*i*. Windows 706*f* display symbols 704*h* and 704*i*. Windows 706*g* display symbol 704*j*. Windows 706*h* display symbols 704*l* and windows 706*i* display symbol 704*m*. As shown in FIG. 20C, the size and position of window 706*g* prevented orange symbol 704*k* from being displayed in that play of the game. Therefore, the symbol combination indicated by the payline associated with 706*g* is affected too.

Figure 20D:
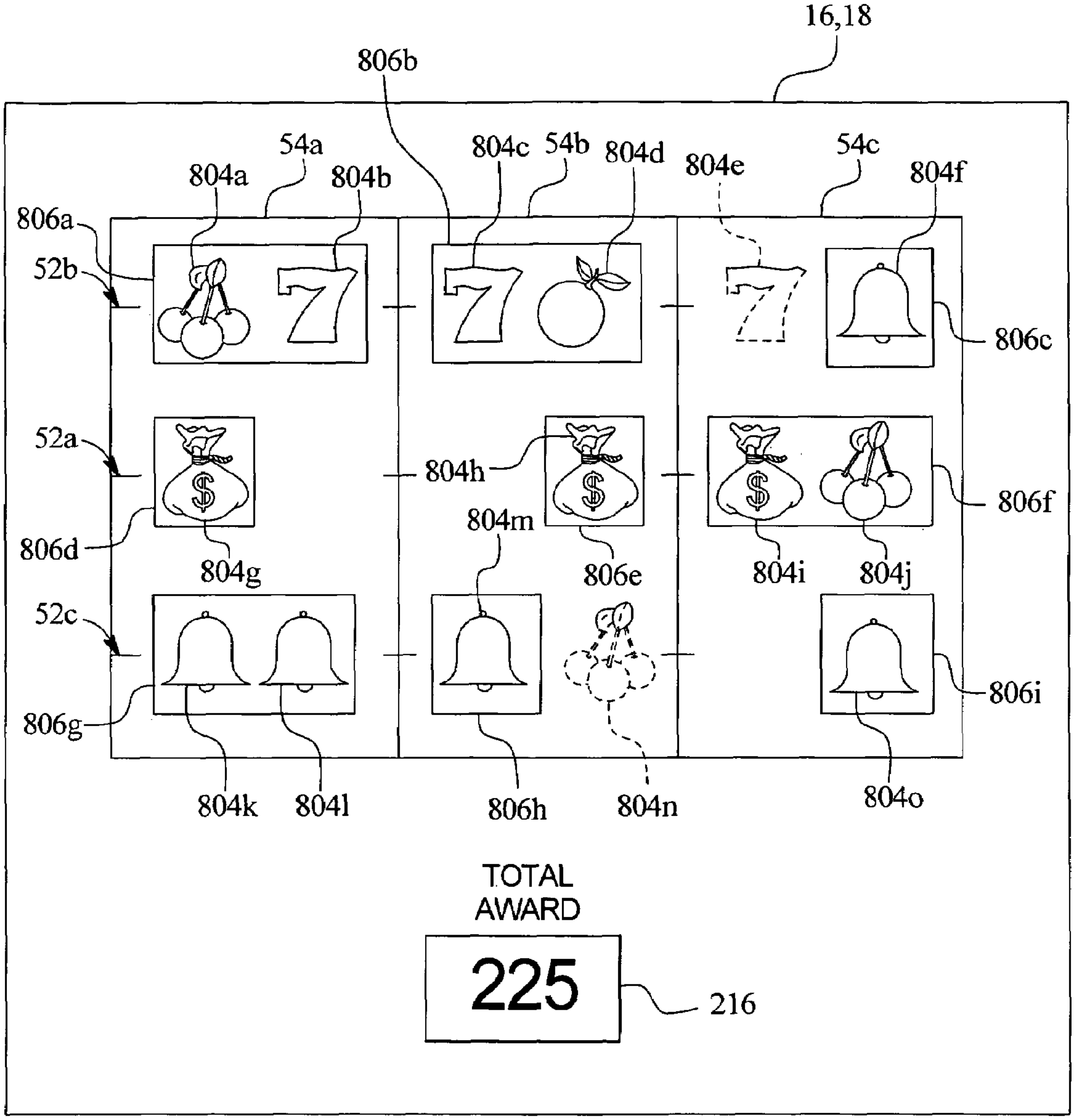
FIG. 20D is an enlarged elevation view of an example of a gaming device employing three of the reels sets of the embodiment illustrated in FIG. 20A in a play of the game.

Referring to FIG. 20D, an example of a gaming device employing three of the reel sets of the embodiment of FIG. 20A is illustrated where the gaming device or player activates or spins the reel sets in the play of the game. After the reel sets stop moving or spinning, the reel sets display a plurality of symbols to the player. In particular, payline 52*a* indicates a small one symbol window 806*d*, a small one symbol window 806*e*, and a large window 806*f*. These windows display a money bag symbol 804*g*, a money bag symbol 804*h*, a money bag symbol 804*i* and a cherry symbol 804*j*. Therefore, the symbol combination including three money bag symbols provides an award of twenty-five to the player. Payline 52*b* indicates a large window 806*a*, a large window 806*b* and a small one symbol window 806*c*. These windows display a cherry symbol 804*a*, a seven symbol 804*b*, a seven symbol 804*c*, an orange symbol 804*d* and a bell symbol 804*f*. This combination of symbols is not a winning symbol combination. However, the seven symbol 804*e* is not displayed in this play of the game because of the size and position of the window 806*c*. Therefore, the player misses an opportunity to obtain an award for a symbol combination including three seven symbols on payline 52*b*.

Payline 52*c* indicates a large window 806*g*, a small one symbol window 806*h* and a small one symbol window 806*i*. These windows display a bell symbol 804*k*, a bell symbol 804*l*, a bell symbol 804*o*. The symbol combination including four bell symbols is a winning symbol combination and provides an award of two hundred to the player. It should be noted that a cherry symbol 804*n* is not displayed on reel set 54*b* because of the position of window 806*h*. However, the cherry symbol 804*n* does not change the award provided to the player for the symbol combination indicated by payline 52*c*. Therefore, the gaming device provides the award of two hundred associated with the symbol combination indicated by payline 52*c* and the award of twenty-five associated with the symbol combination indicated by payline 52*a* to the player to provide the player with the total award of two hundred twenty-five as indicated by the total award display 816.

Figure 21A:
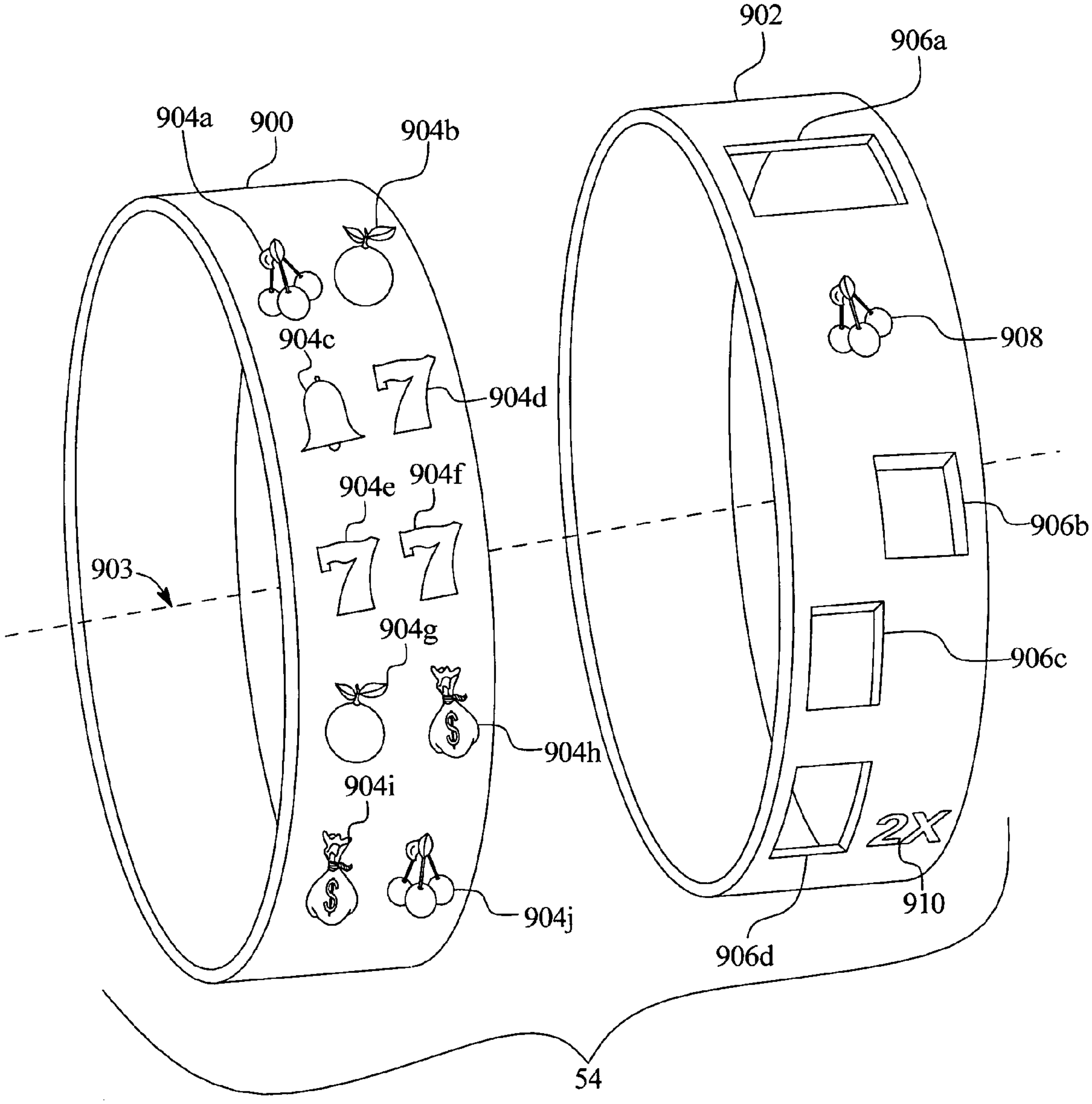
FIG. 21A is an enlarged exploded front perspective view of a reel set of another embodiment of the present invention including an inner reel and an outer reel where the outer reel includes a plurality of different sized windows, a symbol and a modifier associated with at least one of the windows.
Figure 21B:
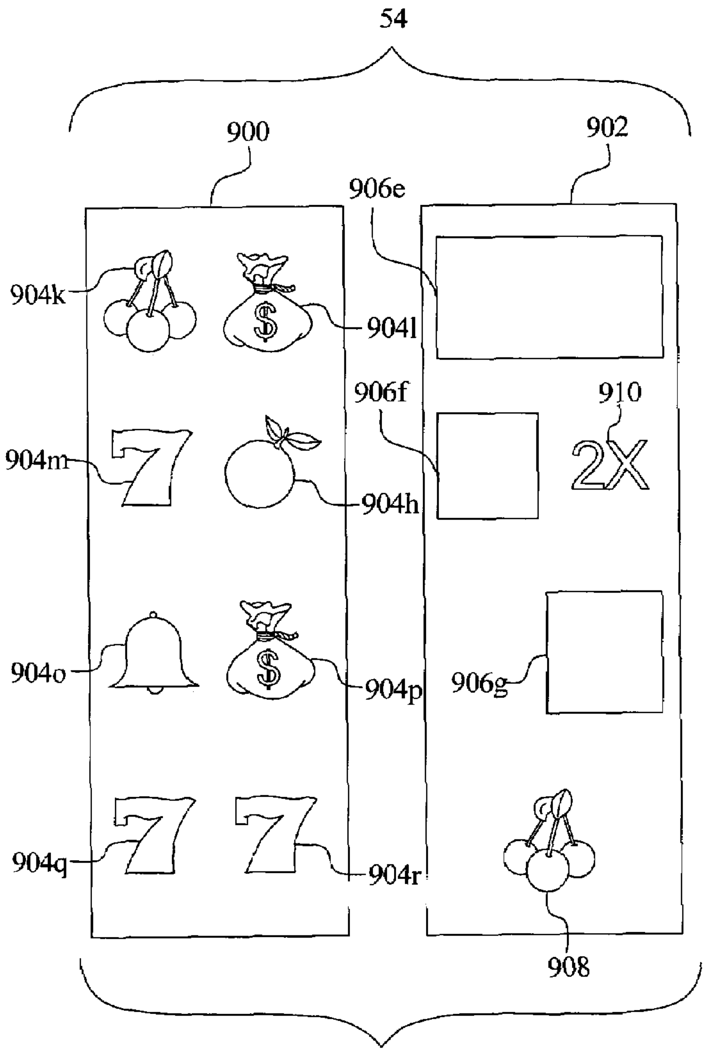
FIG. 21B is an enlarged elevation view of the inner and outer reels of the reel set illustrated in FIG. 21A.
Figure 21C:
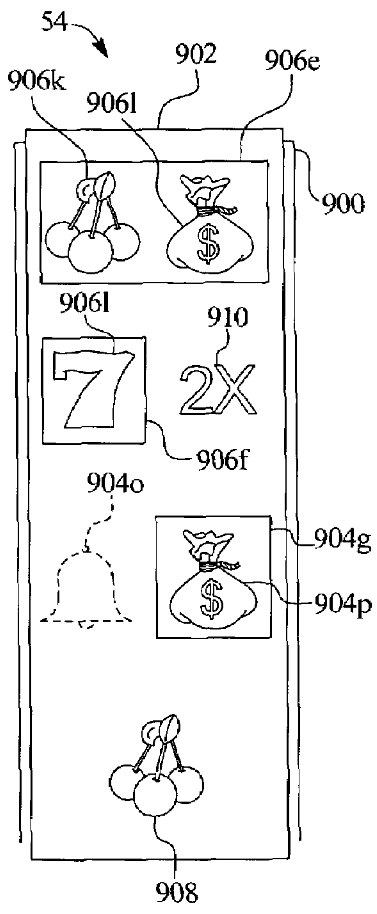
FIG. 21C is an enlarged elevation view of the reel set of the embodiment of FIG. 21A where the inner reel is positioned within the outer reel.

Referring now to FIGS. 21A, 21B and 21C, a reel set of another embodiment of the present invention is illustrated where the reel set includes an inner 900 and an outer reel 902 where the outer reel 902 includes a plurality of viewable areas or windows and at least one modifier 910 associated with one of the windows. FIG. 21A also illustrates another embodiment of the present invention where the outer reel 902 includes at least one symbol 908. It should be appreciated that the outer reel may include one or more modifiers associated with one, a plurality or all of the viewable areas defined by the outer reel and/or one or more symbols. It should also be appreciated that the symbol or symbols on the outer reel may be the same as one or more of the symbols of the inner reel or at least one, a plurality or all of the symbols of the outer reel may be different than the symbols of the inner reel.

In this embodiment, the inner reel 900 includes a plurality of symbols and specifically, a plurality of symbols at each of the symbol positions of the inner reel. For example, one of the symbol positions displays the cherry symbol 904*a* and the orange symbol 904*b*. Another symbol position displays the bell symbol 904*c* and the seven symbol 904*d*. Another symbol position displays the seven symbol 904*e* and the seven symbol 904*f*. The next symbol position displays an orange symbol 904*g* and the money bag symbol 904*h* and the next symbol position displays the money bag symbol 904*i* and the cherry symbol 904*j*. In this embodiment, the outer reel 902 and the inner reel 900 co-act to display one or more of the symbols on a plurality of paylines associated with the reel sets 54.

Referring to FIG. 21B, an example of the reel set of FIG. 21A is illustrated where the inner reel 900 includes a plurality of symbols such as the cherry symbol 904*k*, the money bag symbol 904*l*, the seven symbol 904*m*, the orange symbol 904*n*, the bell symbol 904*o*, the money bag symbol 904*p*, the seven symbol 904*q* and the seven symbol 904*r*. The outer reel includes a large window 906*e*, a small one symbol window 906*f* positioned on the left side of the outer reel, a small one symbol window 906*g* positioned on the right side of the outer reel. The outer reel also includes in one embodiment a modifier such as the multiplier 2X which is labeled 910 and positioned adjacent to the window 906*f*. Also, in another embodiment, the outer reel 902 includes one or more symbols such as the cherry symbol 908 as described above. It should be appreciated that the outer reel may include one or more modifiers, one or more symbols 908 and/or a combination of modifiers and symbols as shown on outer reel 902 in FIG. 21B.

Referring now to FIG. 21C, the inner reel 900 and the outer reel 902 co-act or combine to form the reel set 54. As shown in FIG. 21C, the size and position of the windows on the outer reel determine the symbols that are displayed to the player in a play of the game. As shown in FIG. 21C, window 906*e* displays the cherry symbol 904*k* and the money bag symbol 904*l*. Window 906*f* displays the seven symbol 904*m*. Additionally, the modifier of 2X labeled 910 is displayed adjacent to window 906*f*. The window 906*g* displays the money bag symbol 904*p*. As shown in FIG. 21C, the bell symbol 904*o* is not displayed to the player because of the size and position of the window 906*g*. The cherry symbol 908 which is displayed on the outer reel is displayed to the player. The modifier such as multiplier 2X labeled 910 modifies any award associated with symbol combinations indicated on the payline that indicates the modifier. Similarly, the symbol 908 is combined with any other symbols indicated one the payline which indicates the symbol 908 to determine a winning symbol combination on that payline in the play of the game.

Figure 21D:
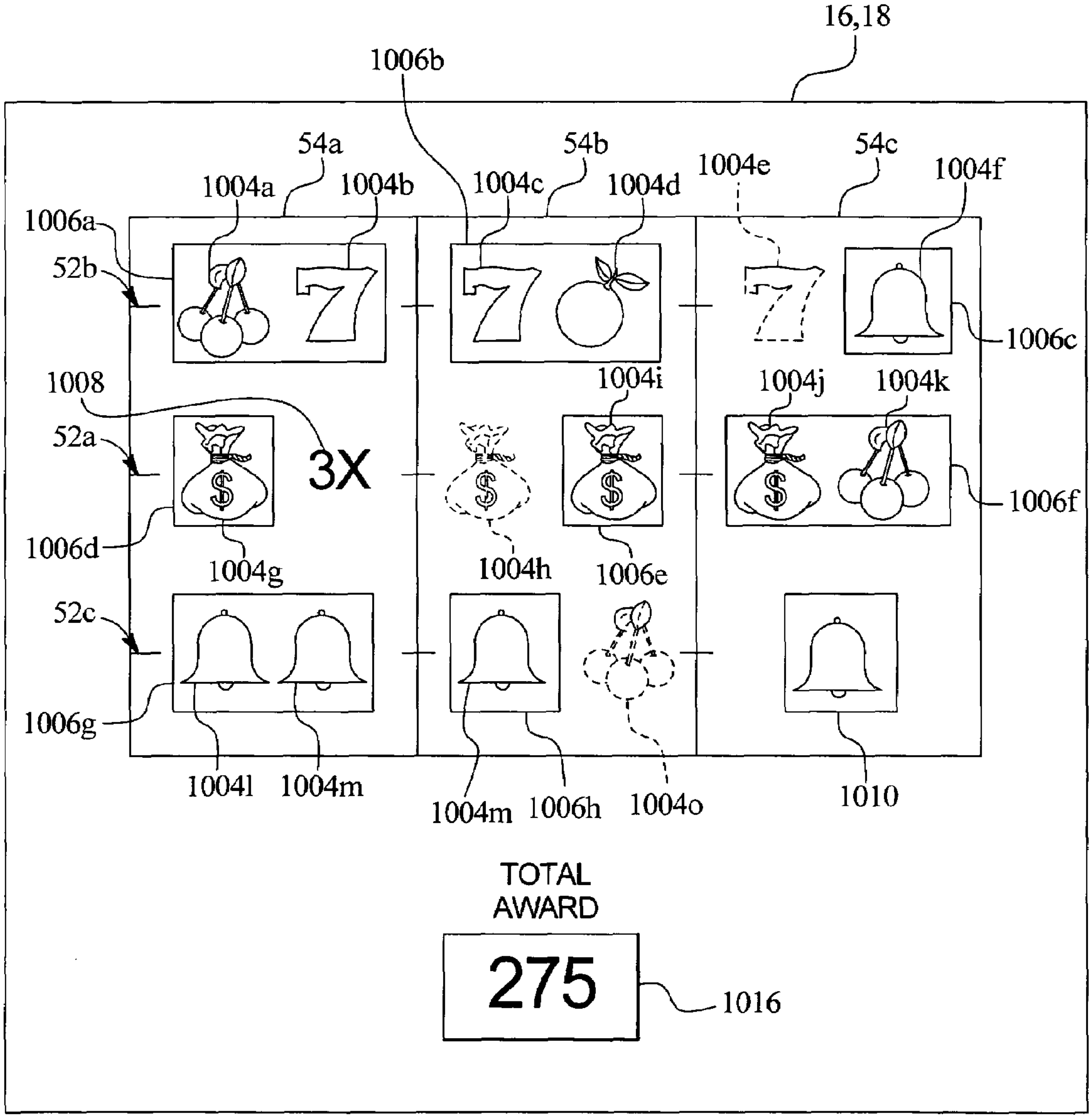
FIG. 21D is an enlarged elevation view of an example of a gaming device employing three of the reel sets of the embodiment of FIG. 21A in a play of the game.

Referring now to FIG. 21D, an example of a gaming device employing three of the reel sets of the embodiment of FIG. 21A is illustrated where the gaming device or player activates the reel sets in a play of the game. When the reel sets stop moving or spinning, the reel sets display a plurality of symbols to the player. In particular, payline 52*a* indicates window 1006*d*, modifier 1008, the window 1006*e* and the window 1006*f*. The symbols displayed by these windows include the money bag symbol 1004*g*, the money bag symbol 1004*i*, the money bag symbol 1004*j* and the cherry symbol 1004*k*. Therefore, the payline 52*a* indicates a winning symbol combination including three money bag symbols. The symbol combination including three money symbols provides an award of twenty-five to the player. As shown in FIG. 21D, the money bag symbol 1004*h* is not displayed because of the position of the window 1006*e*. Therefore, the player missed obtaining a winning symbol combination including four money bag symbols which would have provided a larger award to the player. The award of twenty-five is multiplied by the modifier of 3X indicated on payline 52*a* to provide the player with an award of seventy-five.

Payline 52*b* indicates a window 1006*a*, a window 1006*b* and a window 1006*c*. These windows display the cherry symbol 1004*a*, the seven symbol 1004*b*, the seven symbol 1004*c*, the orange symbol 1004*d* and the bell symbol 1004*f*. The symbol combination does not indicate a winning symbol combination. However, the seven symbol 1004*e* does not displayed on payline 52*b* because of the position and size of the window 1006*c*. The player therefore missed obtaining another winning symbol combination in the play of the game because of the size and position of the window 1006*c*. The player does not receive an award for the symbol combination indicated by payline 52*b*.

Payline 52*c* indicates a window 1006*g*, a window 1006*h* and a bell symbol 1010. Payline 52*c* therefore displays the symbols 1004*l*, the bell symbol 1004*m*, the bell symbol 1004*n* and the bell symbol 1010. The combination of four bell symbols is a winning symbol combination and provides an award of 200 to the player. The cherry symbol 1004*o* is not displayed on payline 52*c* because of the size and position of the window 1006*h*. However, the cherry symbol does not affect the award provided by the symbol combination indicated by payline 52*c*. The gaming device therefore provides the award of two hundred associated with the symbol combination indicated by payline 52*c* and the award of seventy-five associated with the symbol combination and the modifier indicated by payline 52*a* to provide the player with the total award of two hundred seventy-five as indicated by the total award display 1016.

Figure 22A:
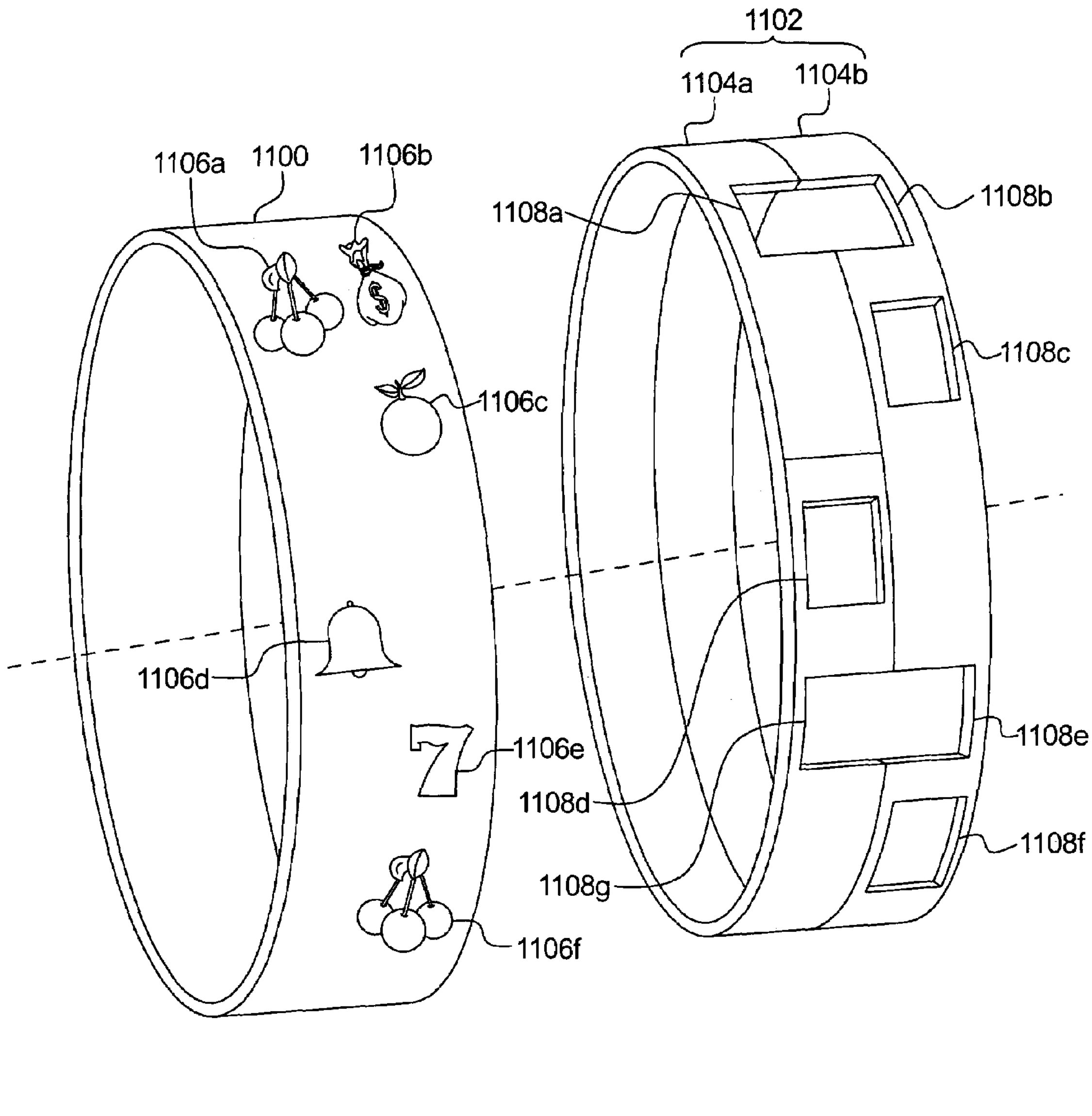
FIG. 22A is a front perspective view of an alternative embodiment of the present invention where the outer reel includes at least two rotatable sections which independently rotate or move with respect to each other.
Figure 22B:
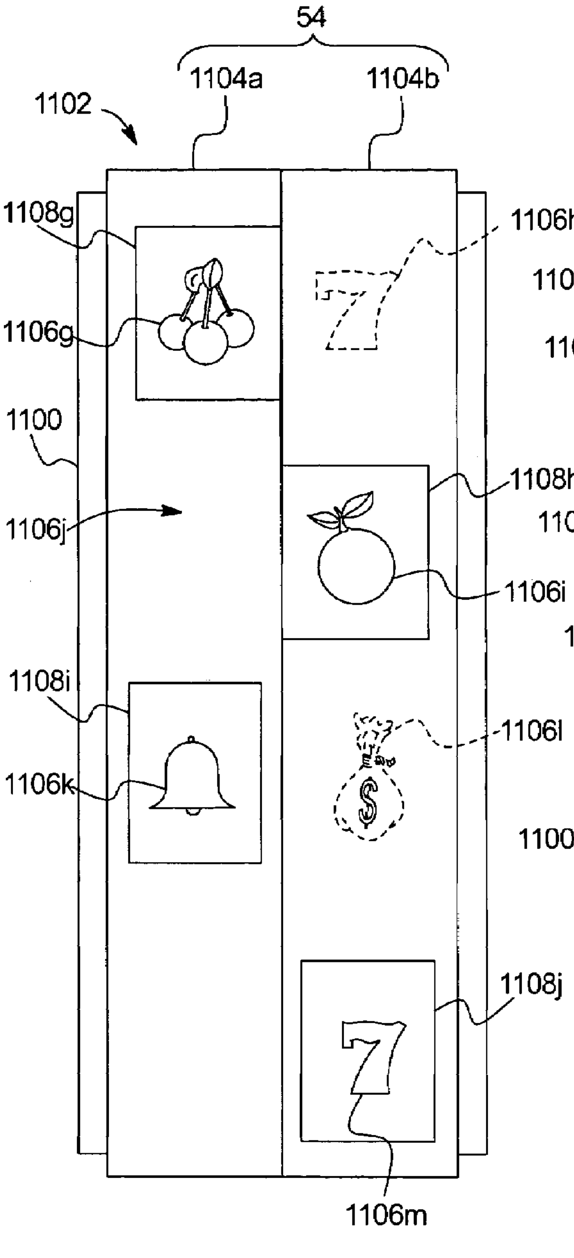
FIGS. 22B and 22C, are elevation views which each illustrate an example of the embodiment of FIG. 22A.
Figure 22C:
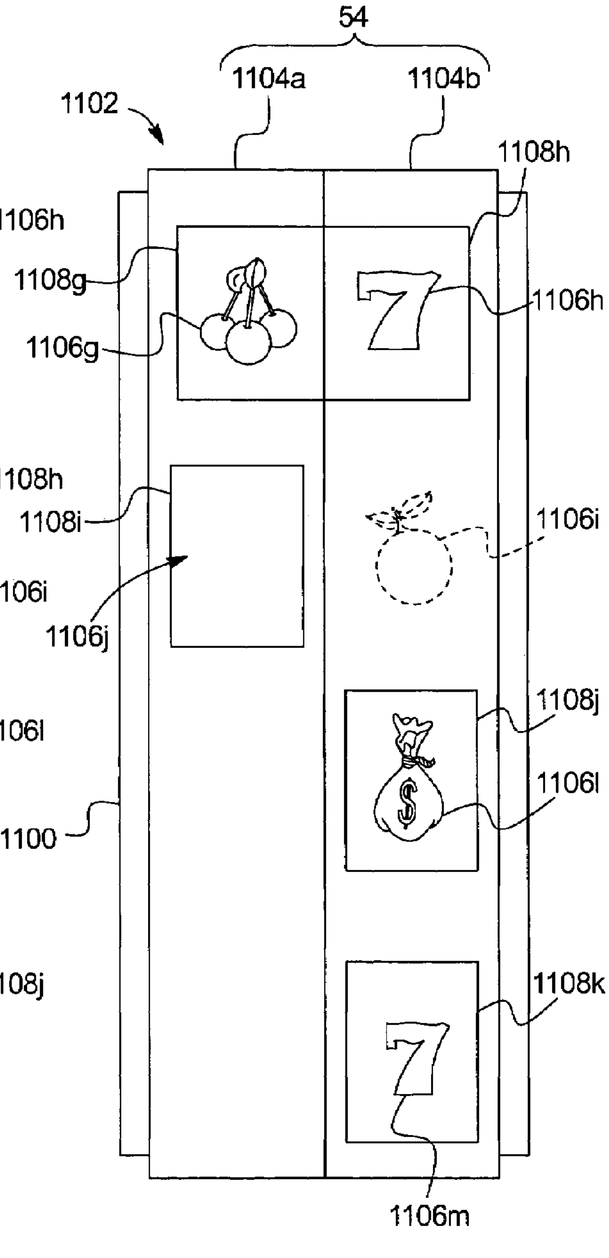

Referring now to FIGS. 22A, 22B and 22C, an alternative embodiment of the present invention is illustrated where the concentric reels described above include an inner reel 1100 and an outer reel 1102. The inner reel 1100 includes a plurality of symbols such as a cherry symbol 1106*a*, a money bag symbol 1106*b*, an orange symbol 1106*c*, a bell symbol 1106*d*, a seven symbol 1106*e* and a cherry symbol 1106*f*. As described above, the inner reel 1100 includes a plurality of symbol positions where each symbol position includes one or more symbol locations. Each symbol location displays or includes at least one symbol. The outer reel 1102 includes at least two sections or halves such as a first rotatable member 1104*a* and a second rotatable member 1104*b*. The first and second rotatable members 1104*a* and 1104*b* move or rotate independently of each other. The first rotatable members 1104*a* includes a plurality of viewable areas or windows such as first viewable area sections 1108*a* and 1108*g* and one symbol viewable areas such as viewable area 1108*d*. The second rotatable member 1104*b* includes a plurality of viewable areas such as the second viewable area sections 1108*b* and 1108*e* and one symbol viewable area or windows 1108*c* and 1108*f*. It should be appreciated at the first and second rotatable members 1104*a* and 110*b* may have any suitable number or types of viewable areas or windows. In this embodiment, the first viewable area sections 1108*a* and 1108*g* on the first rotatable member 1104*a* correspond and align with the second viewable area sections 1108*d* and 1108*e* on the second rotatable member 1104*b*. When the first viewable area sections and the second viewable area sections are not aligned with each other, each of these sections indicates or displays one of the symbols of the inner reel 1100 (i.e., acts as a one symbol viewable area or window). However, when the first rotatable member and the second rotatable member 1104*a* and 1104*b* rotate so that the first viewable area section 1108*a* and the second viewable area section 1108*b* align as illustrated in FIG. 22A, the aligned sections form a relatively large window that indicates or displays a plurality of the symbols on the inner reel 1100. Therefore, this embodiment creates excitement and enjoyment for players because in each play of the game, the outer reel 1102 may include a plurality of one symbol viewable areas or windows or one or more relatively large viewable areas or windows formed by the first and second sections on the first and second rotatable sections 1104*a* and 1104*b*.

Referring now to FIG. 22B, an example of a reel set 54 including an inner reel 1100 and an outer reel 1102 having first and second rotatable members 1104*a* and 1104*b* is illustrated. In this example, the first and second rotatable sections 1104*a* and 1104*b* of the outer reel 1102 are rotated and do not align with each other when the first and second rotatable members 1104*a* and 1104*b* stop rotating or spinning. Therefore, the first viewable area section 1108*g* and the second viewable area section 1108*h* indicate or display only one of the symbols on the inner reel 1100. For example, the first viewable area section 1108*g* indicates the cherry symbol 1106*g*. The second viewable area section 1108*h* indicates or displays an orange symbol 1106*i*. Additionally, the one symbol viewable areas or windows 1108*i* and 1108*j* indicate or display a bell symbol 1106*k* and a seven symbol 1106*m*, respectively. As illustrated in FIG. 22B, a seven symbol 1106*h* and a money bag symbol 1106*l* are not displayed or indicated by any of the viewable areas or windows and therefore are not seen by the player. However, if the first viewable area section 1108*g* and the second viewable area section 1108*h* did align in that play of the game, the seven symbol 1107*h* would be viewable by the player. Accordingly, the positioning of the first and second viewable area sections on the first and second rotatable sections 1104*a* and 1104*b* determines which of the symbols of the inner reel 1100 are viewable or visible by a player in a play of the game and which symbols are evaluated to determine an outcome in each play of the game.

Referring now to FIG. 22C, another example of the embodiment of FIG. 22A is illustrated where the inner and outer reels 1100 and 1102 are activated and spin in a play of the game. After the inner and outer reels stop spinning, the first and second rotatable members 1104*a* and 1104*b* indicate or display a plurality of viewable areas or windows to the player. Specifically, in this play of the game, the first viewable area section 1108*g* and the second viewable area section 1108*h* are aligned. Therefore, these sections form a relatively large viewable area or window that indicates two of the symbols on the inner reel, the cherry symbol 1106*g* and the seven symbol 1106*h*. Additionally, a one symbol viewable area or window 1108*i* indicates a blank symbol 1106*j*, a one symbol window 1108*j* indicates a money bag symbol 1106*l* and a one symbol window 1108*k* indicates a seven symbol 1106*m*. As shown in FIG. 22C, the orange symbol 1106*i* is not viewable or visible by the player through one of the viewable areas.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device controlled by a processor, said gaming device comprising:

a housing;

at least one display device supported by the housing, the at least one display device including:

(a) an inner reel including a plurality of symbol positions and a plurality of symbols, wherein at least one of the symbol positions includes a plurality of the symbols; and (b) an outer reel defining a first viewable area and a second viewable area, the first viewable area being of a different size than the second viewable area, wherein the outer reel is positionable to enable a player to view a first number of the symbols of the symbol position which includes a plurality of the symbols on the inner reel through the first viewable area and a different second number of the symbols of the symbol position which includes a plurality of the symbols on the inner reel through the second viewable area, the first and second numbers each being greater than zero, wherein the entire first viewable area is positioned on a first side of the outer reel to display the first number of the symbols of said symbol position which includes a plurality of the symbols, said displayed first number of the symbols being positioned on a first side of the inner reel, wherein for one play of a game, the processor is programmed to cause the inner reel to move to display at least one of the symbols, cause the outer reel to move to indicate one of said first and second viewable areas on a payline, and cause the at least one display device to display an outcome based on any symbols of the inner reel which are viewable through one of:

(i) the first viewable area when the first viewable area is indicated on the payline such that if the at least one symbol position including a plurality of the symbols is displayed, the outcome is based on the first number of the symbols of the at least one symbol position including a plurality of the symbols; and (ii) the second viewable area when the second viewable area is indicated on the payline such that if the at least one symbol position including a plurality of the symbols is displayed, the outcome is based on the different second number of the symbols of the at least one symbol position including a plurality of the symbols.

2. The gaming device of claim 1, which includes a plurality of the inner reels and a plurality of the outer reels.

3. The gaming device of claim 1, wherein a plurality of the symbol positions include a plurality of the symbols.

4. The gaming device of claim 1, wherein all of the symbol positions include a plurality of the symbols.

5. The gaming device of claim 1, wherein the second viewable area is positioned on a different second side of the outer reel to display a different second number of the symbols of said symbol position which includes a plurality of the symbols, said second symbol being positioned on the different second side of the inner reel.

6. The gaming device of claim 1, which includes at least one modifier associated with at least one of the first and second viewable areas.

7. The gaming device of claim 1, which includes a plurality of modifiers associated with at least one of the first and second viewable areas.

8. The gaming device of claim 1, wherein the inner reel and the outer reel are mechanical reels.

9. The gaming device of claim 1, wherein the processor is programmed to cause the outer reel to move to indicate one of the first and second viewable areas on at least one of a plurality of paylines.

10. The gaming device of claim 9, wherein if one of the first and second viewable areas is indicated on any of the paylines, the outcome is based on any of the symbols of the inner reel which are viewable through the indicated one of the first and second viewable areas.

11. The gaming device of claim 1, wherein the outer reel includes at least one second symbol, and if the second symbol and one of the first and second viewable areas is indicated on the payline, the outcome is based on the second symbol and any of the symbols of the inner reel which are viewable through any of said indicated first and second viewable areas.

12. The gaming device of claim 11, wherein the second symbol on the outer reel and at least one of the symbols on the inner reel are different.

13. The gaming device of claim 11, wherein the second symbol on the outer reel and the symbols on the inner reel are different.

14. A gaming device controlled by a processor, said gaming device comprising:

a housing;

at least one display device supported by the housing, the at least one display device including;

(a) an inner reel supported by the housing and including a plurality of symbols and a plurality of symbol positions, each of said symbol positions including at least two symbol locations, wherein each symbol location of at least one of the symbol positions includes one of the symbols; and (b) an outer reel supported by the housing and defining a first viewable area and a second viewable area, the first viewable area sized to enable a player to view a first number of the symbol locations of the at least one symbol position including a symbol in each symbol location, the second viewable area being sized to enable the player to view a different second number of the symbol locations of the at least one symbol position including a symbol in each symbol location, the first and second numbers each being greater than zero, the outer reel being positionable to enable the player to: (i) view the first number of the symbol locations of each symbol position through the first viewable area, and (ii) view the second number of the symbol locations of each symbol position through the second viewable area, wherein for one play of a game, the processor is programmed to cause the inner reel to move to display a plurality of the symbol locations, cause the outer reel to move and indicate one of said first and second viewable areas on a payline and cause the at least one display device to display an outcome based at least in part on any symbols of the inner reel which are viewable through one of:

(i) the first viewable area when the first viewable area is indicated on the payline such that if the at least one symbol position including a symbol in each symbol location is displayed, the outcome is based on the first number of the symbols of the at least one symbol position including a symbol in each symbol location; and (ii) the second viewable area when the second viewable area is indicated on the payline such that if the at least one symbol position including a symbol in each symbol location is displayed, the outcome is based on the different second number of the symbols of the at least one symbol position including a symbol in each symbol location.

15. The gaming device of claim 14, which includes a plurality of the inner reels and a plurality of the outer reels.

16. The gaming device of claim 14, wherein each of a plurality of the symbol positions includes at least one symbol in each of the symbol locations of said symbol positions.

17. The gaming device of claim 14, wherein each of the symbol locations of each of the symbol positions include at least one symbol.

18. The gaming device of claim 14, which includes at least one modifier associated with at least one of the first and second viewable areas.

19. The gaming device of claim 14, which includes a plurality of modifiers associated with at least one of the first and second viewable areas.

20. The gaming device of claim 14, wherein the inner reel and the outer reel are mechanical reels.

21. The gaming device of claim 14, wherein the processor is programmed to cause the outer reel to move to indicate at least one of the first and second viewable areas on any one of a plurality of paylines.

22. The gaming device of claim 21, wherein if any of the first and second viewable areas is indicated on any one of the paylines, the outcome is based on any symbols of the inner reel which are viewable through any of said indicated first and second viewable areas.

23. The gaming device of claim 14, wherein if the second symbol and one of the first and second viewable areas is indicated on the payline, the outer reel includes at least one second symbol, and wherein the outcome is based on the second symbol and any of the symbols of the inner reel which are viewable through any of said indicated first and second viewable areas.

24. The gaming device of claim 23, wherein the second symbol on the outer reel and at least one of the symbols on the inner reel are different.

25. The gaming device of claim 23, wherein the second symbol on the outer reel and the symbols on the inner reel are different.

26. A gaming device controlled by a processor, said gaming device comprising:

a housing;

at least one display device, the at least one display device including a plurality of reel sets rotatably connected to the housing, at least one of said reel sets including an inner reel and an outer reel which are aligned along the same axis of rotation, at least a portion of the outer reel overlapping the inner reel, said inner reel including a plurality of symbols positions, each of said symbol positions including at least one of a plurality of first symbols, at least one of said plurality of symbol positions including a plurality of said first symbols, said outer reel defining a first viewable area and a second viewable area, the first viewable area being of a different size than the second viewable area, the first viewable area sized to enable the player to view a first number of the symbols in the at least one symbol position including a plurality of said first symbols, the second viewable area sized to enable the player to view a different second number of the symbols in the at least one symbol position including a plurality of said first symbols, the first and second numbers each being greater than zero, wherein said outer reel is positionable to enable the player to view the first number of the first symbols of the inner reel in the symbol position including a plurality of said first symbols through the first viewable area, and the second number of the first symbols of the inner reel in the symbol position including a plurality of said first symbols through the second viewable area, wherein, for one play of a game operable upon a wager, the processor is programmed to cause the inner reel to move to display at least one of the first symbols, cause the outer reel to move to indicate one of the first and second viewable areas on a payline, and cause the at least one display device to display an outcome based at least in part on any of the first symbols which are viewable through one of the first and second viewable areas when said one of the first and second viewable areas is indicated on the payline, wherein if the first viewable area is indicated on the payline and if the at least one symbol position including a plurality of said first symbols is displayed, said outcome is based on the first number of the symbols of the at least one symbol position including a plurality of said first symbols.

27. The gaming device of claim 26, wherein the outer reel includes a plurality of second symbols, and wherein if any of the first and second viewable areas is indicated on the payline, the outcome is based on any of the symbols of the inner reel which are viewable through any of said indicated first and second viewable areas.

28. The gaming device of claim 27, wherein at least one of the first symbols is different from at least one of the second symbols.

29. The gaming device of claim 27, wherein each of a plurality of the first symbols is different from each of a plurality of the second symbols.

30. The gaming device of claim 27, wherein each of the first symbols is different from each of the second symbols.

31. The gaming device of claim 26, which includes at least one modifier associated with at least one of the viewable areas.

32. The gaming device of claim 26, which includes a plurality of modifiers associated with at least one of the viewable areas.

33. The gaming device of claim 26, wherein the processor is programmed to cause the outer reel to move to indicate at least one of the first and second viewable areas on at least one of a plurality of paylines.

34. The gaming device of claim 33, wherein if any of the first and second viewable areas is indicated on any of the paylines, the outcome is based on at least one of the first symbols, if any, which are viewable through any of said indicated first and second viewable areas.

35. A method for operating a gaming device, said method comprising:

(a) displaying an inner reel including a plurality of symbol positions and a plurality of symbols, at least one of the symbol positions including a plurality of the symbols;

(b) displaying an outer reel including at least one modifier and defining a first viewable area and a second viewable area, the first viewable area sized to enable a player to view first number of the symbols of the at least one symbol position including a plurality of the symbols, the second viewable area sized to enable the player to view a different second number of the symbols of the at least one symbol position including a plurality of the symbols, the first and second numbers each being greater than zero, wherein the first viewable area is associated and aligned with the at least one modifier of the outer reel, wherein the outer reel is positionable to enable the player to view the first number of the symbols of the symbol position which includes a plurality of the symbols through the first viewable area and the different second number of the symbols of the symbol position which includes a plurality of the symbols through the second viewable area; and (c) for one play of a game:

(i) moving the inner reel to display a plurality of the symbols;

(ii) moving the outer reel;

(iii) enabling the player to view the first number of the symbols on the inner reel when the first viewable area is indicated on a payline associated with the reels;

(iv) enabling the player to view the second number of the symbols on the inner reel when the second viewable area is indicated on the payline; and (v) displaying an outcome based at least in part on any symbols of the inner reel which are viewable through one of the first and second viewable areas when said one of the first and second viewable areas is indicated on the payline, wherein if the first viewable area is indicated on the payline and if the at least one symbol position including a plurality of the symbols is displayed, said outcome is based on the first number of the symbols of the at least one symbol position including a plurality of the symbols.

36. The method of claim 35, which includes associating at least one modifier with the second viewable area.

37. The method of claim 35, which includes associating a plurality of modifiers with at least one of the first and second viewable areas.

38. The method of claim 35, which includes associating a plurality of paylines with the reels.

39. The method of claim 38, which includes indicating at least one of the first and second viewable areas on any one of the plurality of paylines associated with the reels, wherein displaying the outcome includes displaying the outcome based on any symbols of the inner reel which are viewable through any of said indicated first and second viewable areas.

40. The method of claim 35, which includes providing at least one second symbol on the outer reel, wherein the outcome is based on at least one of the symbols of the inner reel which are viewable through one of the first and second viewable areas and the second symbol.

41. The method of claim 40, wherein the second symbol on the outer reel and at least one of the symbols on the inner reel are different.

42. The method of claim 40, wherein the second symbol on the outer reel and the symbols on the inner reel are different.

43. The method of claim 35, which includes operating the gaming device through a data network.

44. The method of claim 43, wherein the data network is an internet.

45. A gaming device controlled by a processor, said gaming device comprising:

a housing;

at least one display device;

an inner reel supported by the housing and including a plurality of symbol positions and a plurality of symbols, at least a designated one of the symbol positions including a plurality of the symbols; and an outer reel supported by the housing and defining a plurality of viewable areas, said plurality of viewable areas including:

(a) a first viewable area positioned on a first side of the outer reel, (b) a second viewable area positioned on a different second side of the outer reel, and (c) a third viewable area, said third viewable area being of a different size than the first viewable area, and a different size than the second viewable area, wherein the outer reel is positionable to enable a player to view:

(i) a first one of the symbols of the designated symbol position through the first viewable area, said first symbol of the designated symbol position being positioned on a first side of the inner reel, (ii) a different second one of the symbols of the designated symbol position through the second viewable area, said second symbol of the designated symbol position being positioned on a different second side of the inner reel, and (iii) a designated plurality of the symbols of the designated symbol position through the third viewable area, wherein for one play of a game, the processor is operable to cause the inner reel to move to display at least one of the symbols, cause the outer reel to move to indicate one of the plurality of viewable areas on a payline, and cause the at least one display device to display an outcome based on:

(a) the first symbol of the designated symbol position if the first viewable area is indicated on the payline and the designated symbol position is displayed, (b) the second symbol of the designated symbol position if the second viewable area is indicated on the payline and the designated symbol position is displayed, and (c) the designated plurality of the symbols of the designated symbol position if the third viewable area is indicated on the payline and the designated symbol position is displayed.

46. The gaming device of claim 45, which includes a plurality of the inner reels and a plurality of the outer reels.

47. The gaming device of claim 45, wherein a plurality of the symbol positions each include a plurality of the symbols.

48. The gaming device of claim 45, wherein all of the symbol positions include a plurality of the symbols.

49. The gaming device of claim 45, wherein the plurality of symbols of the designated symbol position includes at least one of the first symbol of the designated symbol position and the second symbol of the designated symbol position.

50. The gaming device of claim 45, which includes at least one modifier associated with at least one of the plurality of viewable areas.

51. The gaming device of claim 45, which includes a plurality of modifiers associated with at least one of the plurality of viewable areas.

52. The gaming device of claim 45, wherein the inner reel and the outer reel are mechanical reels.

53. The gaming device of claim 45, wherein the processor is operable to cause the outer reel to move to indicate one of the plurality of viewable areas on one of a plurality of paylines and display an outcome based on:

(a) the first symbol of the designated symbol position if the first viewable area is indicated on one of the plurality of paylines and the designated symbol position is displayed, (b) the second symbol of the designated symbol position if the second viewable area is indicated on one of the plurality of paylines and the designated symbol position is displayed, and (c) the designated plurality of the symbols of the designated symbol position if the third viewable area is indicated on one of the plurality of paylines and the designated symbol position is displayed.

54. The gaming device of claim 53, wherein if any of the plurality of viewable areas is indicated on any one of the plurality of paylines, the outcome is based on at least one of the symbols, if any, of the inner reel which are viewable through the indicated first, second, and third viewable areas.

55. The gaming device of claim 45, wherein the outer reel includes at least one second symbol, and if the at least one second symbol and any of the plurality of viewable areas is indicated on the payline, the outcome is based on the at least one second symbol and at least one of the symbols, if any, of the inner reel which are viewable through any indicated viewable area.

56. The gaming device of claim 45, wherein the second symbol of the outer reel and at least one of the symbols of the inner reel are different.

57. The gaming device of claim 45, wherein the second symbol on the outer reel is different from each of the symbols of the inner reel.

58. A method for operating a gaming device, said method comprising:

(a) displaying an inner reel including a plurality of symbol positions and a plurality of symbols, at least a designated one of the symbol positions including a plurality of the symbols;

(b) displaying an outer reel defining a plurality of viewable areas, said plurality of viewable areas including:

(i) a first viewable area positioned on a first side of the outer reel, (ii) a second viewable area positioned on a different second side of the outer reel, and (iii) a third viewable area, said third viewable area being of a different size than the first viewable area, and a different size than the second viewable area, wherein the outer reel is positionable to enable a player to view:

(x) a first one of the symbols of the designated symbol position through the first viewable area, said first symbol of the designated symbol position being positioned on a first side of the inner reel, (y) a different second one of the symbols of the designated symbol position through the second viewable area, said second symbol of the designated symbol position being positioned on a different second side of the inner reel, and (z) a designated plurality of the symbols of the designated symbol position through the third viewable area;

(c) moving the inner reel to display at least one of the symbols;

(d) moving the outer reel to indicate one of the plurality of viewable areas on a payline; and (e) displaying an outcome based on:

(i) the first symbol of the designated symbol position when the first viewable area is indicated on the payline and the designated symbol position is displayed, (ii) the second symbol of the designated symbol position when the second viewable area is indicated on the payline and the designated symbol position is displayed, and (iii) the designated plurality of the symbols of the designated symbol position when the third viewable area is indicated on the payline and the designated symbol position is displayed.

59. The method of claim 58, which includes associating at least one modifier with at least one of the viewable areas.

60. The method of claim 58, which includes associating a plurality of modifiers with at least one of the viewable areas.

61. The method of claim 58, which includes associating a plurality of paylines with the inner and outer reels.

62. The method of claim 61, wherein displaying the outcome includes indicating any one of the viewable areas on any one of the paylines, and displaying the outcome based on any symbols of the inner reel which are viewable through any of said indicated viewable areas.

63. The method of claim 58, wherein moving the inner reel and moving the outer reel include moving the inner and outer reels in the same direction.

64. The method of claim 58, wherein moving the inner reel and moving the outer reel include moving the inner and outer reels in different directions.

65. The method of claim 58, wherein moving the inner reel and moving the outer reel include simultaneously moving the inner and outer reels.

66. The method of claim 58, wherein of moving the inner reel and moving the outer reel include moving the inner and outer reels sequentially.

67. The method of claim 58, which includes displaying a second symbol on the outer reel, wherein the outcome is based on the second symbol and any of the symbols of the inner reel which are viewable through any of the viewable areas.

68. The method of claim 67, wherein the second symbol on the outer reel is different from at least one of the symbols on the inner.

69. The method of claim 67, wherein the second symbol on the outer reel is different from each of the symbols on the inner reel.

70. The method of claim 58, which includes operating the gaming device through a data network.

71. The method of claim 70, wherein the data network is an interne.

* * * * *